United States Patent
Kawakami et al.

(10) Patent No.: US 11,094,927 B2
(45) Date of Patent: Aug. 17, 2021

(54) POSITIVE ELECTRODE ACTIVE MATERIAL PARTICLE AND MANUFACTURING METHOD OF POSITIVE ELECTRODE ACTIVE MATERIAL PARTICLE

(71) Applicant: SEMICONDUCTOR ENERGY LABORATORY CO., LTD., Atsugi (JP)

(72) Inventors: Takahiro Kawakami, Kanagawa (JP); Teruaki Ochiai, Kanagawa (JP); Yohei Momma, Kanagawa (JP); Ayae Tsuruta, Kanagawa (JP); Masahiro Takahashi, Kanagawa (JP); Mayumi Mikami, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 15/726,520

(22) Filed: Oct. 6, 2017

(65) Prior Publication Data

US 2018/0102536 A1    Apr. 12, 2018

(30) Foreign Application Priority Data

Oct. 12, 2016 (JP) ............................. JP2016-200835
Mar. 17, 2017 (JP) ............................. JP2017-052309
May 22, 2017 (JP) ............................. JP2017-100619

(51) Int. Cl.
*H01M 4/36* (2006.01)
*H01M 4/04* (2006.01)
(Continued)

(52) U.S. Cl.
CPC ............ *H01M 4/366* (2013.01); *H01G 11/24* (2013.01); *H01G 11/50* (2013.01); *H01G 11/60* (2013.01);
(Continued)

(58) Field of Classification Search
CPC ...... H01M 4/366; H01M 4/62; H01M 4/0471; H01M 4/525; H01M 4/505;
(Continued)

(56) References Cited

U.S. PATENT DOCUMENTS 4,302,518 A    11/1981    Goodenough et al.
4,668,595 A    5/1987    Yoshino et al.
(Continued)

FOREIGN PATENT DOCUMENTS

CN    001715193 A    1/2006
CN    101148263 A    3/2008
(Continued)

OTHER PUBLICATIONS

English translation of JP 2011-138718 (Year: 2011).*
(Continued)

*Primary Examiner* — Michael L Dignan
(74) *Attorney, Agent, or Firm* — Fish & Richardson P.C.

(57) ABSTRACT

Provided is a positive electrode active material which suppresses a reduction in capacity due to charge and discharge cycles when used in a lithium ion secondary battery. A covering layer is formed by segregation on a superficial portion of the positive electrode active material. The positive electrode active material includes a first region and a second region. The first region exists in an inner portion of the positive electrode active material. The second region exists in a superficial portion of the positive electrode active material and part of the inner portion thereof. The first region includes lithium, a transition metal, and oxygen. The second region includes magnesium, fluorine, and oxygen.

43 Claims, 51 Drawing Sheets

(51) Int. Cl.
  *H01M 4/62* (2006.01)
  *H01G 11/24* (2013.01)
  *H01G 11/86* (2013.01)
  *H01G 11/50* (2013.01)
  *H01G 11/60* (2013.01)
  *H01M 4/505* (2010.01)
  *H01M 4/525* (2010.01)
  *H01M 10/0525* (2010.01)
  *H01M 4/02* (2006.01)

(52) U.S. Cl.
  CPC .......... *H01G 11/86* (2013.01); *H01M 4/0471* (2013.01); *H01M 4/505* (2013.01); *H01M 4/525* (2013.01); *H01M 4/62* (2013.01); *H01M 4/628* (2013.01); *H01M 10/0525* (2013.01); *H01M 2004/028* (2013.01)

(58) Field of Classification Search
  CPC ....... H01M 2004/028; H01M 10/0525; H01M 4/628; H01G 11/60; H01G 11/50
  See application file for complete search history.

(56) References Cited

U.S. PATENT DOCUMENTS

| | | | |
|---|---|---|---|
| 5,240,794 A | 8/1993 | Thackeray et al. | |
| 5,443,929 A | 8/1995 | Yamamoto et al. | |
| 5,604,396 A | 2/1997 | Watanabe et al. | |
| 5,705,291 A | 1/1998 | Amatucci et al. | |
| 5,783,333 A | 7/1998 | Mayer | |
| 5,824,278 A | 10/1998 | Yao | |
| 5,834,139 A | 11/1998 | Shodai et al. | |
| 5,871,866 A | 2/1999 | Barker et al. | |
| 5,910,382 A | 6/1999 | Goodenough et al. | |
| 6,085,015 A | 7/2000 | Armand et al. | |
| 6,127,065 A | 10/2000 | Yamamoto et al. | |
| 6,218,050 B1 | 4/2001 | Yoon et al. | |
| 6,277,521 B1 | 8/2001 | Gao et al. | |
| 6,346,348 B1 | 2/2002 | Nakajima et al. | |
| 6,458,487 B1 | 10/2002 | Takeuchi et al. | |
| 6,514,640 B1 | 2/2003 | Armand et al. | |
| 6,582,814 B2 | 6/2003 | Swiler et al. | |
| 6,589,499 B2 | 7/2003 | Gao et al. | |
| 6,680,143 B2 | 1/2004 | Thackeray et al. | |
| 6,737,195 B2 | 5/2004 | Kweon et al. | |
| 6,753,111 B2 | 6/2004 | Kweon et al. | |
| 6,846,592 B2 | 1/2005 | Kweon et al. | |
| 6,878,490 B2 | 4/2005 | Gao et al. | |
| 6,919,144 B2 | 7/2005 | Miyazaki et al. | |
| 6,974,601 B2 | 12/2005 | Kweon et al. | |
| 6,984,469 B2 | 1/2006 | Kweon et al. | |
| 7,018,741 B2 | 3/2006 | Suhara et al. | |
| 7,138,209 B2 | 11/2006 | Kweon et al. | |
| 7,294,435 B2 | 11/2007 | Miyamoto et al. | |
| 7,303,840 B2 | 12/2007 | Thackeray et al. | |
| 7,309,546 B2 | 12/2007 | Kweon et al. | |
| 7,368,071 B2 | 5/2008 | Dahn et al. | |
| 7,393,476 B2 | 7/2008 | Shiozaki et al. | |
| 7,504,180 B2 | 3/2009 | Tatsumi et al. | |
| 7,635,536 B2 | 12/2009 | Johnson et al. | |
| 7,709,148 B2 | 5/2010 | Kawasato et al. | |
| 7,709,151 B2 | 5/2010 | Inoue et al. | |
| 7,736,807 B2 | 6/2010 | Hasegawa et al. | |
| 7,790,308 B2 | 9/2010 | Johnson et al. | |
| 7,892,679 B2 | 2/2011 | Shimizu et al. | |
| 7,927,506 B2 | 4/2011 | Park | |
| 7,935,270 B2 | 5/2011 | Park | |
| 8,003,256 B2 | 8/2011 | Ohishi | |
| 8,007,941 B2 | 8/2011 | Kweon et al. | |
| 8,034,486 B2 | 10/2011 | Kweon et al. | |
| 8,080,340 B2 | 12/2011 | Thackeray et al. | |
| RE43,276 E | 3/2012 | Kweon et al. | |
| 8,236,449 B2 | 8/2012 | Nakura | |
| 8,470,477 B2 | 6/2013 | Miwa et al. | |
| 8,476,510 B2 | 7/2013 | Swager et al. | |
| 8,557,440 B2 | 10/2013 | Yu et al. | |
| 8,685,569 B2 | 4/2014 | Oguni et al. | |
| 8,685,570 B2 | 4/2014 | Miwa et al. | |
| 8,709,654 B2 | 4/2014 | Takeuchi et al. | |
| 8,753,532 B2 | 6/2014 | Levasseur et al. | |
| 8,808,918 B2 | 8/2014 | Jung et al. | |
| 8,877,377 B2 | 11/2014 | Hosoya | |
| 8,877,381 B2 | 11/2014 | Yasuda et al. | |
| 8,883,351 B2 | 11/2014 | Todoriki et al. | |
| 8,906,547 B2 | 12/2014 | Taniguchi et al. | |
| 8,927,148 B2 | 1/2015 | Kawakami | |
| 8,945,770 B2 | 2/2015 | Koo et al. | |
| 8,945,772 B2 | 2/2015 | Kawakami et al. | |
| 8,951,448 B2 | 2/2015 | Toyama et al. | |
| 9,105,926 B2 | 8/2015 | Fujiki et al. | |
| 9,225,003 B2 | 12/2015 | Yukawa | |
| 9,227,850 B2 | 1/2016 | Ooishi | |
| 9,293,236 B2 | 3/2016 | Kawakami et al. | |
| 9,362,557 B2 | 6/2016 | Watanabe et al. | |
| 9,385,366 B2 | 7/2016 | Yamakaji et al. | |
| 9,391,322 B2 | 7/2016 | Liu et al. | |
| 9,478,796 B2 | 10/2016 | Li et al. | |
| 9,505,631 B2 | 11/2016 | Masukuni et al. | |
| 9,515,313 B2 | 12/2016 | Umeyama et al. | |
| 9,614,225 B2 | 4/2017 | Park | |
| 9,666,326 B2 | 5/2017 | Kawakami et al. | |
| 9,698,420 B2 | 7/2017 | Ishizaki et al. | |
| 9,786,903 B2 | 10/2017 | Ryu et al. | |
| 9,812,709 B2 | 11/2017 | Endoh et al. | |
| 9,871,246 B2 | 1/2018 | Kim et al. | |
| 9,899,664 B2* | 2/2018 | Yamaki | H01M 4/505 |
| 9,923,244 B2 | 3/2018 | Takanashi et al. | |
| 10,128,495 B2 | 11/2018 | Satow et al. | |
| 10,243,215 B2 | 3/2019 | Shitaba et al. | |
| 10,361,432 B2 | 7/2019 | Takaichi et al. | |
| 10,777,815 B2 | 9/2020 | Kanada et al. | |
| 2001/0010807 A1 | 8/2001 | Matsubara | |
| 2002/0102459 A1 | 8/2002 | Hosoya et al. | |
| 2002/0110736 A1 | 8/2002 | Kweon et al. | |
| 2002/0164156 A1 | 11/2002 | Bilbrey | |
| 2002/0195591 A1 | 12/2002 | Ravet et al. | |
| 2003/0104279 A1 | 6/2003 | Miyazaki et al. | |
| 2003/0134186 A1 | 7/2003 | Shizuki | |
| 2004/0142241 A1 | 7/2004 | Nagayama | |
| 2004/0229123 A1 | 11/2004 | Takahashi et al. | |
| 2004/0229124 A1 | 11/2004 | Miyamoto et al. | |
| 2004/0234857 A1 | 11/2004 | Shiozaki et al. | |
| 2005/0019662 A1 | 1/2005 | Suhara et al. | |
| 2006/0051671 A1 | 3/2006 | Thackeray et al. | |
| 2006/0051673 A1 | 3/2006 | Johnson et al. | |
| 2006/0121352 A1 | 6/2006 | Kejha et al. | |
| 2006/0188780 A1 | 8/2006 | Fujii et al. | |
| 2006/0263690 A1 | 11/2006 | Suhara et al. | |
| 2006/0275664 A1 | 12/2006 | Ohzuku et al. | |
| 2006/0286459 A1 | 12/2006 | Zhao et al. | |
| 2007/0026315 A1 | 2/2007 | Lampe-Onnerud et al. | |
| 2007/0099086 A1 | 5/2007 | Kang et al. | |
| 2007/0117014 A1 | 5/2007 | Saito et al. | |
| 2007/0122712 A1 | 5/2007 | Kang et al. | |
| 2007/0148546 A1 | 6/2007 | Shimizu et al. | |
| 2007/0160906 A1 | 7/2007 | Tooyama et al. | |
| 2007/0212609 A1 | 9/2007 | Iwami | |
| 2007/0224506 A1* | 9/2007 | Ooyama | C01G 23/04 |
| | | | 429/231.3 |
| 2008/0131780 A1 | 6/2008 | Kawasato et al. | |
| 2008/0166637 A1 | 7/2008 | Inagaki et al. | |
| 2008/0241693 A1 | 10/2008 | Fukuchi et al. | |
| 2009/0011335 A1 | 1/2009 | Takeda et al. | |
| 2009/0017383 A1 | 1/2009 | Suhara et al. | |
| 2009/0087731 A1 | 4/2009 | Fukui et al. | |
| 2009/0104532 A1 | 4/2009 | Hosoya | |
| 2009/0123813 A1 | 5/2009 | Chiang et al. | |
| 2009/0123842 A1 | 5/2009 | Thackeray et al. | |
| 2009/0220862 A1 | 9/2009 | Toyama et al. | |
| 2010/0019194 A1 | 1/2010 | Fujiwara et al. | |
| 2010/0035147 A1 | 2/2010 | Kotato et al. | |
| 2010/0086854 A1 | 4/2010 | Kumar et al. | |
| 2010/0129714 A1 | 5/2010 | Toyama et al. | |

(56) References Cited

U.S. PATENT DOCUMENTS

| | | |
|---|---|---|
| 2010/0129715 A1 | 5/2010 | Saito et al. |
| 2010/0143784 A1 | 6/2010 | Johnson et al. |
| 2010/0143799 A1 | 6/2010 | Park |
| 2010/0159330 A1 | 6/2010 | Sugiura et al. |
| 2010/0178464 A1 | 7/2010 | Choi et al. |
| 2010/0216024 A1 | 8/2010 | Kanno et al. |
| 2010/0233542 A1 | 9/2010 | Endo et al. |
| 2010/0247986 A1 | 9/2010 | Toyama et al. |
| 2010/0248033 A1 | 9/2010 | Kumar et al. |
| 2010/0294985 A1 | 11/2010 | Suhara et al. |
| 2011/0033749 A1 | 2/2011 | Uchida et al. |
| 2011/0059367 A1 | 3/2011 | Morita et al. |
| 2011/0076564 A1 | 3/2011 | Yu et al. |
| 2011/0200879 A1 | 8/2011 | Saito et al. |
| 2011/0229757 A1 | 9/2011 | Kawakami et al. |
| 2011/0256437 A1 | 10/2011 | Katsuki et al. |
| 2011/0269023 A1 | 11/2011 | Kawakami et al. |
| 2011/0297876 A1 | 12/2011 | Masukuni et al. |
| 2011/0300441 A1 | 12/2011 | Kawakami |
| 2012/0034516 A1 | 2/2012 | Koo et al. |
| 2012/0045692 A1 | 2/2012 | Takemura et al. |
| 2012/0064406 A1 | 3/2012 | Sato et al. |
| 2012/0064409 A1 | 3/2012 | Zhamu et al. |
| 2012/0088151 A1 | 4/2012 | Yamazaki et al. |
| 2012/0088156 A1 | 4/2012 | Nomoto et al. |
| 2012/0118149 A1 | 5/2012 | Dabrowski et al. |
| 2012/0244430 A1 | 9/2012 | Yamazaki et al. |
| 2012/0256337 A1 | 10/2012 | Yokoyama et al. |
| 2012/0258358 A1 | 10/2012 | Yura et al. |
| 2012/0258365 A1 | 10/2012 | Yokoyama et al. |
| 2012/0258369 A1 | 10/2012 | Yokoyama et al. |
| 2012/0261622 A1 | 10/2012 | Honma |
| 2012/0295163 A1 | 11/2012 | Yanagita et al. |
| 2012/0308891 A1 | 12/2012 | Todoriki et al. |
| 2012/0315544 A1 | 12/2012 | Yasuda et al. |
| 2012/0328951 A1 | 12/2012 | Hirohashi et al. |
| 2012/0328956 A1 | 12/2012 | Oguni et al. |
| 2012/0330044 A1 | 12/2012 | Hou |
| 2013/0017435 A1 | 1/2013 | Sato et al. |
| 2013/0040193 A1 | 2/2013 | Tsuchida et al. |
| 2013/0045418 A1 | 2/2013 | Oguni et al. |
| 2013/0052534 A1 | 2/2013 | Fujiki et al. |
| 2013/0052547 A1 | 2/2013 | Ogino et al. |
| 2013/0065120 A1 | 3/2013 | Miwa et al. |
| 2013/0078516 A1 | 3/2013 | Taniguchi et al. |
| 2013/0084384 A1 | 4/2013 | Yamakaji |
| 2013/0089786 A1 | 4/2013 | Jeong et al. |
| 2013/0130103 A1 | 5/2013 | Kim et al. |
| 2013/0134051 A1 | 5/2013 | Takahashi et al. |
| 2013/0156683 A1 | 6/2013 | Holzapfel et al. |
| 2013/0156942 A1 | 6/2013 | Yamakaji et al. |
| 2013/0157034 A1 | 6/2013 | Choi et al. |
| 2013/0164619 A1 | 6/2013 | Yamakaji et al. |
| 2013/0177806 A1 | 7/2013 | Caldwell et al. |
| 2013/0183579 A1 | 7/2013 | Kim et al. |
| 2013/0189585 A1 | 7/2013 | Kang et al. |
| 2013/0190449 A1 | 7/2013 | Kinloch et al. |
| 2013/0202953 A1 | 8/2013 | Sharma et al. |
| 2013/0212879 A1 | 8/2013 | Ogino |
| 2013/0230770 A1 | 9/2013 | Oya et al. |
| 2013/0266858 A1 | 10/2013 | Inoue et al. |
| 2013/0266859 A1 | 10/2013 | Todoriki et al. |
| 2013/0313471 A1 | 11/2013 | Endo et al. |
| 2013/0316237 A1 | 11/2013 | Miki |
| 2013/0337320 A1 | 12/2013 | Yukawa |
| 2014/0004412 A1 | 1/2014 | Ogino |
| 2014/0023920 A1 | 1/2014 | Yamazaki et al. |
| 2014/0079995 A1 | 3/2014 | Wakada |
| 2014/0099554 A1 | 4/2014 | Inoue et al. |
| 2014/0127567 A1 | 5/2014 | Kuriki et al. |
| 2014/0127568 A1 | 5/2014 | Kawakami et al. |
| 2014/0131633 A1 | 5/2014 | Ito et al. |
| 2014/0162132 A1 | 6/2014 | Ishii et al. |
| 2014/0166946 A1 | 6/2014 | Miwa et al. |
| 2014/0184172 A1* | 7/2014 | Momo ................... B60L 53/12 320/160 |
| 2014/0212759 A1* | 7/2014 | Blangero ............... C01G 51/42 429/231.3 |
| 2014/0234700 A1 | 8/2014 | Moriwaka et al. |
| 2014/0242463 A1 | 8/2014 | Song et al. |
| 2014/0295068 A1 | 10/2014 | Nanba et al. |
| 2014/0332715 A1 | 11/2014 | Kawakami et al. |
| 2014/0370184 A1 | 12/2014 | Takemura et al. |
| 2015/0014581 A1 | 1/2015 | Kawakami et al. |
| 2015/0014605 A1 | 1/2015 | Kawakami et al. |
| 2015/0064565 A1 | 3/2015 | Todoriki et al. |
| 2015/0093648 A1 | 4/2015 | Son et al. |
| 2015/0099178 A1* | 4/2015 | Kawakami ........... H01M 4/366 429/224 |
| 2015/0099179 A1 | 4/2015 | Ikenuma et al. |
| 2015/0123050 A1 | 5/2015 | Yamazaki et al. |
| 2015/0155556 A1 | 6/2015 | Kawakami et al. |
| 2015/0166348 A1 | 6/2015 | Ikenuma et al. |
| 2015/0262762 A1 | 9/2015 | Ikenuma et al. |
| 2015/0325855 A1 | 11/2015 | Kawakami et al. |
| 2015/0333320 A1 | 11/2015 | Tamaki et al. |
| 2015/0333324 A1 | 11/2015 | Umeyama et al. |
| 2015/0357641 A1 | 12/2015 | Sugie et al. |
| 2015/0380737 A1* | 12/2015 | Kawasato ............. H01M 4/525 429/223 |
| 2016/0006032 A1 | 1/2016 | Paulsen et al. |
| 2016/0028080 A1* | 1/2016 | Sugiura ................ H01M 4/485 429/223 |
| 2016/0064726 A1 | 3/2016 | Ikenuma et al. |
| 2016/0087315 A1 | 3/2016 | Oyama |
| 2016/0104880 A1 | 4/2016 | Gao et al. |
| 2016/0118646 A1 | 4/2016 | Ikenuma |
| 2016/0118658 A1 | 4/2016 | Kawakami et al. |
| 2016/0156030 A1 | 6/2016 | Sun et al. |
| 2016/0164089 A1 | 6/2016 | Kawakami et al. |
| 2016/0276658 A1* | 9/2016 | Choi ................... H01M 4/366 |
| 2016/0276659 A1 | 9/2016 | Choi et al. |
| 2016/0285102 A1 | 9/2016 | Shitaba et al. |
| 2016/0329533 A1 | 11/2016 | Tajima |
| 2016/0336595 A1 | 11/2016 | Choi et al. |
| 2016/0349905 A1 | 12/2016 | Momma et al. |
| 2016/0380271 A1 | 12/2016 | Ochiai et al. |
| 2017/0005364 A1 | 1/2017 | Yamazaki et al. |
| 2017/0040594 A1* | 2/2017 | Yamaki ............... H01M 4/1315 |
| 2017/0062819 A1 | 3/2017 | Ikenuma |
| 2017/0069907 A1 | 3/2017 | Zhu et al. |
| 2017/0117589 A1 | 4/2017 | Tajima et al. |
| 2017/0187035 A1* | 6/2017 | Yanagihara ....... H01M 10/0525 |
| 2017/0207444 A1* | 7/2017 | Yanagihara ............ C01G 53/42 |
| 2017/0256817 A1 | 9/2017 | Kadoma et al. |
| 2017/0309910 A1* | 10/2017 | Jo .......................... C01G 51/42 |
| 2018/0013130 A1 | 1/2018 | Ochiai et al. |
| 2018/0019462 A1 | 1/2018 | Kadoma et al. |
| 2018/0034045 A1* | 2/2018 | Xia ..................... H01M 4/0471 |
| 2018/0040888 A1 | 2/2018 | Park et al. |
| 2018/0040897 A1 | 2/2018 | Park et al. |
| 2018/0076489 A1 | 3/2018 | Mikami et al. |
| 2018/0108944 A1 | 4/2018 | Yamakaji |
| 2018/0145317 A1 | 5/2018 | Momma et al. |
| 2018/0145368 A1 | 5/2018 | Ochiai et al. |
| 2018/0190976 A1* | 7/2018 | Blangero ............. H01M 4/366 |
| 2018/0254477 A1 | 9/2018 | Horikawa et al. |
| 2018/0366729 A1 | 12/2018 | Yanagita et al. |
| 2020/0144601 A1 | 5/2020 | Takahashi et al. |
| 2020/0152961 A1 | 5/2020 | Momma et al. |
| 2020/0176770 A1 | 6/2020 | Takahashi et al. |

FOREIGN PATENT DOCUMENTS

| | | |
|---|---|---|
| CN | 101584062 A | 11/2009 |
| CN | 102222788 A | 10/2011 |
| CN | 102339998 A | 2/2012 |
| CN | 102447107 A | 5/2012 |
| CN | 102610806 A | 7/2012 |
| CN | 102694201 A | 9/2012 |
| CN | 102779976 A | 11/2012 |
| CN | 103022502 A | 4/2013 |

(56) References Cited

FOREIGN PATENT DOCUMENTS

| | | |
|---|---|---|
| CN | 103038922 A | 4/2013 |
| CN | 103490060 A | 1/2014 |
| CN | 104701534 A | 6/2015 |
| CN | 105024047 A | 11/2015 |
| CN | 106099098 A | 11/2016 |
| CN | 102569775 B | 1/2017 |
| EP | 1317008 A | 6/2003 |
| EP | 2110871 A | 10/2009 |
| EP | 2352190 A | 8/2011 |
| EP | 2698850 A | 2/2014 |
| JP | 05-314965 A | 11/1993 |
| JP | 05-314995 A | 11/1993 |
| JP | 08-037007 A | 2/1996 |
| JP | 08-100107 A | 4/1996 |
| JP | 08-236114 A | 9/1996 |
| JP | 11-025983 A | 1/1999 |
| JP | 11-096993 A | 4/1999 |
| JP | 3031546 | 4/2000 |
| JP | 2000-203842 A | 7/2000 |
| JP | 3172388 | 6/2001 |
| JP | 2001-319692 A | 11/2001 |
| JP | 2002-216760 A | 8/2002 |
| JP | 2002-352802 A | 12/2002 |
| JP | 2003-068306 A | 3/2003 |
| JP | 2003-221235 A | 8/2003 |
| JP | 2003-229129 A | 8/2003 |
| JP | 2003-331824 A | 11/2003 |
| JP | 2004-014381 A | 1/2004 |
| JP | 2004-103566 A | 4/2004 |
| JP | 2004-196604 A | 7/2004 |
| JP | 2004-288579 A | 10/2004 |
| JP | 2004-342554 A | 12/2004 |
| JP | 2005-158612 A | 6/2005 |
| JP | 2005-225734 A | 8/2005 |
| JP | 2005-302510 A | 10/2005 |
| JP | 2005-332629 A | 12/2005 |
| JP | 2006-164758 A | 6/2006 |
| JP | 2006-261132 A | 9/2006 |
| JP | 2006-318928 A | 11/2006 |
| JP | 2006-318929 A | 11/2006 |
| JP | 2007-128714 A | 5/2007 |
| JP | 2007-213866 A | 8/2007 |
| JP | 3959333 | 8/2007 |
| JP | 2008-060033 A | 3/2008 |
| JP | 2008-166156 A | 7/2008 |
| JP | 2009-179501 A | 8/2009 |
| JP | 2010-080407 A | 4/2010 |
| JP | 2010-102895 A | 5/2010 |
| JP | 2010-244847 A | 10/2010 |
| JP | 2010-272239 A | 12/2010 |
| JP | 2011-082133 A | 4/2011 |
| JP | 2011-138718 A | 7/2011 |
| JP | 4739780 | 8/2011 |
| JP | 2011-210694 A | 10/2011 |
| JP | 2011-228073 A | 11/2011 |
| JP | 2011-233246 A | 11/2011 |
| JP | 2012-018914 A | 1/2012 |
| JP | 2012-043794 A | 3/2012 |
| JP | 2012-066944 A | 4/2012 |
| JP | 2012-074366 A | 4/2012 |
| JP | 2012-084257 A | 4/2012 |
| JP | 2012-169217 A | 9/2012 |
| JP | 2012-209077 A | 10/2012 |
| JP | 2013-012410 A | 1/2013 |
| JP | 2013-062082 A | 4/2013 |
| JP | 2013-087040 A | 5/2013 |
| JP | 2013-091581 A | 5/2013 |
| JP | 2013-100197 A | 5/2013 |
| JP | 2013-246936 A | 12/2013 |
| JP | 2014-038828 A | 2/2014 |
| JP | 2014-049239 A | 3/2014 |
| JP | 2014-063707 A | 4/2014 |
| JP | 2014-063708 A | 4/2014 |
| JP | 2014-116111 A | 6/2014 |
| JP | 2015-069958 A | 4/2015 |
| JP | 2015-082374 A | 4/2015 |
| JP | 2015-088450 A | 5/2015 |
| JP | 2015-099722 A | 5/2015 |
| JP | 2015-156363 A | 8/2015 |
| JP | 2015-201432 A | 11/2015 |
| JP | 2016-054151 A | 4/2016 |
| JP | 2016-076454 A | 5/2016 |
| JP | 2017-021942 A | 1/2017 |
| JP | 2017-091777 A | 5/2017 |
| JP | 2018-092934 A | 6/2018 |
| JP | 2018-147726 A | 9/2018 |
| KR | 2003-0047734 A | 6/2003 |
| KR | 10-0696619 | 3/2007 |
| KR | 2009-0094856 A | 9/2009 |
| KR | 2009-0111130 A | 10/2009 |
| KR | 2011-0116972 A | 10/2011 |
| KR | 2012-0139833 A | 12/2012 |
| KR | 2015-0063956 A | 6/2015 |
| KR | 2016-0092946 A | 8/2016 |
| WO | WO-2008/078784 | 7/2008 |
| WO | WO-2011/132065 | 10/2011 |
| WO | WO-2011/155781 | 12/2011 |
| WO | WO-2012/005180 | 1/2012 |
| WO | WO-2012/029729 | 3/2012 |
| WO | WO-2012/124242 | 9/2012 |
| WO | WO-2012/132387 | 10/2012 |
| WO | WO-2014/061653 | 4/2014 |
| WO | WO-2014/098238 | 6/2014 |
| WO | WO-2015/136881 | 9/2015 |
| WO | WO-2015/163356 | 10/2015 |
| WO | WO-2018/211375 | 11/2018 |

OTHER PUBLICATIONS

Shi et al. "Enhanced cycling stability of Li[Li0.2Mn0.54Ni0.13Co0.13]O2 by surface modification of MgO with melting impregnation method." Electrochimica Acta 88 (2013) 671-679. (Year: 2013).*

Ermete Antolini. "LiCoO2: formation, structure, lithium and oxygen nonstoichiometry, electrochemical behavior and transport properties." Solid State Ionics 170 (2004) 159-171. (Year: 2004).*

Daheron et al. "Surface Properties of LiCoO2 Investigated by XPS Analyses and Theoretical Calculations." J. Phys. Chem. C. 2009, 113, 5843-5852 (Year: 2009).*

Mukai.K et al., "Magnetic properties of the chemically delithiated LixMn2O4 with $0.07 \leq x \leq 1$", Journal of Solid State Chemistry, May 1, 2011, vol. 184, No. 5, pp. 1096-1104.

Wang.Z et al., "EELS analysis of cation valence states and oxygen vacancies in magnetic oxides", Micron, Oct. 1, 2000, vol. 31, No. 5, pp. 571-580, Elsevier.

Tan.H et al., "Oxidation state and chemical shift investigation in transition metal oxides by EELS", Ultramicroscopy, May 1, 2012, vol. 116, pp. 24-33, Elsevier.

Berbenni.V et al., "Thermogravimetry and X-Ray Diffraction Study of the Thermal Decomposition Processes in Li2Co3—MnCO3 Mixtures", Journal of Analytical and Applied Pyrolysis, 2002, vol. 62, pp. 45-62.

Taguchi.N et al., "Characterization of MgO-coated-LiCoO2 particles by analytical transmission electron microscopy", Journal of Power Sources , 2016, vol. 328, pp. 161-166, Elsevier.

Khedr.A et al., "Synthesis, Structure, and Electrochemistry of Sm-Modified LiMn2O4 Cathode Materials for Lithium-Ion Batteries", J. Electron. Mater.(Journal of Electronic Materials), Apr. 23, 2013, vol. 42, No. 6, pp. 1275-1281.

Yamamoto.K et al., "In situ Total-Reflection Fluorescence X-Ray Absorption Spectroscopic Study on Stability at LiFePO4 / Elecrtrolyte Interface", 224th ECS Meeting Abstract, Oct. 27, 2013, p. 923.

Yamamoto.K et al., "Stabilization of the Electronic Structure at the Cathode/Electrolyte Interface via MgO Ultra-thin Layer during Lithium-ions Insertion/Extraction", Electrochemistry, Oct. 5, 2014, vol. 82, No. 10, pp. 891-896.

Wang.Z et al., "Electrochemical Evaluation and Structural Characterization of Commercial LiCoO2 Surfaces Modified with MgO for Lithium-Ion Batteries", J. Electrochem. Soc. (Journal of the Electrochemical Society), Mar. 4, 2002, vol. 149, No. 4, pp. A466-A471.

(56) References Cited

OTHER PUBLICATIONS

Lee.Y et al., "Phase Transitions of Bare and Coated LixCoO2 (x=0.4 and 0.24) at 300° C.", J. Electrochem. Soc. (Journal of the Electrochemical Society), Jul. 28, 2005, vol. 152, No. 9, pp. A1824-A1827.
Gabrisch.H et al., "Hexagonal to Cubic Spinel Transformation in Lithiated Cobalt Oxide TEM Investigation", J. Electrochem. Soc. (Journal of the Electrochemical Society), 2004, vol. 151, No. 6, pp. A891-A897.
Geder.J et al., "Impact of active material surface area on thermal stability of LiCoO2 cathode", Journal of Power Sources, Jul. 1, 2014, vol. 257, pp. 286-292, Elsevier.
International Search Report (Application No. PCT/IB2017/056168) dated Jan. 16, 2018.
Written Opinion (Application No. PCT/IB2017/056168) dated Jan. 16, 2018.
Thackeray.M et al., "Li2MnO3-stabilized LiMO2(M=Mn, Ni, Co) electrodes for lithium-ion batteries", J. Mater. Chem. (Journal of Materials Chemistry), 2007, vol. 17, pp. 3112-3125.
Lee.S et al., "Antiferromagnetic ordering in Li2MnO3 single crystals with a two-dimensional honeycomb lattice", Journal of Physics: Condensed Matter, Nov. 14, 2012, vol. 24, No. 45, pp. 456004-1-456004-9.
Dreyer.D et al., "The Chemistry of Graphene Oxide", Chemical Society Reviews, Nov. 3, 2009, vol. 39, No. 1, pp. 228-240.
Johnson.C et al., "Lithium-manganese oxide electrodes with layered-spinel composite structures xLi2MnO3 • (1-x)Li1+yMn2-yO4(0<x<1,0≤y≤0.33) for lithium batteries", Electrochemistry Communications, May 1, 2005, vol. 7, No. 5, pp. 528-536, Elsevier.
Katsuno.H et al., "Growth modes in two-dimensional heteroepitaxy on an elasticsubstrate", J. Cryst. Growth (Journal of Crystal Growth), Feb. 15, 2005, vol. 275, No. 1-2, pp. e283-e288, Elsevier.
McCalla.E et al., "The spinel and cubic rocksalt solid-solutions in the Li—Mn—Ni oxide pseudo-ternary system", Solid State Ionics, May 2, 2013, vol. 242, pp. 1-9, Elsevier.
Sun.Y et al., "High-energy cathode material for long-life and safe lithium batteries", Nature Materials, Mar. 22, 2009, vol. 8, pp. 320-324.
Yano.A et al., "LiCoO2 Degradation Behavior in the High-Voltage Phase Transition Region and Improved Reversibility with Surface Coating", J. Electrochem. Soc. (Journal of the Electrochemical Society), 2017, vol. 164, No. 1, pp. A6116-A6122.
Liu.A et al., "Synthesis of Mg and Mn Doped LiCoO2 and Effects on High Voltage Cycling", J. Electrochem. Soc. (Journal of the Electrochemical Society), Jun. 2, 2017, vol. 164, No. 7, pp. A1655-A1664.
Mladenov.M et al., "Effect of Mg doping and MgO-surface modification on the cycling stability of LiCoO2 electrodes.", Electrochemistry Communications, Aug. 1, 2001, vol. 3, No. 8, pp. 410-416.
Koyama.Y et al., "Co K-edge XANES of LiCoO2 and CoO2 with a variety of structures by supercell density functional calculations with a core hole", Phys. Rev. B (Physical Review. B), Feb. 27, 2012, vol. 85, No. 7, pp. 075129-1-075129-7.
Quinlan.R et al., "XPS Investigation of the Electrolyte Induced Stabilization of LiCoO2 and "AlPO4"-Coated LiCoO2 Composite Electrodes", J. Electrochem. Soc. (Journal of the Electrochemical Society), Dec. 3, 2015, vol. 163, No. 2, pp. A300-A308.
Hong.W et al., "Modification of LiCoO2 by Surface Coating with MgO/TiO2/SiO2 for High-Performance Lithium-Ion Battery", Electrochemical and Solid-State Letters, Dec. 20, 2005, vol. 9, No. 2, pp. A82-A85.
Park.S et al., "Novel Surface Modification Technique to Improve Electrochemical Performance of LiCoO2 at High Voltage", Electrochemical and Solid-State Letters, Apr. 21, 2005, vol. 8, No. 6, pp. A299-A302.
Jo.C et al., "An effective method to reduce residual lithium compounds on Ni-rich Li[Ni0.6Co0.2Mn0.2]O2 active material using a phosphoric acid derived Li3PO4 nanolayer", Nano Research, Dec. 4, 2014, vol. 8, No. 5, pp. 1464-1479, Springer.
Tebbe.J et al., "Mechanisms of LiCoO2 Cathode Degradation by Reaction with HF and Protection by Thin Oxide Coatings", ACS Applied Materials & Interfaces, Oct. 12, 2015, vol. 7, No. 43, pp. 24265-24278.
Bensalah.N et al., "Review on Synthesis, Characterizations, and Electrochemical Properties of Cathode Materials for Lithium Ion Batteries", Journal of Material Science & Engineering, 2016, vol. 5, No. 4, pp. 1000258-1-1000258-21.
Lu.Y et al., "Recent progress on lithium-ion batteries with high electrochemical performance", Science China Chemistry, Feb. 25, 2019, vol. 62, No. 5, pp. 533-548.
Xiao.B, "Surface Modifification of Electrode Materials for Lithium-Ion Batteries", Graduate Program in Mechanical and Materials Engineering, 2006, pp. 1-235.
Ohnishi.M et al., "Investigation of the surface degradation of LiCoO2 particles in the cathode materials of Li-ion batteries using FIB-TOF-SIMS", Journal of Surface Analysis, 2013, vol. 20, No. 2, pp. 99-110.
Iwaya.K et al., "Impact of Lithium-Ion Ordering on Surface Electronic States of LixCoO2", Phys. Rev. Lett. (Physical Review Letters), Sep. 20, 2013, vol. 111, No. 12, pp. 126104-1-126104-5.
Zou.M et al., "Synthesis of High-Voltage (4.5 V) Cycling Doped LiCoO2 for Use in Lithium Rechargeable Cells", Chem. Mater. (Chemistry of Materials), Dec. 16, 2003, vol. 15, No. 25, pp. 4699-4702.
Joshi.T et al., "Effects of Dissolved Transition Metals on the Electrochemical Performance and SEI Growth in Lithium-Ion Batteries", J. Electrochem. Soc. (Journal of the Electrochemical Society), 2014, vol. 161, No. 12, pp. A1915-A1921.
Chung.K et al., "Structural Studies on the Effects of ZrO2 Coating on LiCoO2 during Cycling Using in Situ X-Ray Diffraction Technique", J. Electrochem. Soc. (Journal of the Electrochemical Society), 2006, vol. 153, No. 11, pp. A2152-A2157.
Liu.L et al., "Electrochemical and In Situ Synchrotron XRD Studies on Al2O3-Coated LiCoO2 Cathode Material", J. Electrochem. Soc. (Journal of the Electrochemical Society), 2004, vol. 151, No. 9, pp. A1344-A1351.
Chen.Z et al., "Staging Phase Transitions in LixCoO2", J. Electrochem. Soc. (Journal of the Electrochemical Society), 2002, vol. 149, No. 12, pp. A1604-A1609.
Shim.J et al., "Characterization of Spinel LixCo2O4-Coated LiCoO2 Prepared with Post-Thermal Treatment as a Cathode Material for Lithium Ion Batteries", Chem. Mater. (Chemistry of Materials), Apr. 10, 2015, vol. 27, No. 9, pp. 3273-3279.
Okumura.T et al., "Correlation of lithium ion distribution and X-ray absorption near-edge structure in O3- and O2-lithium cobalt oxides from first-principle calculation", Journal of Materials Chemistry, 2012, vol. 22, pp. 17340-17348.
Motohashi.T et al., "Electronic phase diagram of the layered cobalt oxide system LixCoO2 (0.0 ≤x≤1.0)", Phys. Rev. B (Physical Review. B), Oct. 9, 2009, vol. 80, No. 16, pp. 165114-1-155114-9.
Counts.W et al., "Fluoride Model Systems: II, The Binary Systems CaF2—BeF2, MgF2—BeF2, and LiF—MgF2", J. Am. Ceram. Soc. (Journal of the American Ceramic Society), 1953, vol. 36, No. 1, pp. 12-17.
Tukamoto.H et al., "Electronic Conductivity of LiCoO2 and Its Enhancement by Magnesium Doping", J. Electrochem. Soc. (Journal of the Electrochemical Society), Sep. 1, 1997, vol. 144, No. 9, pp. 3164-3168.
Ohzuku.T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.
Amatucci.G et al., "CoO2, the End Member of the LixCoO2 Solid Solution", J. Electrochem. Soc. (Journal of the Electrochemical Society), Mar. 1, 1996, vol. 143, No. 3, pp. 1114-1123.
Wang.Z et al., "Structural and electrochemical characterizations of surface-modified LiCoO2 cathode materials for Li-ion batteries", Solid State Ionics, Jun. 2, 2002, vol. 148, No. 3-4, pp. 335-342, Elsevier.

(56) References Cited

OTHER PUBLICATIONS

Zou.M et al., "Synthesis and Electrochemical Performance of High Voltage Cycling LiM0.05Co0.95O2 as Cathode Material for Lithium Rechargeable Cells", Electrochemical and Solid-State Letters, 2004, vol. 7, No. 7, pp. A176-A179.
Wang.Z et al., "Improving the cycling stability of LiCoO2 at 4.5 V through co-modification by Mg doping and zirconium oxyfluoride coating", Ceramics Internationa, 2015, vol. 41, No. 1, pp. 469-474.
Cho.Y et al., "High Performance LiCoO2 Cathode Materials at 60° C. for Lithium Secondary Batteries Prepared by the Facile Nanoscale Dry-Coating Method", J. Electrochem. Soc. (Journal of the Electrochemical Society), 2010, vol. 157, No. 5, pp. A617-A624.
Wang.Z et al., "Mg doping and zirconium oxyfluoride coating co-modification to enhance the high-voltage performance of LiCoO2 for lithium ion battery", Journal of Alloys and Compounds, Feb. 5, 2015, vol. 621, pp. 212-219.
Kweon.H et al., "Effects of metal oxide coatings on the thermal stability and electrical performance of LiCoCO2 in a Li-ion cell", Journal of Power Sources, Feb. 16, 2004, vol. 126, pp. 156-162, Elsevier.
Shim.J et al., "Effects of MgO Coating on the Structural and Electrochemical Characteristics of LiCoO2 as Cathode Materials for Lithium Ion Battery", Chem. Mater. (Chemistry of Materials), Mar. 24, 2014, vol. 26, No. 8, pp. 2537-2543.
Zhao.H et al., "Improvement of electrochemical stability of LiCoO2 cathode by a nano-crystalline coating", Journal of Power Sources, May 20, 2004, vol. 132, pp. 195-200, Elsevier.
Iriyama.Y et al., "Effects of surface modification by MgO on interfacial reaction of lithium cobalt oxide thin film electrode", Journal of Power Sources, Oct. 5, 2004, vol. 137, pp. 111-116, Elsevier.
Shim.J et al., "Effects of MgO Coating on the Structural and Electrochemical Characteristics of LiCoO2 as Cathode Materials for Lithium Ion Battery", Chem. Mater. (Chemistry of Materials), [e.g. ), Suppor] Supporting Information, Mar. 24, 2014, vol. 26, No. 8, pp. 31-33.
Orikasa.Y et al., "Origin of Surface Coating Effect for MgO on LiCoO2 to Improve the Interfacial Reaction between Electrode and Electrolyte", Adv. Mater. Interfaces (Advanced Materials Interfaces), Aug. 28, 2014, vol. 1, No. 9, pp. 1400195-1-1400195-8.
Shim.J et al., "Synergistic effects of coating and doping for lithium ion battery cathode materials: synthesis and characterization of lithium titanate-coated LiCoO2 with Mg doping", Electrochimica Acta, Dec. 20, 2015, vol. 186, pp. 201-208, Eleseveir.
Benecke.M et al., "Effect of LiF on Hot-Pressing of MgO", J. Am. Ceram. Soc. (Journal of the American Ceramic Society), Jul. 1, 1967, vol. 50, No. 7, pp. 365-368.
Hart.P et al., "Densification Mechanisms in Hot-Pressing of Magnesia with a Fugitive Liquid", J. Am. Ceram. Soc. (Journal of the American Ceramic Society), Feb. 1, 1970, vol. 53, No. 2, pp. 83-86.
Belsky.A et al., "New developments in the Inorganic Crystal Structure Database (ICSD): Accessibility in support of materials research and design", Acta. Cryst.(Acta Crystallographica Section B), Jun. 1, 2002, vol. B58, No. 3, pp. 364-369.
Alcantara.R et al., "SPES, 6Li MAS NMR, and Ni3+ EPR evidence for the formation of Co2+-containing spinel phases in LiCoO2 cycled electrode materials", Journal of Electroanalytical Chemistry, Aug. 28, 1998, vol. 454, No. 1-2, pp. 173-181.
Antaya.M et al., "Preparation and Characterization of LiCoO2 Thin Films by Laser Ablation Deposition", J. Electrochem. Soc. (Journal of the Electrochemical Society), Mar. 1, 1993, vol. 140, No. 3, pp. 575-578.
Cho.J et al., "Comparison of Al2O3- and AlPO4-coated LiCoO2 cathode materials for a Li-ion cell", Journal of Power Sources, 2005, vol. 146, pp. 58-64, Elsevier.
Jin.Y et al., "Electrochemical Characterizations of Commercial LiCoO2 Powders with Surface Modified by Li3PO4 Nanoparticles", Electrochemical and Solid-State Letters, Apr. 3, 2006, vol. 9, No. 6, pp. A273-A276.
Eom.J et al., "M3(PO4)2-Nanoparticle-Coated LiCoO2 vs LiCo0.96M0.04O2(M=Mg and Zn) on Electrochemical and Storage Characteristics", J. Electrochem. Soc. (Journal of the Electrochemical Society), Jan. 8, 2008, vol. 155, No. 3, pp. A201-A205.
Kim.Y et al., "Suppression of Cobalt Dissolution from the LiCoO2 Cathodes with Various Metal-Oxide Coatings", J. Electrochem. Soc. (Journal of the Electrochemical Society), 2003, vol. 150, No. 12, pp. A1723-A1725.
Fang.T et al., "Effect of calcination temperature on the electrochemical behavior of ZnO-coated LiCoO2 cathode", Surface & Coatings Technology , Apr. 19, 2006, vol. 201, No. 3-4, pp. 1886-1893, Elsevier.
Schipper.F et al., "Study of Cathode Materials for Lithium-Ion Batteries: Recent Progress and New Challenges", Inorganics, Apr. 28, 2017, vol. 5, No. 2, pp. 1-29.
Xia.H et al., "Phase Transitions and High-Voltage Electrochemical Behavior of LiCoO2 Thin Films Grown by Pulsed Laser Deposition", J. Electrochem. Soc. (Journal of the Electrochemical Society), 2007, vol. 154, No. 4, pp. A337-A342.
Sun.Y et al., "Role of AlF3 Coating on LiCoO2 Particles during Cycling to Cutoff Voltage above 4.5 V", J. Electrochem. Soc. (Journal of the Electrochemical Society), 2009, vol. 156, No. 12, pp. A1005-A1010.
Araki.K et al., "Electrochemical properties of LiNi1/3Co1/3Mn1/3O2 cathode material modified by coating with Al2O3 nanoparticles", Journal of Power Sources, 2014, vol. 269, pp. 236-243.
Kim.H et al., "Capacity fading behavior of Ni-rich layered cathode materials in Li-ion full cells", Journal of Electroanalytical Chemistry, 2016, vol. 782, pp. 168-173.
Lin.F et al., "Surface reconstruction and chemical evolution of stoichiometric layered cathode materials for lithium-ion batteries", Nature Communications, Mar. 27, 2014, vol. 5, pp. 3529-1-3529-9.
Yano.A et al., "Surface Structure and High-Voltage Charge/Discharge Characteristics of Al-Oxide Coated LiNi1/3Co1/3Mn1/3O2 Cathodes", J. Electrochem. Soc. (Journal of the Electrochemical Society), 2015, vol. 162, No. 2, pp. A3137-A3144.
Yano.A et al., "Surface Structure and High-Voltage Charging/Discharging Performance of Low-Content Zr-Oxide-Coated LiNi1/3Co1/3Mn1/3O2", J. Electrochem. Soc. (Journal of the Electrochemical Society), 2016, vol. 163, No. 2, pp. A75-A82.
Ding.Y et al., "Preparation of nano-structured LiFePO4/graphene composites by co-precipitation method", Electrochemistry Communications, 2010, vol. 12, No. 1, pp. 10-13, Elsevier.
Ceder.G et al., "Identification of cathode materials for lithium batteries guided by first-principles calculations", Nature, Apr. 16, 1998, vol. 392, pp. 694-696.
Gopukumar.S et al., "Synthesis and electrochemical performance of tetravalent doped LiCoO2 in lithium rechargeable cells", Solid State Ionics, 2003, vol. 159, pp. 223-232, Elsevier.

\* cited by examiner

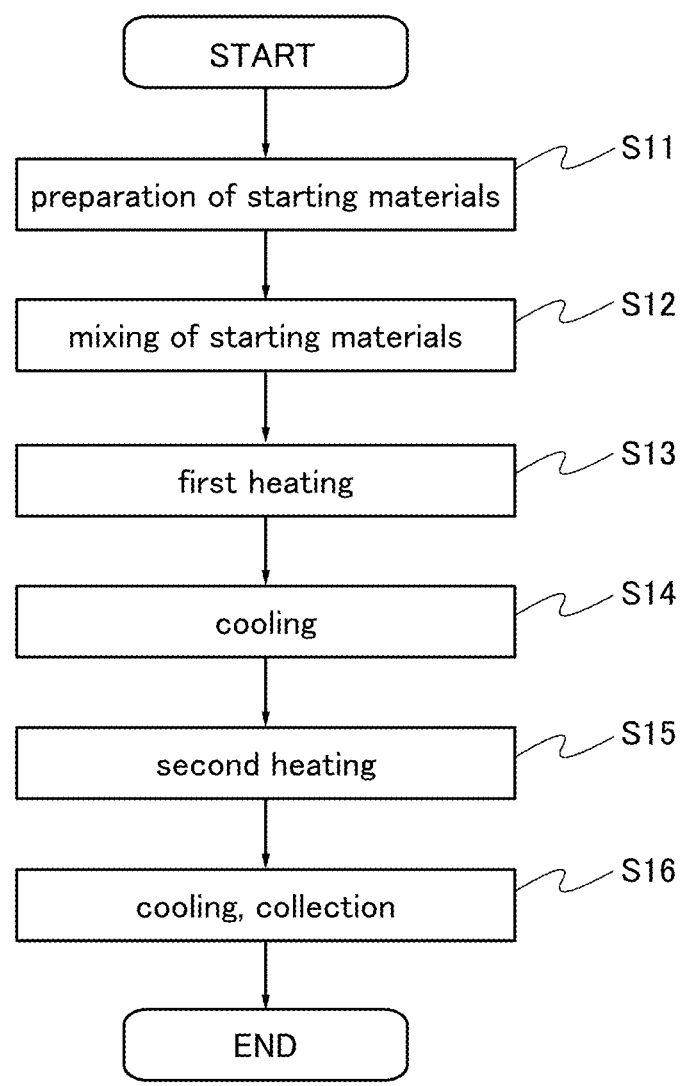

200

FIG. 7A1
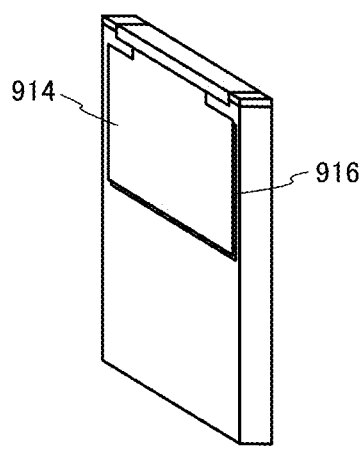
FIG. 7A2
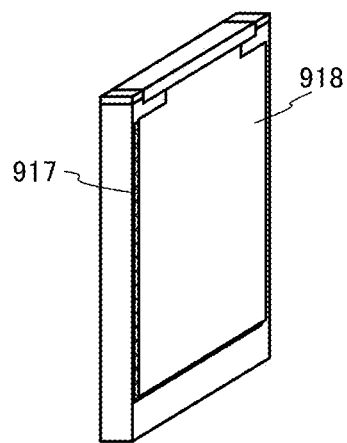
FIG. 7B1
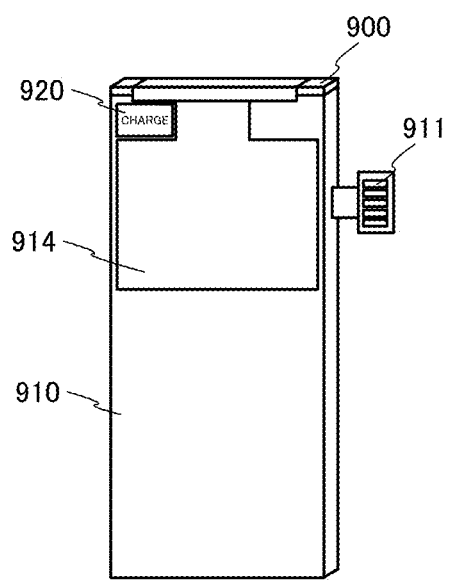
FIG. 7B2
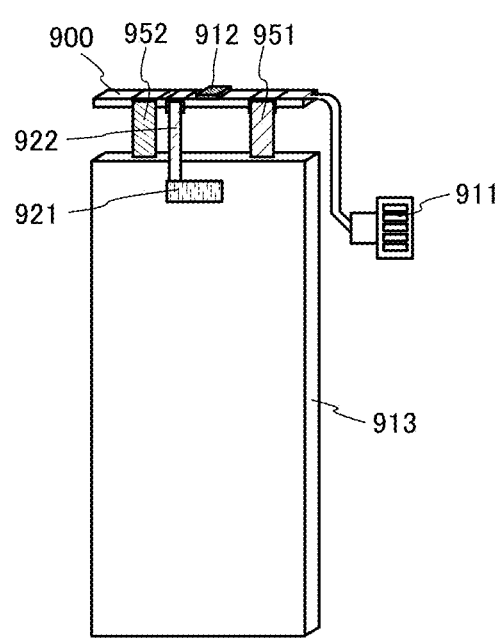

FIG. 15A
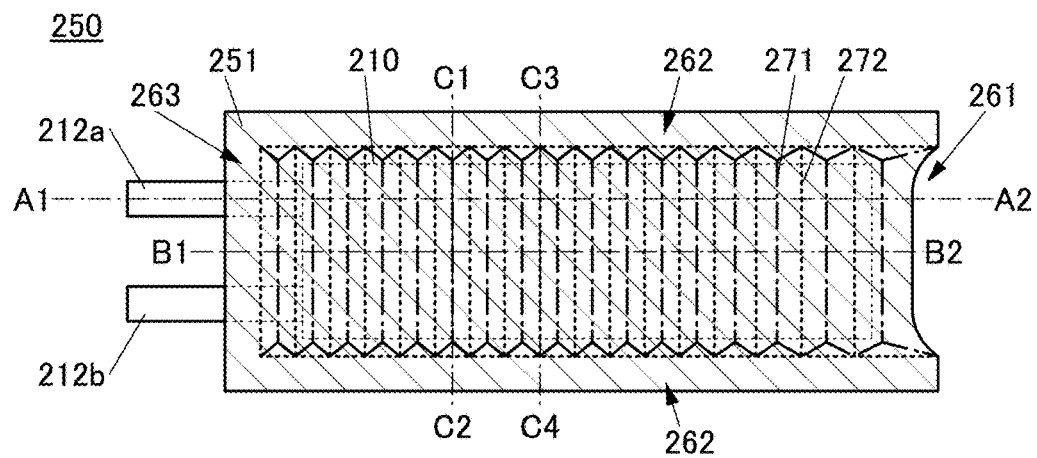
FIG. 15B1
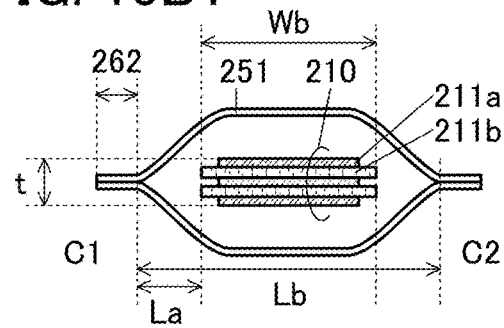
FIG. 15B2
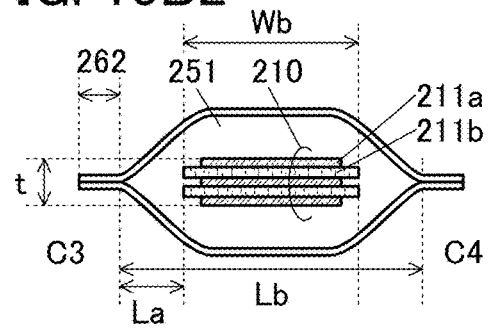
FIG. 15C
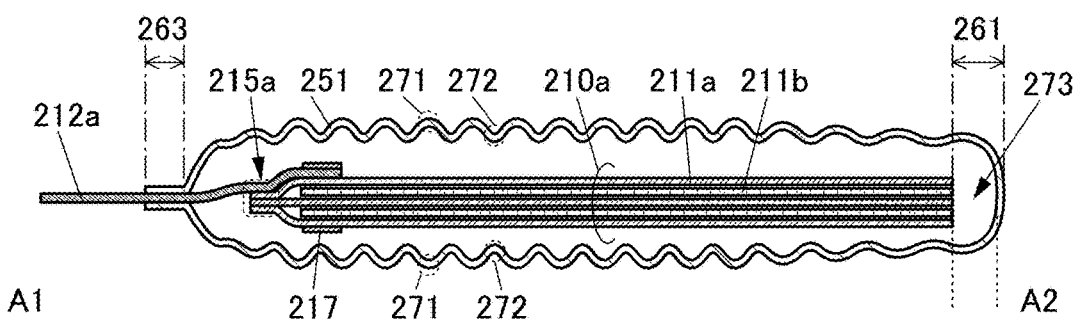
FIG. 15D
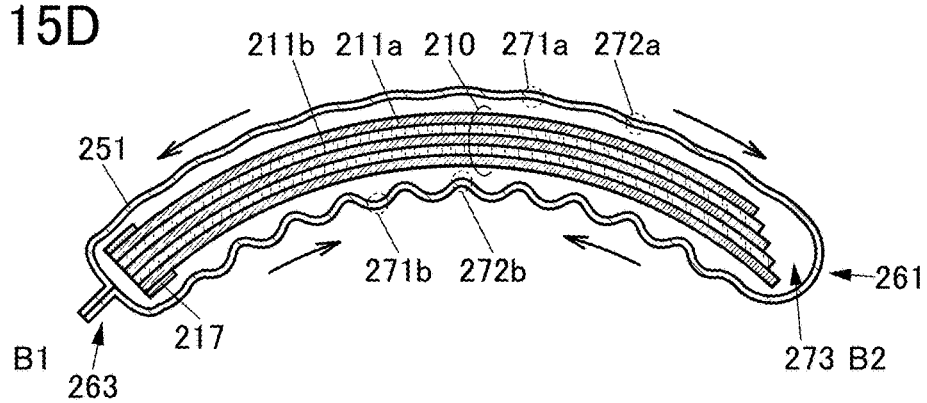

FIG. 37A1
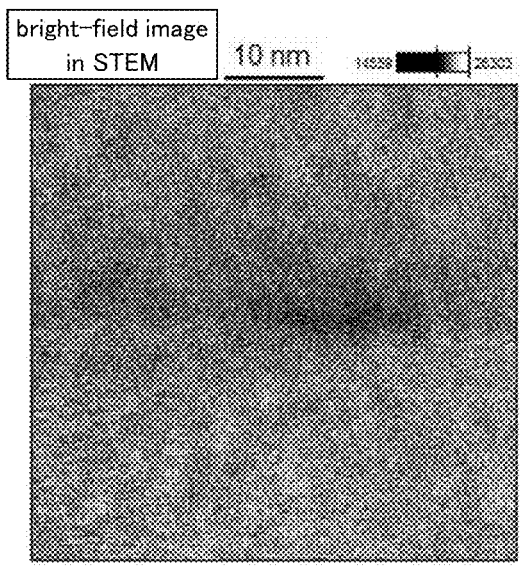
FIG. 37A2
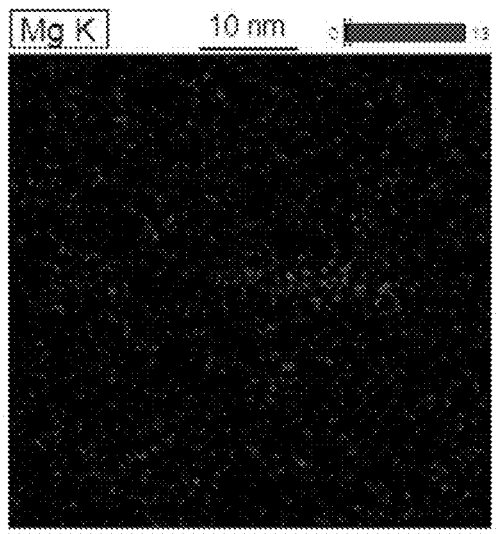
FIG. 37B1
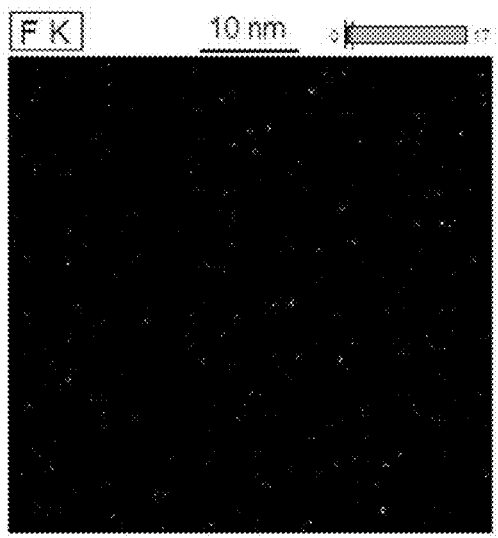
FIG. 37B2
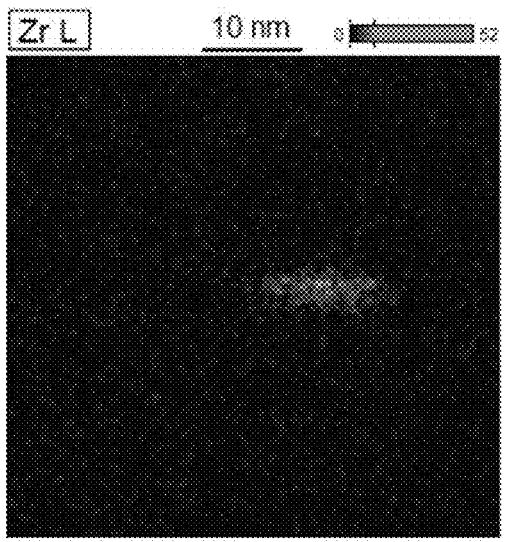

3 nm 1 nm

FIG. 48A1
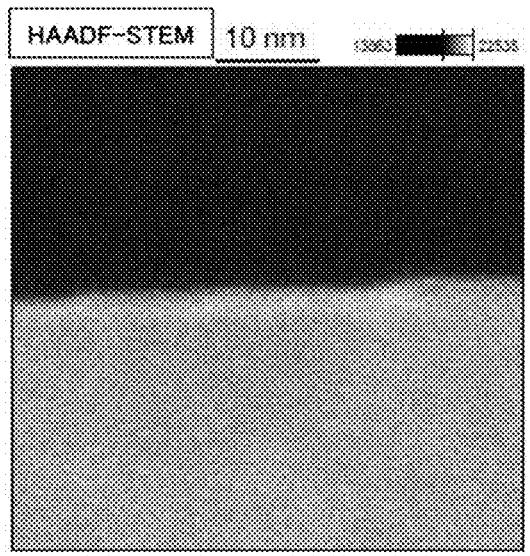
FIG. 48A2
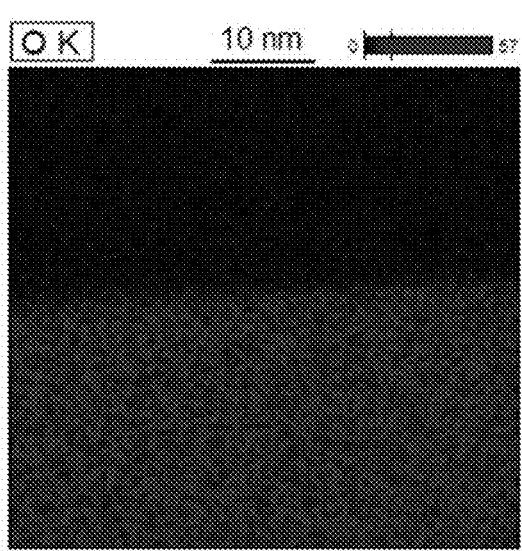
FIG. 48B1
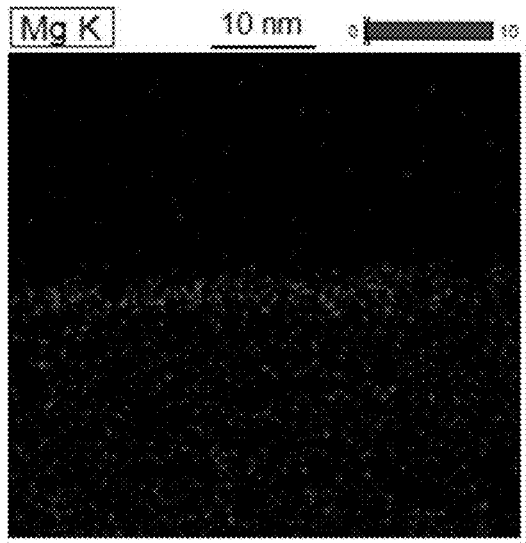
FIG. 48B2
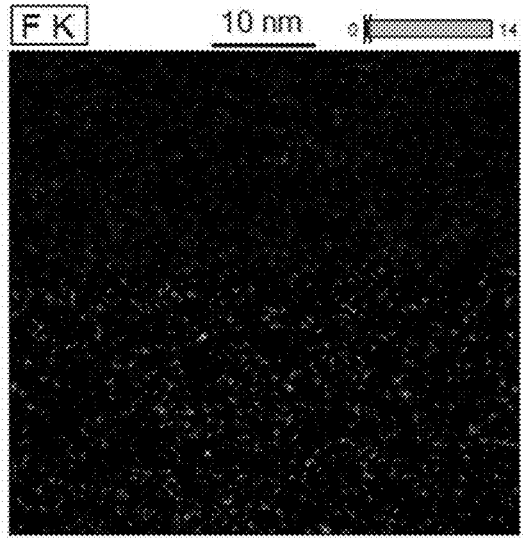

FIG. 49A1
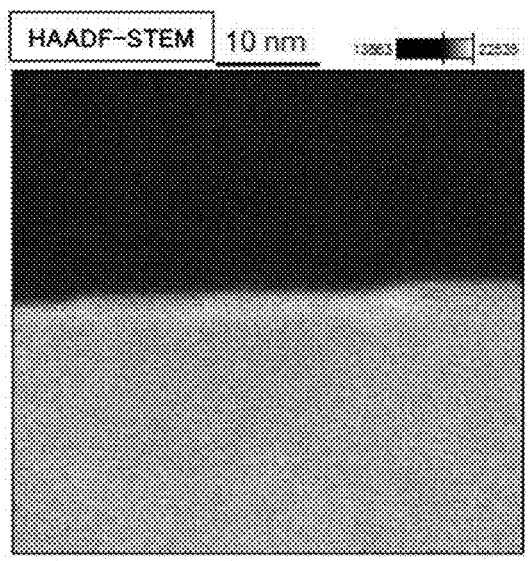
FIG. 49A2
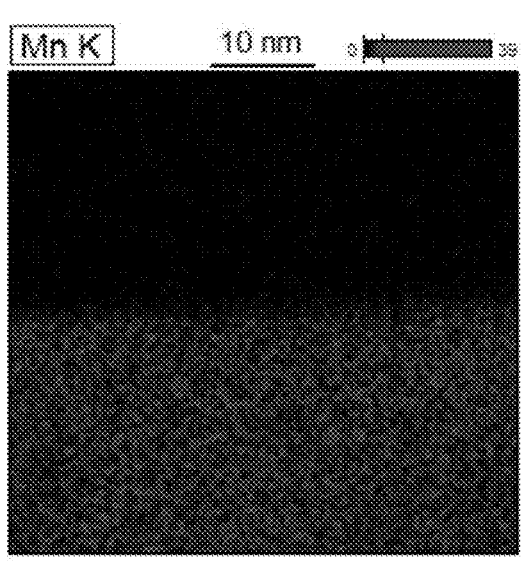
FIG. 49B1
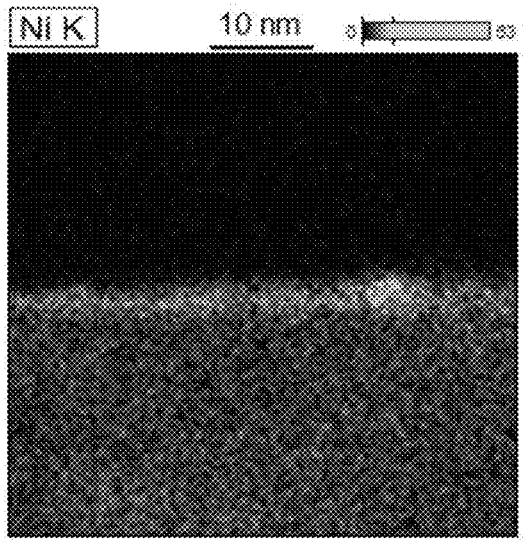
FIG. 49B2
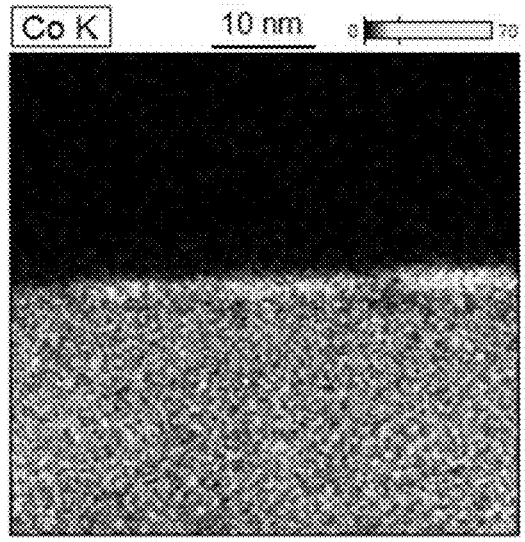

*4: ca. 10 nm from the surface
*5: ca. 100 nm from the surface
*6: near the center

US 11,094,927 B2

POSITIVE ELECTRODE ACTIVE MATERIAL PARTICLE AND MANUFACTURING METHOD OF POSITIVE ELECTRODE ACTIVE MATERIAL PARTICLE

TECHNICAL FIELD

One embodiment of the present invention relates to an object, a method, or a manufacturing method. The present invention relates to a process, a machine, manufacture, or a composition of matter. One embodiment of the present invention relates to a semiconductor device, a display device, a light-emitting device, a power storage device, a lighting device, an electronic device, or a manufacturing method thereof. In particular, one embodiment of the present invention relates to a positive electrode active material that can be used in a secondary battery, a secondary battery, and an electronic device including a secondary battery.

In this specification, the power storage device is a collective term describing units and devices having a power storage function. For example, a storage battery such as a lithium-ion secondary battery (also referred to as secondary battery), a lithium-ion capacitor, and an electric double layer capacitor are included in the category of the power storage device.

Note that electronic devices in this specification mean all devices including power storage devices, and electro-optical devices including power storage devices, information terminal devices including power storage devices, and the like are all electronic devices.

BACKGROUND ART

In recent years, a variety of power storage devices such as lithium-ion secondary batteries, lithium-ion capacitors, and air batteries have been actively developed. In particular, a demand for lithium-ion secondary batteries with high output and high capacity has rapidly grown with the development of the semiconductor industry, for portable information terminals such as mobile phones, smartphones, and laptop computers, portable music players, and digital cameras; medical equipment; next-generation clean energy vehicles such as hybrid electric vehicles (HEV), electric vehicles (EV), and plug-in hybrid electric vehicles (PHEV); and the like. The lithium-ion secondary batteries are essential as rechargeable energy supply sources for today's information society.

The performance currently required for lithium-ion secondary batteries includes increased capacity, improved cycle characteristics, safe operation under a variety of environments, and longer-term reliability.

It is known to increase the capacity of a lithium ion secondary battery by increasing the charging voltage. For example, the capacity of lithium cobalt oxide, which is often used as a positive electrode active material of a lithium ion secondary battery, is 155 mAh/g when the charging voltage is 4.3 V, and is 220 mAh/g when the charging voltage is increased to 4.6 V (see FIG. 21A).

However, it is known that the cycle characteristics deteriorate due to the increased charging voltage. For example, in general, the capacity retention percentage of lithium cobalt oxide is 95% or more after 30 cycles when the charging voltage is 4.4 V, but is decreased to 50% or less after 30 cycles when the charging voltage is increased to 4.6 V (see FIG. 21B).

Thus, improvement of a positive electrode active material has been studied to increase the cycle characteristics and the capacity of the lithium ion secondary battery (Patent Document 1 and Patent Document 2).

PATENT DOCUMENT

[Patent Document 1] Japanese Published Patent Application No. 2012-018914
[Patent Document 2] Japanese Published Patent Application No. 2016-076454

DISCLOSURE OF INVENTION

That is, development of lithium ion secondary batteries and positive electrode active materials used therein is susceptible to improvement in terms of capacity, cycle characteristics, charge and discharge characteristics, reliability, safety, cost, and the like.

An object of one embodiment of the present invention is to provide a positive electrode active material which suppresses a reduction in capacity due to charge and discharge cycles when used in a lithium ion secondary battery. Another object of one embodiment of the present invention is to provide a high-capacity secondary battery. Another object of one embodiment of the present invention is to provide a secondary battery with excellent charge and discharge characteristics. Another object of one embodiment of the present invention is to provide a highly safe or highly reliable secondary battery.

Another object of one embodiment of the present invention is to provide a novel material, active material, storage device, or a manufacturing method thereof.

Note that the descriptions of these objects do not disturb the existence of other objects. In one embodiment of the present invention, there is no need to achieve all the objects. Other objects can be derived from the description of the specification, the drawings, and the claims.

In order to achieve the objects, one embodiment of the present invention is characterized in that a covering layer is formed on a superficial portion of a positive electrode active material by segregation.

One embodiment of the present invention is a positive electrode active material. The positive electrode active material includes a first region and a second region. The first region exists in an inner portion of the positive electrode active material. The second region exists in a superficial portion of the positive electrode active material and part of the inner portion of the positive electrode active material. The first region includes lithium, a transition metal, and oxygen. The second region includes magnesium, fluorine, and oxygen.

One embodiment of the present invention is a positive electrode active material. The positive electrode active material includes lithium, a transition metal, oxygen, magnesium, and fluorine. The total atom amount of the lithium, the transition metal, the oxygen, the magnesium, and the fluorine on a surface of the positive electrode active material that is measured by X-ray photoelectron spectroscopy is taken as 100 atomic %. A concentration of the magnesium on the surface of the positive electrode active material that is measured by X-ray photoelectron spectroscopy is 1 atomic % or more and 16 atomic % or less. A concentration of the fluorine on the surface of the positive electrode active material that is measured by X-ray photoelectron spectroscopy is 0.2 atomic % or more and 4 atomic % or less.

One embodiment of the present invention is a positive electrode active material. The positive electrode active material includes lithium, a transition metal, oxygen, magnesium, and fluorine. A ratio between a concentration of magnesium and fluorine on a surface of the positive electrode active material that is measured by X-ray photoelectron spectroscopy is Mg:F=y:1 (3≤y≤5).

One embodiment of the present invention is a positive electrode active material. The positive electrode active material includes lithium, a transition metal, oxygen, magnesium, and fluorine. A peak position of a bonding energy of the fluorine on a surface of the positive electrode active material that is measured by X-ray photoelectron spectroscopy is 682 eV or more and less than 685 eV.

In the above, the transition metal preferably includes cobalt. Alternatively, the transition metal preferably includes manganese, cobalt, and nickel.

One embodiment of the present invention is a positive electrode active material including a first region and a second region. The first region exists in an inner portion of the positive electrode active material. The first region includes lithium, a transition metal, and oxygen. The first region has a layered rock-salt crystal structure. The second region exists in a superficial portion of the positive electrode active material and part of the inner portion of the positive electrode active material. The second region includes magnesium, fluorine, and oxygen. The second region has a rock-salt crystal structure. Orientations of the crystal in the first region and the crystal in the second region are aligned with each other. A ratio between a concentration of the magnesium and the fluorine on a surface of the positive electrode active material that is measured by X-ray photoelectron spectroscopy is Mg:F=y:1 (3≤y≤5).

In the above, a peak position of a bonding energy of the fluorine on a surface of the positive electrode active material that is measured by X-ray photoelectron spectroscopy is preferably 682 eV or more and less than 685 eV.

One embodiment of the present invention is a manufacturing method of a positive electrode active material including a step of mixing a lithium source, a transition metal source, a magnesium source, and a fluorine source, a heating step at 800° C. or higher and 1100° C. or lower for 2 hours or more and 20 hours or less, and a heating step in an oxygen-containing atmosphere at 500° C. or higher and 1200° C. or lower for a retention time of 50 hours or less. An atomic ratio between the fluorine contained in the fluorine source and the magnesium contained in the magnesium source is Mg:F=1:x (1.5≤x≤4).

One embodiment of the present invention is a positive electrode active material including a first region and a second region. The first region exists in an inner portion of the positive electrode active material. The first region includes lithium, cobalt, and oxygen. The second region includes cobalt, magnesium, fluorine, and oxygen. $L_3/L_2$ of the cobalt included in the first region is less than 3.8 and $L_3/L_2$ of the cobalt included in the second region is 3.8 or more when the positive electrode active material is measured by electron energy loss spectroscopy.

According to one embodiment of the present invention, a positive electrode active material which suppresses a reduction in capacity due to charge and discharge cycles when used in a lithium ion secondary battery is provided. A lithium secondary battery with high capacity can be provided. A secondary battery with excellent charge and discharge characteristics can be provided. A highly safe or highly reliable secondary battery can be provided. A novel material, active material, storage device, or formation method thereof can be provided.

BRIEF DESCRIPTION OF DRAWINGS

FIG. 2 shows an example of a manufacturing method of the positive electrode active material.

FIGS. 7A1 to 7B2 illustrate an example of a secondary battery.

FIGS. 15A and 15D illustrate a bendable secondary battery.

FIGS. 37A1 to 37B2 are a STEM image and EDX mappings of a positive electrode active material in Example 3.

FIGS. 48A1 to 48B2 are a STEM image and EDX mappings of a positive electrode active material in Example 6.

FIGS. 49A1 to 49B2 are a STEM image and EDX mappings of a positive electrode active material in Example 6.

BEST MODE FOR CARRYING OUT THE INVENTION

Figure 1A:
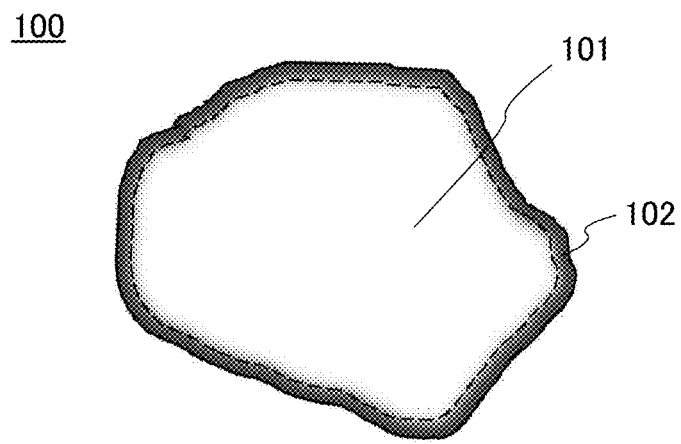
FIGS. 1A to 1C show an example of a positive electrode active material.

Hereinafter, embodiments of the present invention will be described in detail with reference to the accompanying drawings. Note that one embodiment of the present invention is not limited to the description below, and it is easily understood by those skilled in the art that modes and details of the present invention can be modified in various ways. In addition, the present invention should not be construed as being limited to the description in the embodiments given below.

Note that in drawings used in this specification, the sizes, thicknesses, and the like of components such as a positive electrode, a negative electrode, an active material layer, a separator, an exterior body are exaggerated for simplicity in some cases. Therefore, the sizes of the components are not limited to the sizes in the drawings and relative sizes between the components.

Note that in structures of the present invention described in this specification and the like, the same portions or portions having similar functions are denoted by common reference numerals in different drawings, and descriptions thereof are not repeated. Further, the same hatching pattern is applied to portions having similar functions, and the portions are not especially denoted by reference numerals in some cases.

In this specification and the like, the Miller index is used for the expression of crystal planes and orientations. In the crystallography, a superscript bar is placed over a number in the expression using the Miller index; however, in this specification and the like, crystal planes and orientations are expressed by placing a minus sign (−) at the front of a number because of expression limitations. Furthermore, an individual direction which shows an orientation in crystal is denoted by "[ ]", a set direction which shows all of the equivalent orientations is denoted by "< >", an individual direction which shows a crystal plane is denoted by "( )", and a set plane having equivalent symmetry is denoted by "{ }".

In this specification and the like, segregation refers to a phenomenon in which, in a solid made of a plurality of elements (e.g., A, B, and C), a certain element (for example, B) is non-uniformly distributed.

In this specification and the like, a layered rock-salt crystal structure included in composite oxide containing lithium and a transition metal refers to a crystal structure in which a rock-salt ion arrangement where cations and anions are alternately arranged is included and the lithium and the transition metal are regularly arranged to form a two-dimensional plane, so that lithium can be two-dimensionally diffused. Note that a defect such as a cation or anion vacancy can exist. In the layered rock-salt crystal structure, strictly, a lattice of a rock-salt crystal is distorted in some cases.

A rock-salt crystal structure refers to a structure in which cations and anions are alternately arranged. Note that a cation or anion vacancy may exist.

Anions of a layered rock-salt crystal and anions of a rock-salt crystal each form a cubic closest packed structure (face-centered cubic lattice structure). When a layered rock-salt crystal and a rock-salt crystal are in contact with each other, there is a crystal plane at which directions of cubic closest packed structures formed of anions are aligned with each other. Note that a space group of the layered rock-salt crystal is R-3m, which is different from a space group Fm-3m of a rock-salt crystal; thus, the index of the crystal plane satisfying the above conditions in the layered rock-salt crystal is different from that in the rock-salt crystal. In this specification, in the layered rock-salt crystal and the rock-salt crystal, a state where the orientations of the cubic closest packed structures formed of anions are aligned with each other can be referred to as a state where crystal orientations are substantially aligned with each other.

For example, when lithium cobalt oxide having a layered rock-salt type crystal structure and magnesium oxide having a rock-salt type crystal structure are in contact with each other, the orientation of crystals substantially is aligned in the following cases: the (1-1-4) plane of lithium cobalt oxide is in contact with the {001} plane of magnesium oxide, the (104) plane of lithium cobalt oxide is in contact with the {001} plane of magnesium oxide, the (0-14) plane of lithium cobalt oxide is in contact with {001} plane of the magnesium oxide, the (001) plane of lithium cobalt oxide is in contact with the {111} plane of magnesium oxide, the (012) plane of lithium cobalt oxide is in contact with the {111} plane of magnesium oxide, and the like.

Whether the crystal orientations in two regions are substantially aligned with each other or not can be judged by a transmission electron microscope (TEM) image, a scanning transmission electron microscope (STEM) image, a high-angle annular dark field scanning transmission electron microscopy (HAADF-STEM) image, an annular bright-field scan transmission electron microscopy (ABF-STEM) image, and the like. X-ray diffraction, electron diffraction, neutron diffraction, and the like can be used for judging. In the TEM image and the like, alignment of cations and anions can be observed as repetition of bright lines and dark lines. When the orientations of cubic closest packed structures of the layered rock-salt crystal and the rock-salt crystal are aligned with each other, a state where an angle between the repetition of bright lines and dark lines in the layered rock-salt crystal and the repetition of bright lines and dark lines in the rock-salt crystal is less than or equal to 5°, preferably less than or equal to 2.5° is observed. Note that, in the TEM image and the like, a light element such as oxygen or fluorine is not clearly observed in some cases; however, in such a case, alignment of orientations can be judged by arrangement of metal elements.

Furthermore, in this specification and the like, a state where structures of two-dimensional interfaces have similarity is referred to as "epitaxy". Crystal growth in which structures of two-dimensional interfaces have similarity is referred to as "epitaxial growth". In addition, a state where three-dimensional structures have similarity or orientations are crystallographically the same is referred to as "topotaxy". Thus, in the case of topotaxy, when part of a cross section is observed, orientations of crystals in two regions (e.g., a region serving as a base and a region formed through growth) are substantially aligned with each other.

Embodiment 1

[Structure of Positive Electrode Active Material]

First, a positive electrode active material 100, which is one embodiment of the present invention, is described with reference to FIGS. 1A to 1C. As shown in FIG. 1A, the positive electrode active material 100 includes a first region 101 and a second region 102. The second region 102 can be located over the first region 101 or can cover at least part of the first region 101.

The first region 101 has composition different from that of the second region 102. It is preferable that the second region 102 be a region where segregation of a particular element is observed. Thus, the boundary between the two regions is not clear in some cases. In FIG. 1A, the boundary between the first region 101 and the second region 102 is shown by the dotted lines, and the contrast across the dotted lines means a concentration gradient. In FIG. 1B and the following drawings, the boundary between the first region 101 and the second region 102 is shown only by the dotted lines for convenience. The details of the first region 101 and the second region 102 are described later.

Figure 1B:
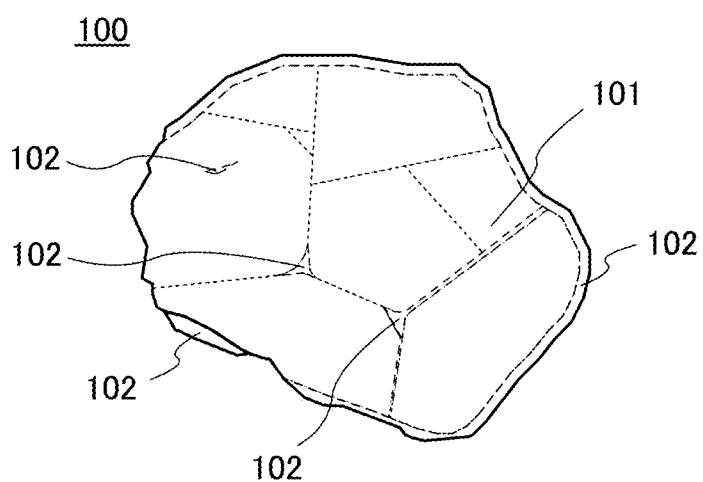
Figure 1C:
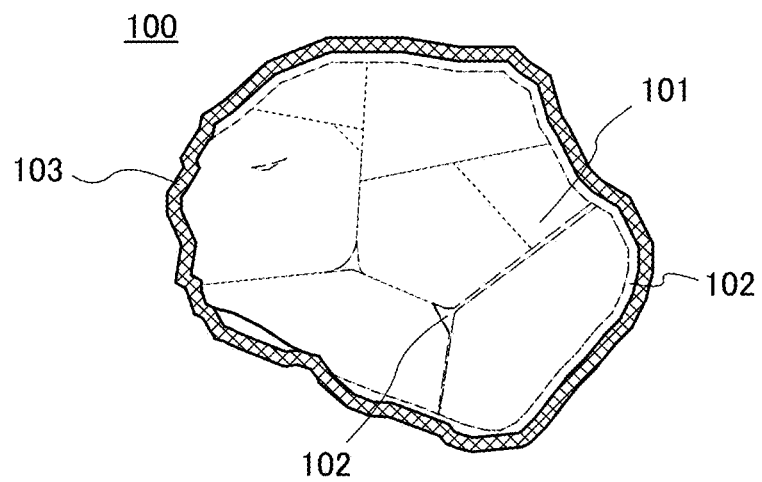

As illustrated in FIG. 1B, the second region 102 may exist in an inner portion of the positive electrode active material. For example, in the case where the first region 101 is a polycrystal, segregation of a particular element may be observed in the grain boundary or in the vicinity thereof to form the second region 102. Furthermore, segregation of a particular element may be observed in a portion which includes crystal defects in the positive electrode active material or in the vicinity thereof to form the second region 102. Note that in this specification and the like, crystal defects refer to defects which can be observed from a TEM image and the like, that is, a structure in which another element enters the crystal.

As illustrated in FIG. 1B, the second region 102 does not necessarily cover the entire first region 101.

In other words, the first region 101 exists in an inner portion of the positive electrode active material 100, and the second region 102 exists in the superficial portion of the positive electrode active material 100. In addition, the second region 102 may exist in the inner portion of the positive electrode active material 100.

For example, the first region 101 and the second region 102 can be referred to as a solid phase A and a solid phase B, respectively.

When the particle size of the positive electrode active material 100 is too large, problems occur such as difficulty in lithium diffusion and surface roughness of the active material layer in coating to a current collector. In contrast, when the particle size is too small, problems occur such as difficulty in supporting of the active material layer in coating to the current collector and over-reaction with an electrolyte. For these reasons, D50 (also referred to as a median diameter) is preferably 0.1 μm or more and 100 μm or less, further preferably 1 μm or more and 40 μm or less.

<First Region 101>

The first region 101 contains lithium, a transition metal, and oxygen. In other words, the first region 101 includes composite oxide containing lithium and a transition metal.

As the transition metal contained in the first region 101, a metal that can form lithium and layered rock-salt composite oxide is preferably used. For example, one or a plurality of manganese, cobalt, and nickel can be used. That is, as the transition metal contained in the first region 101, only cobalt may be used, cobalt and manganese may be used, or cobalt, manganese, and nickel may be used. In addition to the transition metal, the first region 101 may include a metal other than the transition metal, such as aluminum.

In other words, the first region 101 can contain a composite oxide of lithium and the transition metal, such as lithium cobalt oxide, lithium nickel oxide, lithium cobalt oxide in which manganese is substituted for part of cobalt, lithium nickel-manganese-cobalt oxide and the like, and nickel-cobalt-aluminum oxide and the like.

The first region 101 serves as a region which particularly contributes to a charge and discharge reaction in the positive electrode active material 100. To increase capacity of a secondary battery containing the positive electrode active material 100, the volume of the first region 101 is preferably larger than those of the second region 102.

The layered rock-salt crystal structure is preferable for the first region 101 because lithium is likely to be diffused two-dimensionally. In addition, when the first region 101 has a layered rock-salt crystal structure, segregation of a representative element such as magnesium, which is described later, tends to occur unexpectedly. Note that the entire first region 101 does not necessarily have a layered rock-salt crystal structure. For example, part of the first region 101 may include crystal defects, may be amorphous, or may have another crystal structure.

<Second Region 102>

The second region 102 contains magnesium, fluorine, and oxygen. For example, the second region 102 may contain magnesium oxide and part of the oxygen may be substituted with fluorine.

The second region 102 covers at least part of the first region 101. Magnesium oxide contained in the second region 102 is an electrochemically stable material that is less likely to deteriorate even when charge and discharge are repeated; thus, the second region 102 is suitable for a coating layer.

When the thickness of the second region 102 is too small, the function as a coating layer is degraded; however, when the thickness of the second region 102 is too large, the capacity is decreased. Thus, the thickness of the second region is preferably greater than or equal to 0.5 nm and less than or equal to 50 nm, further preferably greater than or equal to 0.5 nm and less than or equal to 3 nm.

The second region 102 preferably has a rock-salt crystal structure because orientations of crystals are likely to be aligned with those of the first region 101, and the second region 102 is likely to function as a stable coating layer. Note that the entire second region 102 does not necessarily have a rock-salt crystal structure. For example, part of the second region 102 may be amorphous or has another crystal structure.

In general, when charge and discharge are repeated, a side reaction occurs in a positive electrode active material, for example, a transition metal such as manganese or cobalt is dissolved in an electrolyte solution, oxygen is released, and the crystal structure becomes unstable, so that the positive electrode active material deteriorates. However, the positive electrode active material 100 of one embodiment of the present invention includes the second region 102 in a superficial portion; thus, the crystal structure of the composite oxide of lithium and the transition metal contained in the first region 101 can be more stable.

The second region 102 contains magnesium, fluorine, and oxygen, and preferably the same transition metal contained in the first region 101. When the first region 101 and the second region 102 contain the same transition metal, the valence of the transition metal is preferably different between these two regions. Specifically, it is preferable that, in the transition metal contained in the first region 101, the number of trivalent atoms be larger than the number of atoms exhibiting other valences, and in the transition metal contained in the second region 102, the number of divalent atoms be larger than the number of atoms exhibiting other valences.

When the second region 102 contains many divalent transition metals, it contains much metal oxide having atomic ratio of transition metal:oxygen=1:1, such as CoO (II), MnO(II), and Ni(II). The metal oxide can form a stable solid solution with magnesium oxide, which is also divalent metal oxide. Thus, the second region 102 can be a covering layer which is more stable and favorable.

The valence of transition metals can be analyzed by energy loss spectroscopy (EELS), X-ray absorption fine structure (XAFS), X-ray photoelectron spectroscopy measurement (XPS), electron spin resonance (ESR), Moessbauer spectroscopy, or the like. Among them, EELS is preferable because of the high spatial resolution. Even if the second region 102 is a thin layer with a thickness of about several nanometers, the analysis can be performed.

When the valence of transition metals is analyzed by EELS, the valence can be determined from the ratio between $L_3$ and $L_2$ ($L_3/L_2$). The larger the $L_3/L_2$ is, the higher the proportion of divalent transition metals is. For example, when transition metals contained in the first region 101 and the second region 102 are analyzed by EELS, the $L_3/L_2$ of the transition metals contained in the first region 101 and the second region 102 are preferably less than 3.8 and more than or equal to 3.8, respectively.

The second region 102 may further contain lithium in addition to the above-described elements.

It is preferable that the second region 102 also exist in the first region 101 as shown in FIG. 1B because the crystal structure of composite oxide containing lithium and a transition metal included in the first region 101 can be more stable.

In addition, fluorine contained in the second region 102 exists preferably in a bonding state other than $MgF_2$ and LiF. Specifically, when an XPS analysis is performed on the surface of the positive electrode active material 100, a peak position of bonding energy with fluorine and other elements is preferably higher than or equal to 682 eV and lower than 685 eV, further preferably approximately 684.3 eV. The bonding energy does not correspond to those of $MgF_2$ and LiF.

In this specification and the like, a peak position of bonding energy with an element in an XPS analysis refers to a value of bonding energy at which the maximum intensity of an energy spectrum is obtained in a range corresponding to bonding energy of the element.

<Boundary Between First Region 101 and Second Region 102>

The difference in composition between the first region 101 and the second region 102 can be observed using a TEM image, a STEM image, fast Fourier transform (FFT) analysis, energy dispersive X-ray spectrometry (EDX), an analysis in the depth direction by time-of-flight secondary ion mass spectrometry (ToF-SIMS), X-ray photoelectron spectroscopy (XPS), Auger electron spectroscopy, thermal desorption spectroscopy (TDS), or the like. For example, in the cross-sectional TEM image and STEM image of the positive electrode active material 100, difference of constituent elements is observed as difference of brightness; thus, difference of constituent elements of the first region 101 and the second region 102 can be observed. Furthermore, it can be observed that the first region 101 and the second region 102 contain different elements from an EDX element distribution image as well. However, clear boundaries between the first region 101 and the second region 102 are not necessarily observed by the analyses.

In this specification and the like, the range of the second region 102 that exists in a superficial portion of the positive electrode active material 100 refers to a region from the outermost surface of the positive electrode active material 100 to a region where a concentration of a representative element such as magnesium which is detected by analysis in the depth direction is ⅕ of a peak. As the analysis in the depth direction, the line analysis of EDX, analysis in the depth direction using ToF-SIMS, or the like, which is described above, can be used. Furthermore, a concentration peak of magnesium exists preferably in a region from the surface of the positive electrode active material 100 to a depth of 2 nm toward the center, further preferably to a depth of 1 nm, and still further preferably to a depth of 0.5 nm. The depth at which the concentration of magnesium becomes ⅕ of the peak, that is the range of the second region 102, is different depending on the manufacturing method. However, in the case of a manufacturing method described later, the depth is approximately 2 nm to 5 nm from the surface of the positive electrode active material.

Also in the second region 102 that exists in the first region 101, the range of the second region 102 refers to a region where a concentration of magnesium which is detected by analysis in the depth direction is higher than or equal to ⅕ of a peak.

A distribution of fluorine in the positive electrode active material 100 preferably overlaps with a distribution of magnesium. Thus, a peak of a concentration of fluorine preferably exists in a region from the surface of the positive electrode active material 100 to a depth of 2 nm toward the center, further preferably to a depth of 1 nm, and still further preferably to a depth of 0.5 nm.

For these reasons, the second region 102 can be referred to as a density inclined region in which the concentration of magnesium and fluorine is reduced from the surface of the positive electrode active material 100 toward the inner portion.

The concentration of magnesium and fluorine can be analyzed by ToF-SIMS, XPS, Auger electron spectroscopy, TDS, or the like.

Note that the measurement range of the XPS is from the surface of the positive electrode active material 100 to a region at a depth of approximately 5 nm. Thus, the element concentration at a depth of approximately 5 nm from the surface can be analyzed quantitatively. For this reason, when the thickness of the second region 102 is less than 5 nm, the element concentration of the sum of the second region 102 and part of the first region 101 can be quantitatively analyzed. When the thickness of the second region 102 is 5 nm or more from the surface, the element concentration of the second region 102 can be quantitatively analyzed. When the surface of the positive electrode active material 100 is subjected to XPS analysis and the total amount of atoms including lithium, the transition metal contained in the first region 101, oxygen, fluorine, and magnesium is 100 atomic %, the magnesium concentration is preferably 1 atomic % or more and 16 atomic % or less, and the fluorine concentration is preferably 0.2 atomic % or more and 4 atomic % or less. Furthermore, the ratio of the concentration of magnesium to fluorine is preferably Mg:F=y:1 ($3 \leq y \leq 5$) (atomic ratio), and more preferably about Mg:F=4:1. When the magnesium concentration and the fluorine concentration are within these ranges, it is possible to obtain the positive electrode active material 100 exhibiting extremely favorable cycle characteristics when used for a secondary battery.

As described above, the concentrations of magnesium and fluorine are gradually decreased from the surface toward the inner portion; thus, the first region 101 may contain the element contained in the second region 102, such as magnesium. Similarly, the second region 102 may contain the element contained in the first region 101. In addition, the first region 101 may contain another element such as carbon, sulfur, silicon, sodium, calcium, chlorine, or zirconium. The second region 102 may contain another element such as carbon, sulfur, silicon, sodium, calcium, chlorine, or zirconium.

[Segregation]

The second region 102 can be formed by a sputtering method, a solid phase method, a liquid phase method such as a sol-gel method, or the like. However, the present inventors found that when a magnesium source and a fluorine source are mixed with starting materials and then the mixture is heated, the magnesium is segregated to form the second region 102. Moreover, they found that the positive electrode active material including the second region 102 formed in this manner has more favorable characteristics.

For example, in Example 4 of Patent Document 2 (Patent Application No. 2016-076454), a composite oxide containing magnesium is synthesized, then powder of the composite oxide and lithium fluoride are mixed and heated, whereby fluorinated lithiumized surface oxide is formed on the surface of the composite oxide. According to Example 4, magnesium is not detected from the surface oxide formed in this method.

However, the present inventors succeeded in segregating magnesium oxide on the superficial portion of the positive electrode active material 100 by mixing a magnesium source and a fluorine source with starting materials. The present inventors found that the fluorine added to the starting material exhibited an unexpected effect of segregating magnesium.

Since the second region 102 is formed by magnesium segregation, magnesium segregation can occur not only in the superficial portion of the positive electrode active material 100 but also in a grain boundary and the vicinity thereof and crystal defects and the vicinity thereof. The second region 102 formed in a grain boundary and the vicinity thereof and in crystal defects and the vicinity thereof can contribute to further improvement in stability of the crystal structure of the composite oxide containing lithium and the transition metal contained in the first region 101.

The concentration ratio between magnesium and fluorine in the starting materials is preferably in a range of Mg:F=1:x ($1.5 \leq x \leq 4$) (atomic ratio), further preferably Mg:F=1:2 (atomic ratio) because the segregation in the second region 102 effectively occurs.

The concentration ratio between magnesium and fluorine contained in the second region 102 formed by segregation is preferably in a range of Mg:F=y:1 ($3 \leq y \leq 5$) (atomic ratio), further preferably Mg:F=about 4:1 (atomic ratio), for example.

Since the second region 102 formed by segregation is formed by epitaxial growth, orientations of crystals in the first region 101 and the second region 102 are partly and substantially aligned with each other in some cases. That is, the first region 101 and the second region 102 become topotaxy in some cases. When the orientations of crystals in the first region 101 and the second region 102 are substantially aligned with each other, the second region 102 can serve as a more favorable coating layer.

<Third Region 103>

It is to be noted that although the example in which the positive electrode active material 100 includes the first region 101 and the second region 102 has been described so far, one embodiment of the present invention is not limited thereto. For example, as illustrated in FIG. 1C, the positive electrode active material 100 may include a third region 103. The third region 103 can be provided, for example, so as to be in contact with at least a part of the second region 102. The third region 103 may be a coating film containing carbon such as graphene compounds or may be a coating film containing lithium or an electrolyte decomposition product. When the third region 103 is a coating film containing carbon, it is possible to increase the conductivity between the positive electrode active materials 100 and between the positive electrode active material 100 and the current collector. In the case where the third region 103 is a coating film having decomposition products of lithium or an electrolytic solution, excessive reaction with the electrolytic solution can be suppressed, and cycle characteristics can be improved when used for a secondary battery.

Furthermore, a buffer region may be provided between the first region 101 and the second region 102. The buffer region preferably contains metals such as titanium, aluminum, zirconium, and vanadium in addition to lithium, a transition metal, and oxygen, for example. The buffer region may overlap with the first region 101 and the second region 102. If a positive electrode active material 100 having a buffer region is used, the crystal structure of the first region 101 and the second region 102 can be further stabilized and a positive electrode active material having excellent cycle characteristics can be obtained, which is preferable.

[Manufacturing Method]

A manufacturing method of the positive electrode active material 100 including the first region 101 and the second region 102 is described with reference to FIG. 2. In this method, the second region 102 is formed by segregation. In the description of this embodiment, a transition metal contained in the first region 101 is cobalt, that is, the first region 101 contains lithium cobalt oxide. Moreover, the second region 102 containing magnesium oxide and fluorine is formed by segregation.

First, starting materials are prepared (S11). Specifically, a lithium source, a cobalt source, a magnesium source, and a fluorine source were individually weighed. As the lithium source, for example, lithium carbonate, lithium fluoride, or lithium hydroxide can be used. As the cobalt source, for example, cobalt oxide, cobalt hydroxide, cobalt oxyhydroxide, cobalt carbonate, cobalt oxalate, cobalt sulfate, or the like can be used. As the magnesium source, for example, magnesium oxide, magnesium fluoride, or the like can be used. As the fluorine source, for example, lithium fluoride, magnesium fluoride, or the like can be used. That is, lithium fluoride can be used as both a lithium source and a fluorine source. Magnesium fluoride can be used as a magnesium source or as a fluorine source.

In the present embodiment, lithium carbonate ($Li_2CO_3$) is used as a lithium source, cobalt oxide ($Co_3O_4$) is used as a cobalt source, magnesium oxide (MgO) is used as a magnesium source, lithium fluoride (LiF) is used as a lithium source and a fluorine source.

The atomic ratio of magnesium and fluorine as raw materials is preferably Mg:F=1:x ($1.5 \leq x \leq 4$) (atomic ratio), more preferably Mg:F=about 1:2 (atomic ratio). Therefore, the ratio of magnesium oxide to lithium fluoride is preferably MgO:LiF=1:x ($1.5 \leq x \leq 4$) (molar ratio), more preferably MgO: LiF=about 1:2 (atomic ratio).

For example, the molar ratio between the materials can be shown as follows:

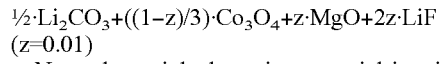
$\frac{1}{2} \cdot Li_2CO_3 + ((1-z)/3) \cdot Co_3O_4 + z \cdot MgO + 2z \cdot LiF$ (z=0.01)

Next, the weighed starting material is mixed (S12). For example, a ball mill, a bead mill, or the like can be used for the mixing.

Next, the material mixed in S12 is heated (S13). This step can be referred to as a first heating or baking to distinguish this step from heating step performed later. The first heating is preferably performed at higher than or equal to 800° C. and lower than or equal to 1050° C., further preferably at higher than or equal to 900° C. and lower than or equal to 1000° C. The heating time is preferably greater than or equal to 2 hours and less than or equal to 20 hours. The first heating is preferably performed in a dried atmosphere such as dry air. In the dried atmosphere, for example, the dew point is preferably lower than or equal to −50° C., further preferably lower than or equal to −100° C. In this embodiment, the heating is performed at 1000° C. for 10 hours, the temperature rising rate is 200° C./h, and dry air whose dew point is −109° C. flows at 10 L/min.

By the first heating in S13, a composite oxide containing lithium and a transition metal, that is included in the first region 101, can be synthesized. Also, by the first heating, part of the magnesium and fluorine contained in the starting material is segregated on the superficial portion of the composite oxide containing lithium and a transition metal. Note that most of the magnesium and fluorine at this stage forms a solid solution in the composite oxide containing lithium and a transition metal.

Next, the material heated in S13 is cooled to room temperature (S14). The cooling time is preferably equal to or longer than the temperature rising time, for example, 10 hours or longer and 15 hours or shorter. After the cooling, the synthesized material is preferably made to pass through a sieve. A 53-μm mesh sieve is used in this embodiment.

Note that as the starting materials, particles of the composite oxide containing lithium, cobalt, fluorine, and magnesium which are synthesized in advance may be used. In this case, Step 12 to Step 14 can be skipped.

Next, the material cooled in S14 is subjected to a second heating (S15). This step can be referred to as a second heating or annealing to distinguish this step from the heating step performed before. The optimal conditions for the second heating are changed depending on the particle size, composition, and the like of the composite oxide containing lithium, cobalt, fluorine, and magnesium. However, it is preferable that the second heating be performed for a holding time at a specified temperature of 50 hours or shorter, more preferably 2 hours or longer and 10 hours or shorter. The specified temperature is preferably higher than or equal to 500° C. and lower than or equal to 1200° C., further preferably higher than or equal to 700° C. and lower than or equal to 1000° C., still further preferably about 800° C. The heating is performed preferably in an oxygen-containing atmosphere. In this embodiment, the heating is performed at 800° C. for 2 hours, the temperature rising rate is 200° C./h, and dry air whose dew point is −109° C. flows at 10 L/min.

The second heating in S15 facilitates segregation of the magnesium and fluorine contained in the starting material on the superficial portion of the composite oxide containing lithium and a transition metal.

Finally, the material heated in S15 is cooled to room temperature. The cooling time is preferably equal to or longer than the temperature rising time. Then, the cooled material is collected (S16), and the positive electrode active material 100 including the first region 101 and the second region 102 can be obtained.

The use of the positive electrode active material described in the present embodiment can provide a secondary battery with high capacity and excellent cycle characteristics. This embodiment can be implemented in appropriate combination with any of the other embodiments.

Embodiment 2

In this embodiment, examples of materials which can be used for a secondary battery containing the positive electrode active material 100 described in the above embodiment are described. In this embodiment, a secondary battery in which a positive electrode, a negative electrode, and an electrolyte solution are wrapped in an exterior body is described as an example.

[Positive Electrode]

The positive electrode includes a positive electrode active material layer and a positive electrode current collector.

<Positive Electrode Active Material Layer>

The positive electrode active material layer contains a positive electrode active material. The positive electrode active material layer may contain a conductive additive and a binder.

As the positive electrode active material, the positive electrode active material 100 described in the above embodiment can be used. When the above-described positive electrode active material 100 is used, a secondary battery with high capacity and excellent cycle characteristics can be obtained.

Examples of the conductive additive include a carbon material, a metal material, and a conductive ceramic material. Alternatively, a fiber material may be used as the conductive additive. The content of the conductive additive with respect to the total amount of the active material layer is preferably greater than or equal to 1 wt % and less than or equal to 10 wt %, more preferably greater than or equal to 1 wt % and less than or equal to 5 wt %.

A network for electric conduction can be formed in the electrode by the conductive additive. The conductive additive also allows maintaining of a path for electric conduction between the positive electrode active material particles. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Alternatively, a graphene compound may be used as the conductive additive.

A graphene compound has excellent electrical characteristics of high conductivity and excellent physical properties of high flexibility and high mechanical strength. Furthermore, a graphene compound has a planar shape. A graphene compound enables low-resistance surface contact. Furthermore, a graphene compound has extremely high conductivity even with a small thickness in some cases and thus allows a conductive path to be formed in an active material layer efficiently even with a small amount. For this reason, it is preferable to use a graphene compound as the conductive additive because the area where the active material and the conductive additive are in contact with each other can be increased. Here, it is particularly preferable to use, for example, graphene, multilayer graphene, or reduced graphene oxide (hereinafter "RGO") as a graphene compound. Note that RGO refers to a compound obtained by reducing graphene oxide (GO), for example.

In the case where an active material with a small particle diameter (e.g., 1 μm or less) is used, the specific surface area of the active material is large and thus more conductive paths for the active material particles are needed. Thus, the amount of conductive additive tends to increase and the supported amount of active material tends to decrease relatively. When the supported amount of active material decreases, the capacity of the secondary battery also decreases. In such a case, a graphene compound that can efficiently form a conductive path even in a small amount is particularly preferably used as the conductive additive because the supported amount of active material does not decrease.

A cross-sectional structure example of an active material layer 200 containing a graphene compound as a conductive additive is described below.

Figure 3A:
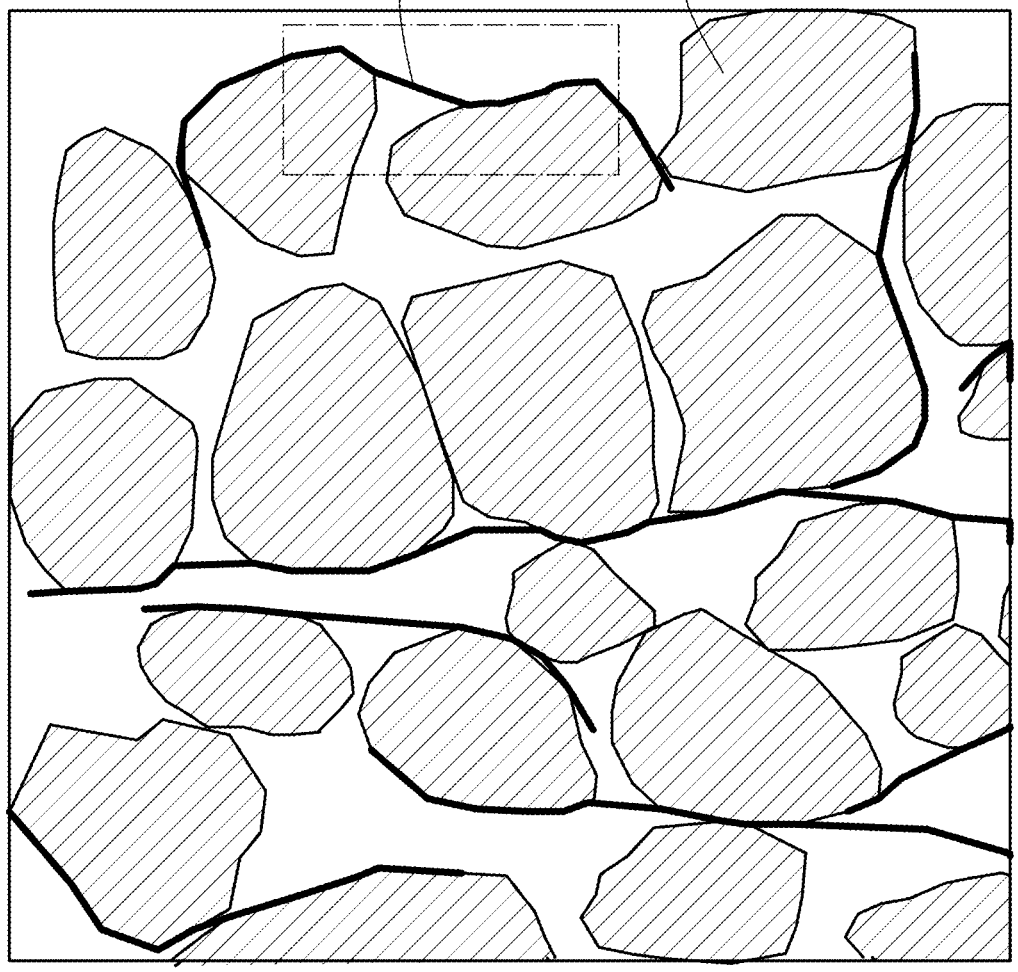
FIGS. 3A and 3B are cross-sectional views of an active material layer containing a graphene compound as a conductive additive.
Figure 3B:
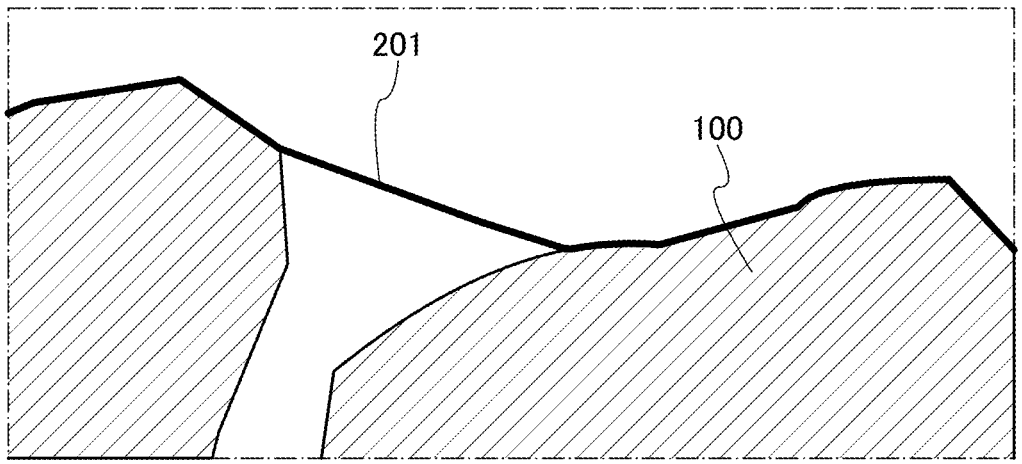

FIG. 3A shows a longitudinal cross-sectional view of the active material layer 200. The active material layer 200 includes positive electrode active material particles 100, a graphene compound 201 serving as a conductive additive, and a binder (not illustrated). Here, graphene or multilayer graphene may be used as the graphene compound 201, for example. The graphene compound 201 preferably has a sheet-like shape. The graphene compound 201 may have a sheet-like shape formed of a plurality of sheets of multilayer graphene and/or a plurality of sheets of graphene that partly overlap with each other.

The longitudinal cross section of the active material layer 200 in FIG. 3A shows substantially uniform dispersion of the sheet-like graphene compounds 201 in the active material layer 200. The graphene compounds 201 are schematically shown by thick lines in FIG. 3A but are actually thin films each having a thickness corresponding to the thickness of a single layer or a multi-layer of carbon molecules. The plurality of graphene compounds 201 are formed in such a way as to partly coat or adhere to the surfaces of the plurality of positive electrode active material particles 100, so that the graphene compounds 201 make surface contact with the positive electrode active material particles 100.

Here, the plurality of graphene compounds are bonded to each other to form a net-like graphene compound sheet (hereinafter referred to as a graphene compound net or a graphene net). The graphene net covering the active material can function as a binder for bonding active materials. The amount of a binder can thus be reduced, or the binder does not have to be used. This can increase the proportion of the active material in the electrode volume or weight. That is to say, the capacity of the storage device can be increased.

Here, it is preferable to perform reduction after a layer to be the active material layer 200 is formed in such a manner that graphene oxide is used as the graphene compound 201 and mixed with an active material. When graphene oxide with extremely high dispersibility in a polar solvent is used for the formation of the graphene compounds 201, the graphene compounds 201 can be substantially uniformly dispersed in the active material layer 200. The solvent is removed by volatilization from a dispersion medium in which graphene oxide is uniformly dispersed, and the graphene oxide is reduced; hence, the graphene compounds 201 remaining in the active material layer 200 partly overlap with each other and are dispersed such that surface contact is made, thereby forming a three-dimensional conduction path. Note that graphene oxide can be reduced either by heat treatment or with the use of a reducing agent, for example.

Unlike a conductive additive in the form of particles, such as acetylene black, which makes point contact with an active material, the graphene compound 201 is capable of making low-resistance surface contact; accordingly, the electrical conduction between the positive electrode active material particles 100 and the graphene compounds 201 can be improved with a smaller amount of the graphene compound 201 than that of a normal conductive additive. This increases the proportion of the positive electrode active material 100 in the active material layer 200, resulting in increased discharge capacity of the storage device.

As the binder, a rubber material such as styrene-butadiene rubber (SBR), styrene-isoprene-styrene rubber, acrylonitrile-butadiene rubber, butadiene rubber, or ethylene-propylene-diene copolymer can be used, for example. Alternatively, fluororubber can be used as the binder.

For the binder, for example, water-soluble polymers are preferably used. As the water-soluble polymers, a polysaccharide and the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used. It is more preferred that such water-soluble polymers be used in combination with any of the above rubber materials.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVdF), polyacrylonitrile (PAN), ethylene-propylene-diene polymer, polyvinyl acetate, or nitrocellulose is preferably used.

A plurality of the above materials may be used in combination for the binder.

For example, a material having a significant viscosity modifying effect and another material may be used in combination. For example, a rubber material or the like has high adhesion or high elasticity but may have difficulty in viscosity modification when mixed in a solvent. In such a case, a rubber material or the like is preferably mixed with a material having a significant viscosity modifying effect, for example. As a material having a significant viscosity modifying effect, for example, a water-soluble polymer is preferably used. An example of a water-soluble polymer having an especially significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of slurry for an electrode. In this specification, cellulose and a cellulose derivative used as a binder of an electrode include salts thereof.

The water-soluble polymers stabilize viscosity by being dissolved in water and allow stable dispersion of the active material and another material combined as a binder such as styrene-butadiene rubber in an aqueous solution. Furthermore, a water-soluble polymer is expected to be easily and stably adsorbed to an active material surface because it has a functional group. Many cellulose derivatives such as carboxymethyl cellulose have functional groups such as a hydroxyl group and a carboxyl group. Because of functional groups, polymers are expected to interact with each other and cover an active material surface in a large area.

In the case where the binder covering or being in contact with the active material surface forms a film, the film is expected to serve as a passivation film to suppress the decomposition of the electrolyte solution. Here, the passivation film refers to a film without electric conductivity or a film with extremely low electric conductivity, and can inhibit the decomposition of an electrolyte solution at a potential at which a battery reaction occurs in the case where the passivation film is formed on the active material surface, for example. It is preferred that the passivation film can conduct lithium ions while suppressing electric conduction.

<Positive Electrode Current Collector>

The positive electrode current collector can be formed using a material that has high conductivity, such as a metal like stainless steel, gold, platinum, aluminum, or titanium, or an alloy thereof. It is preferred that a material used for the positive electrode current collector not dissolve at the potential of the positive electrode. Alternatively, the positive electrode current collector can be formed using an aluminum alloy to which an element that improves heat resistance, such as silicon, titanium, neodymium, scandium, or molybdenum, is added. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, and nickel. The current collector can have any of various shapes including a foil-like shape, a plate-like shape (sheet-like shape), a net-like shape, a punching-metal shape, and an expanded-metal shape. The current collector preferably has a thickness of 5 μm to 30 μm.

[Negative Electrode]

The negative electrode includes a negative electrode active material layer and a negative electrode current collector. The negative electrode active material layer may contain a conductive additive and a binder.

<Negative Electrode Active Material>

As a negative electrode active material, for example, an alloy-based material or a carbon-based material can be used.

For the negative electrode active material, an element which enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a significantly high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Here, an element that enables charge-discharge reactions by an alloying reaction and a dealloying reaction with lithium, a compound containing the element, and the like may be referred to as an alloy-based material.

In this specification and the like, SiO refers, for example, to silicon monoxide. SiO can alternatively be expressed as $SiO_x$. Here, x preferably has an approximate value of 1. For example, x is preferably 0.2 or more and 1.5 or less, more preferably 0.3 or more and 1.2 or less.

As the carbon-based material, graphite, graphitizing carbon (soft carbon), non-graphitizing carbon (hard carbon), a carbon nanotube, graphene, carbon black, and the like can be used.

Examples of graphite include artificial graphite and natural graphite. Examples of artificial graphite include meso-carbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (higher than or equal to 0.05 V and lower than or equal to 0.3 V vs. $Li/Li^+$) when lithium ions are intercalated into the graphite (while a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and higher level of safety than that of a lithium metal.

Alternatively, for the negative electrode active material, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAb/g and 1890 $mAb/cm^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active material; for example, a transition metal oxide which does not form an alloy with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

For the conductive additive and the binder that can be included in the negative electrode active material layer, materials similar to those of the conductive additive and the binder that can be included in the positive electrode active material layer can be used.

<Negative Electrode Current Collector>

For the negative electrode current collector, a material similar to that of the positive electrode current collector can be used. Note that a material which is not alloyed with a carrier ion such as lithium is preferably used for the negative electrode current collector.

[Electrolyte Solution]

The electrolyte solution contains a solvent and an electrolyte. As a solvent of the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent of the electrolytic solution, safety against liquid leakage and the like is improved. Furthermore, a secondary battery can be thinner and more lightweight. Typical examples of gelled high-molecular materials include a silicone gel, an acrylic gel, an acrylonitrile gel, a polyethylene oxide-based gel, a polypropylene oxide-based gel, a gel of a fluorine-based polymer, and the like.

Alternatively, when one or more kinds of ionic liquids (room temperature molten salts) which have features of non-flammability and non-volatility is used as a solvent of the electrolyte solution, a secondary battery can be prevented from exploding or catching fire even when the secondary battery internally shorts out or the internal temperature increases owing to overcharging or the like. An ionic liquid contains a cation and an anion. The ionic liquid contains an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolyte solution used for a storage device is preferably highly purified and contains a small amount of dust particles and elements other than the constituent elements of the electrolyte solution (hereinafter also simply referred to as impurities). Specifically, the weight ratio of impurities to the electrolyte solution is less than or equal to 1%, preferably less than or equal to 0.1%, and further preferably less than or equal to 0.01%.

Furthermore, an additive agent such as vinylene carbonate, propane sultone (PS), tert-butylbenzene (TBB), fluoroethylene carbonate (FEC), LiBOB, or a dinitrile compound such as succinonitrile or adiponitrile may be added to the electrolyte solution. The concentration of a material to be added with respect to the whole solvent is, for example, higher than or equal to 0.1 wt % and lower than or equal to 5 wt %.

Alternatively, a gelled electrolyte obtained in such a manner that a polymer is swelled with an electrolyte solution may be used. When a polymer gel electrolyte is used, safety against liquid leakage and the like is improved. Furthermore, a secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used.

Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolyte solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, a separator and a spacer are not necessary. Furthermore, since the battery can be entirely solidified, there is no possibility of liquid leakage to increase the safety of the battery dramatically.

[Separator]

The secondary battery preferably includes a separator. As the separator, for example, paper; nonwoven fabric; glass fiber; ceramics; or synthetic fiber using nylon (polyamide), vinylon (polyvinyl alcohol-based fiber), polyester, acrylic, polyolefin, or polyurethane can be used. The separator is preferably formed to have an envelope-like shape to wrap one of the positive electrode and the negative electrode.

The separator may have a multilayer structure. For example, an organic material film such as polypropylene or polyethylene can be coated with a ceramic-based material, a fluorine-based material, a polyamide-based material, a mixture thereof, or the like. Examples of the ceramic-based material include aluminum oxide particles and silicon oxide particles. Examples of the fluorine-based material include PVDF and a polytetrafluoroethylene. Examples of the polyamide-based material include nylon and aramid (meta-based aramid and para-based aramid).

Deterioration of the separator in charging and discharging at high voltage can be suppressed and thus the reliability of the secondary battery can be improved because oxidation resistance is improved when the separator is coated with the ceramic-based material. In addition, when the separator is coated with the fluorine-based material, the separator is easily brought into close contact with an electrode, resulting in high output characteristics. When the separator is coated with the polyamide-based material, in particular, aramid, the safety of the secondary battery is improved because heat resistance is improved.

For example, both surfaces of a polypropylene film may be coated with a mixed material of aluminum oxide and aramid. Alternatively, a surface of the polypropylene film in contact with the positive electrode may be coated with the mixed material of aluminum oxide and aramid, and a surface of the polypropylene film in contact with the negative electrode may be coated with the fluorine-based material.

With the use of a separator having a multilayer structure, the capacity of the secondary battery per volume can be increased because the safety of the secondary battery can be maintained even when the total thickness of the separator is small.

Embodiment 3

In this embodiment, examples of a shape of a secondary battery containing the positive electrode active material 100 described in the above embodiment are described. For the materials used for the secondary battery described in this embodiment, the description of the above embodiment can be referred to.

[Coin-Type Secondary Battery]

Figure 4A:
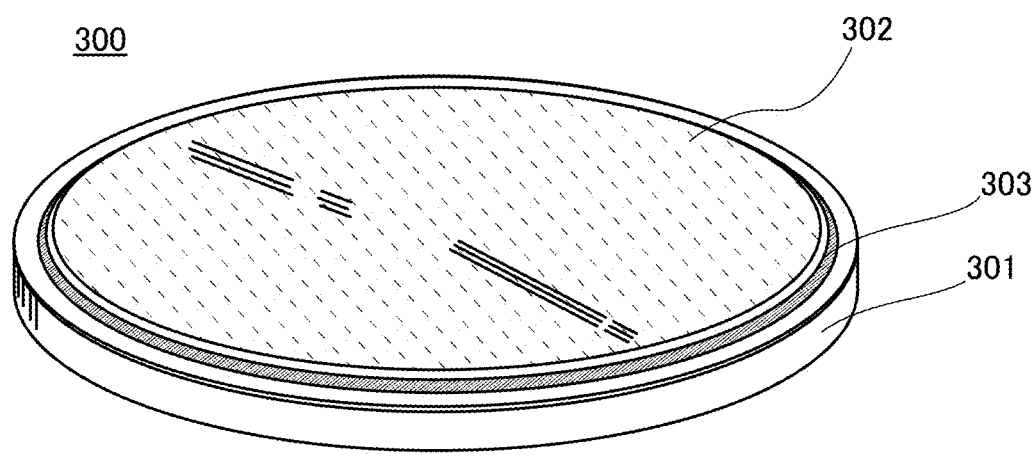
FIGS. 4A and 4B show a coin-type secondary battery.
Figure 4B:
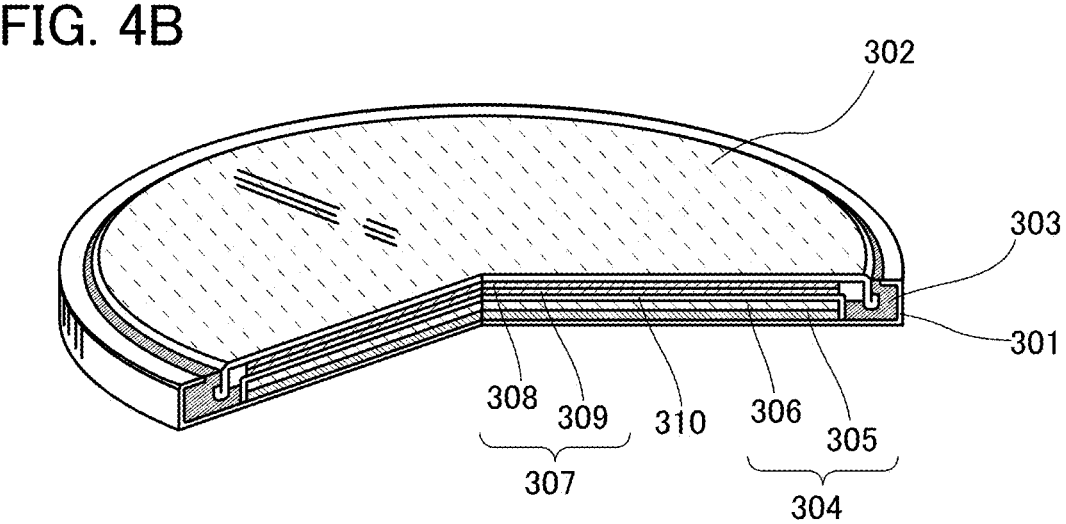

First, an example of a coin-type secondary battery is described. FIG. 4A is an external view of a coin-type (single-layer flat type) secondary battery, and FIG. 4B is a cross-sectional view thereof.

In a coin-type secondary battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308.

Note that only one surface of each of the positive electrode 304 and the negative electrode 307 used for the coin-type secondary battery 300 is provided with an active material layer.

For the positive electrode can 301 and the negative electrode can 302, a metal having a corrosion-resistant property to an electrolyte solution, such as nickel, aluminum, or titanium, an alloy of such a metal, or an alloy of such a metal and another metal (e.g., stainless steel) can be used. Alternatively, the positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and the separator 310 are immersed in the electrolyte solution. Then, as illustrated in FIG. 4B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 located therebetween. In such a manner, the coin-type secondary battery 300 can be manufactured.

When the positive electrode active material described in the above embodiment is used in the positive electrode 304, the coin-type secondary battery 300 with high capacity and excellent cycle characteristics can be obtained.

[Cylindrical Secondary Battery]

Figure 5A:
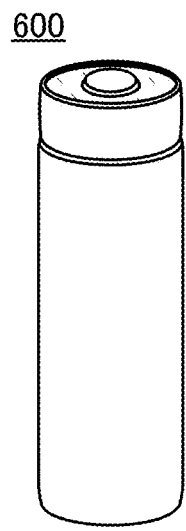
FIGS. 5A to 5D show a cylindrical secondary battery.

Next, an example of a cylindrical secondary battery will be described with reference to FIGS. 5A to 5D. A cylindrical secondary battery 600 includes, as illustrated in FIG. 5A, a positive electrode cap (battery lid) 601 on the top surface and a battery can (outer can) 602 on the side and bottom surfaces. The positive electrode cap and the battery can (outer can) 602 are insulated from each other by a gasket (insulating packing) 610.

Figure 5B:
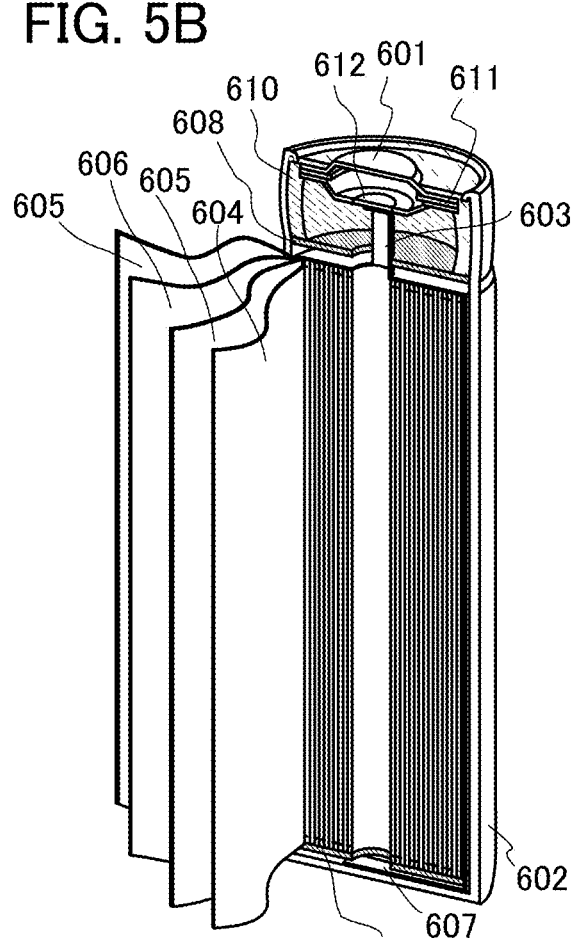

FIG. 5B is a schematic cross-sectional view of the cylindrical secondary battery. Inside the battery can 602 having a hollow cylindrical shape, a battery element in which a strip-like positive electrode 604 and a strip-like negative electrode 606 are wound with a strip-like separator 605 located therebetween is provided. Although not illustrated, the battery element is wound around a center pin. One end of the battery can 602 is close and the other end thereof is open. For the battery can 602, a metal having a corrosion-resistant property to an electrolyte solution, such as nickel, aluminum, or titanium, an alloy of such a metal, or an alloy of such a metal and another metal (e.g., stainless steel) can be used. Alternatively, the battery can 602 is preferably covered with nickel, aluminum, or the like in order to prevent corrosion due to the electrolyte solution. Inside the battery can 602, the battery element in which the positive electrode, the negative electrode, and the separator are wound is provided between a pair of insulating plates 608 and 609 that face each other. Furthermore, a nonaqueous electrolyte solution (not illustrated) is injected inside the battery can 602 provided with the battery element. As the nonaqueous electrolyte solution, a nonaqueous electrolyte solution that is similar to that of the coin-type secondary battery can be used.

Since the positive electrode and the negative electrode of the cylindrical secondary battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Barium titanate ($BaTiO_3$)-based semiconductor ceramic can be used for the PTC element.

Figure 5C:
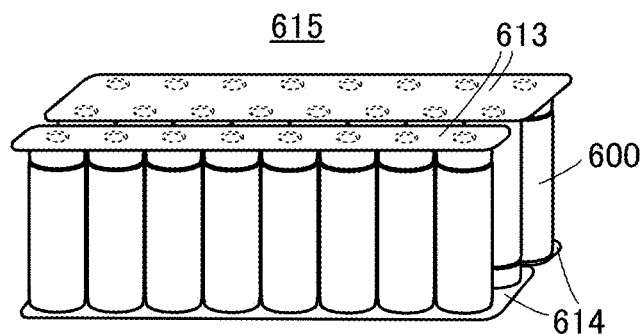

Alternatively, as illustrated in FIG. 5C, a plurality of secondary batteries 600 may be sandwiched between a conductive plate 613 and a conductive plate 614 to form a module 615. The plurality of secondary batteries 600 may be connected parallel to each other, connected in series, or connected in series after being connected parallel to each other. With the module 615 including the plurality of secondary batteries 600, large electric power can be extracted.

Figure 5D:
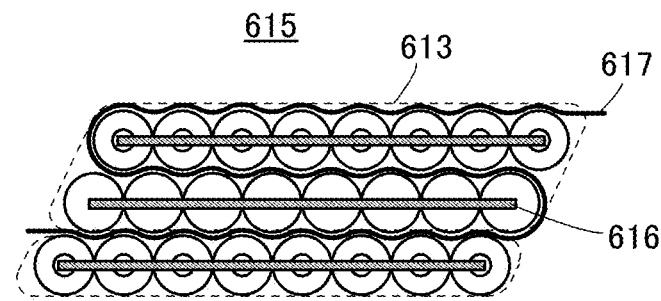

FIG. 5D is a top view of the module 615. The conductive plate 613 is shown by a dotted line for clarity of the drawing. As illustrated in FIG. 5D, the module 615 may include a wiring 616 which electrically connects the plurality of secondary batteries 600 to each other. It is possible to provide the conductive plate 613 over the wiring 616 to overlap with each other. In addition, a temperature control device 617 may be provided between the plurality of secondary batteries 600. When the secondary batteries 600 are overheated, the temperature control device 617 can cool them, and when the secondary batteries 600 are cooled too much, the temperature control device 617 can heat them. Thus, the performance of the module 615 is not easily influenced by the outside air temperature.

When the positive electrode active material described in the above embodiment is used in the positive electrode 604, the cylindrical secondary battery 600 with high capacity and excellent cycle characteristics can be obtained.

[Structural Examples of Secondary Battery]

Other structural examples of secondary batteries will be described with reference to FIGS. 6A and 6B, FIGS. 7A-1, 7A-2, 7B-1, and 7B-2, FIGS. 8A and 8B, and FIG. 9.

Figure 6A:
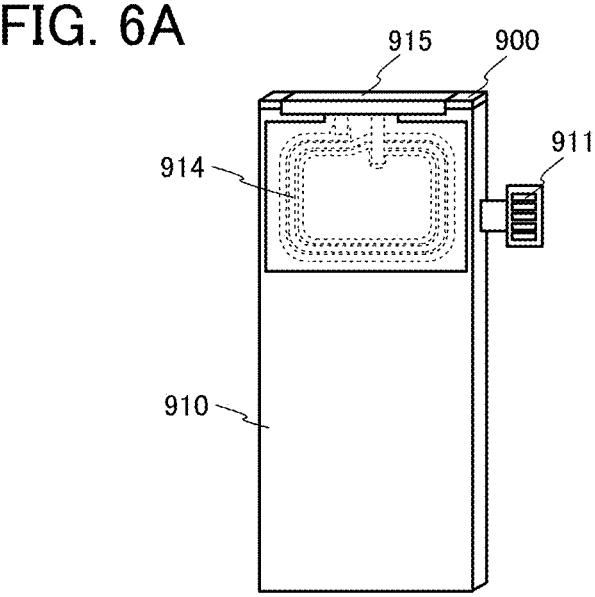
FIGS. 6A and 6B illustrate an example of a secondary battery.
Figure 6B:
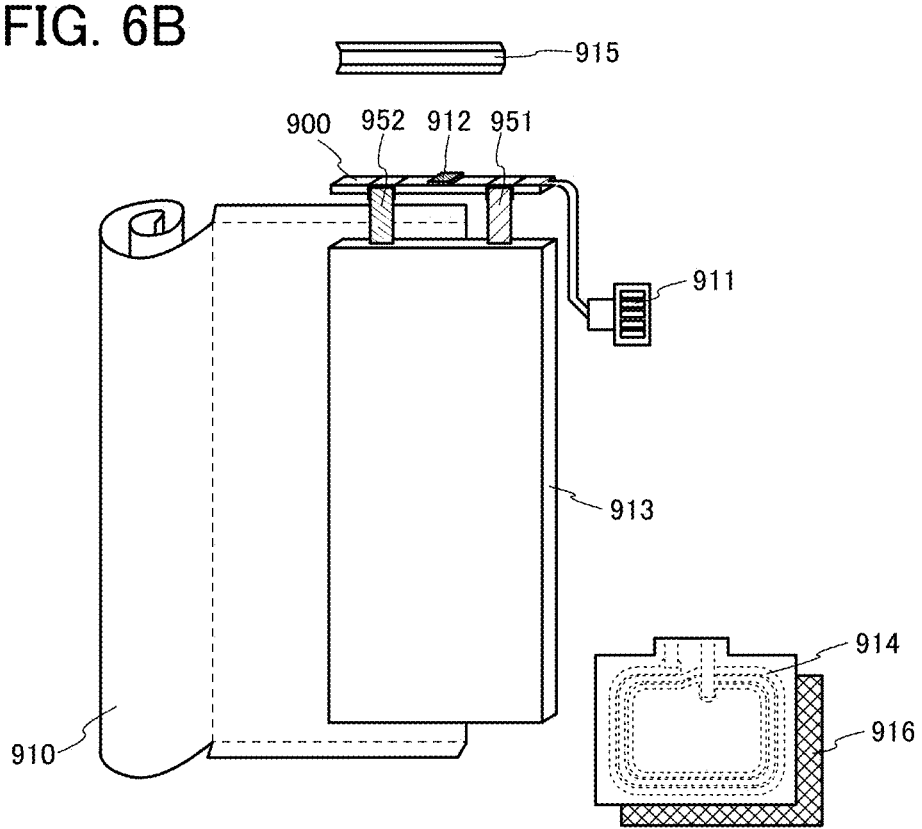

FIGS. 6A and 6B are external views of a battery pack. The battery pack includes a circuit board 900 and a secondary battery 913. The secondary battery 913 includes a terminal 951 and a terminal 952 and is covered by a label 910. The battery pack may include an antenna 914.

The circuit board 900 is fixed by a sealant 915. The circuit board 900 includes a circuit 912. The terminal 911 is electrically connected to the terminals 951 and 952 of the secondary battery 913 with the circuit board 900 therebetween. The terminal 911 is electrically connected to the antenna 914 and the circuit 912 with the circuit board 900 therebetween. Note that a plurality of terminals 911 serving as a control signal input terminal, a power supply terminal, and the like may be provided.

For example, the circuit 912 serves as a protection circuit for protecting the secondary battery 913 from overcharge, overdischarge, and overcurrent. The circuit 912 may be provided on the rear surface of the circuit board 900. Note that the shape of the antenna 914 is not limited to a coil shape and may be a linear shape or a plate shape. Further, a planar antenna, an aperture antenna, a traveling-wave antenna, an EH antenna, a magnetic-field antenna, or a dielectric antenna may be used. The antenna 914 has a function of communicating data with an external device, for example. As a system for communication using the antenna 914 between the battery pack and another device, a response method that can be used between the storage battery and another device, such as NFC, can be employed.

The battery pack includes a layer 916 between the secondary battery 913 and the antenna 914. The layer 916 has a function of blocking an electromagnetic field from the secondary battery 913, for example. As the layer 916, for example, a magnetic body can be used.

Note that the structure of the battery pack is not limited to that shown in FIGS. 6A and 6B.

For example, as shown in FIGS. 7A-1 and 7A-2, two opposite surfaces of the secondary battery 913 in FIGS. 6A and 6B may be provided with respective antennas. FIG. 7A-1 is an external view showing one side of the opposite surfaces, and FIG. 7A-2 is an external view showing the other side of the opposite surfaces. For portions similar to those in FIGS. 6A and 6B, a description of the battery pack illustrated in FIGS. 6A and 6B can be referred to as appropriate.

As illustrated in FIG. 7A-1, the antenna 914 is provided on one of the opposite surfaces of the secondary battery 913 with the layer 916 located therebetween, and as illustrated in FIG. 7A-2, an antenna 918 is provided on the other of the opposite surfaces of the secondary battery 913 with a layer 917 located therebetween. The layer 917 has a function of blocking an electromagnetic field from the secondary battery 913, for example. As the layer 917, for example, a magnetic body can be used.

With the above structure, the battery pack can have two antennas and both of the antennas 914 and 918 can be increased in size.

An antenna with a shape that can be applied to the antenna 914 can be used as the antenna 918. The antenna 918 may be a flat-plate conductor. The flat-plate conductor can serve as one of conductors for electric field coupling. That is, the antenna 914 can serve as one of two conductors of a capacitor. Thus, electric power can be transmitted and received not only by an electromagnetic field or a magnetic field but also by an electric field.

Alternatively, as illustrated in FIG. 7B-1, the battery pack in FIGS. 6A and 6B may be provided with a display device 920. The display device 920 is electrically connected to the terminal 911. For portions similar to those in FIGS. 6A and 6B, a description of the battery pack illustrated in FIGS. 6A and 6B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Alternatively, as illustrated in FIG. 7B-2, the secondary battery 913 illustrated in FIGS. 6A and 6B may be provided with a sensor 921. The sensor 921 is electrically connected to the terminal 911 via a terminal 922 and the circuit board 900. For portions similar to those in FIGS. 6A and 6B, a description of the storage device illustrated in FIGS. 6A and 6B can be referred to as appropriate.

The sensor 921 has a function of measuring, for example, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays. With the sensor 921, for example, data on an environment (e.g., temperature) where the storage device is placed can be determined and stored in a memory inside the circuit 912.

Furthermore, structural examples of the secondary battery 913 will be described with reference to FIGS. 8A and 8B and FIG. 9.

Figure 8A:
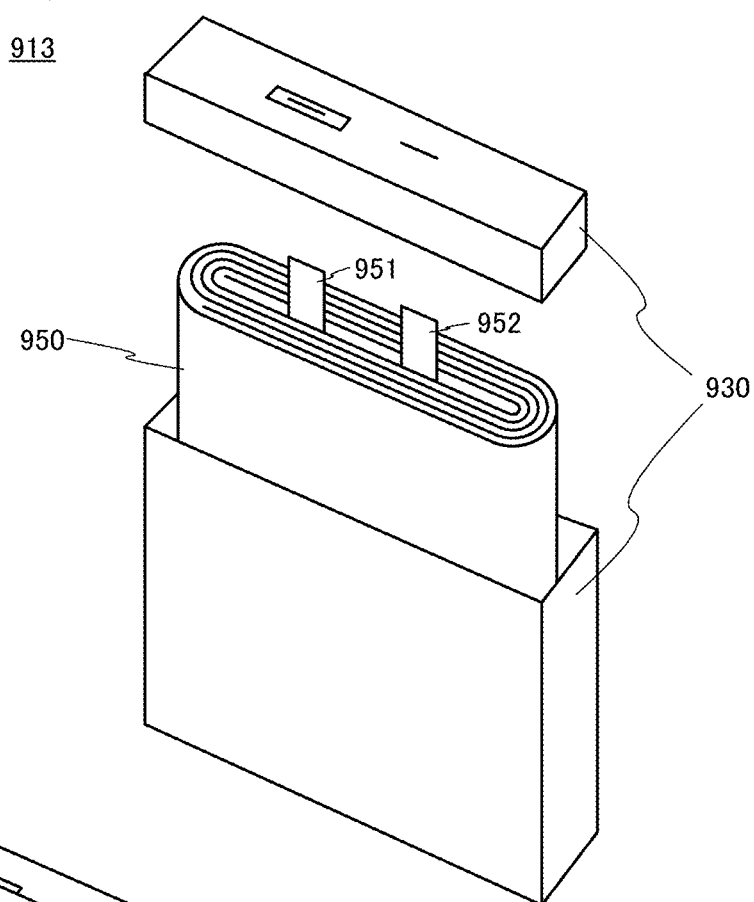
FIGS. 8A and 8B illustrate an example of a secondary battery.

The secondary battery 913 illustrated in FIG. 8A includes a wound body 950 provided with the terminals 951 and 952 inside a housing 930. The wound body 950 is soaked in an electrolyte solution inside the housing 930. The terminal 952 is in contact with the housing 930. An insulator or the like inhibits contact between the terminal 951 and the housing 930. Note that in FIG. 8A, the housing 930 divided into two pieces is illustrated for convenience; however, in the actual structure, the wound body 950 is covered with the housing 930 and the terminals 951 and 952 extend to the outside of the housing 930. For the housing 930, a metal material (such as aluminum) or a resin material can be used.

Figure 8B:
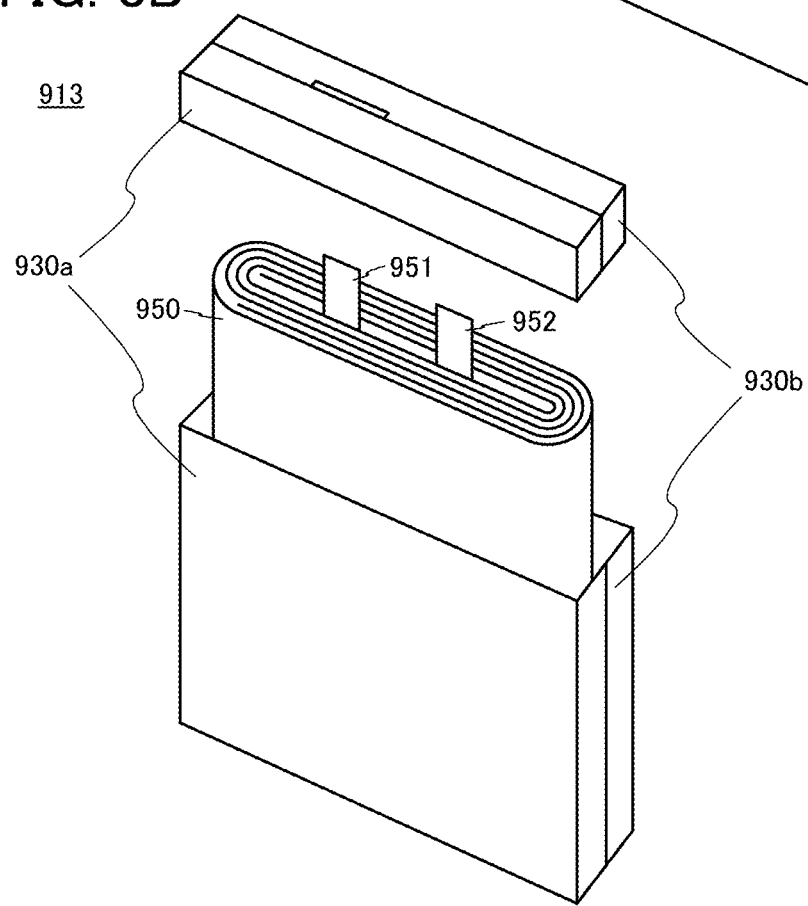

Note that as illustrated in FIG. 8B, the housing 930 in FIG. 8A may be formed using a plurality of materials. For example, in the secondary battery 913 in FIG. 8B, a housing 930a and a housing 930b are bonded to each other, and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field from the secondary battery 913 can be inhibited. When an electric field is not significantly blocked by the housing 930a, an antenna such as the antennas 914 and 918 may be provided inside the housing 930a. For the housing 930b, a metal material can be used, for example.

Figure 9:
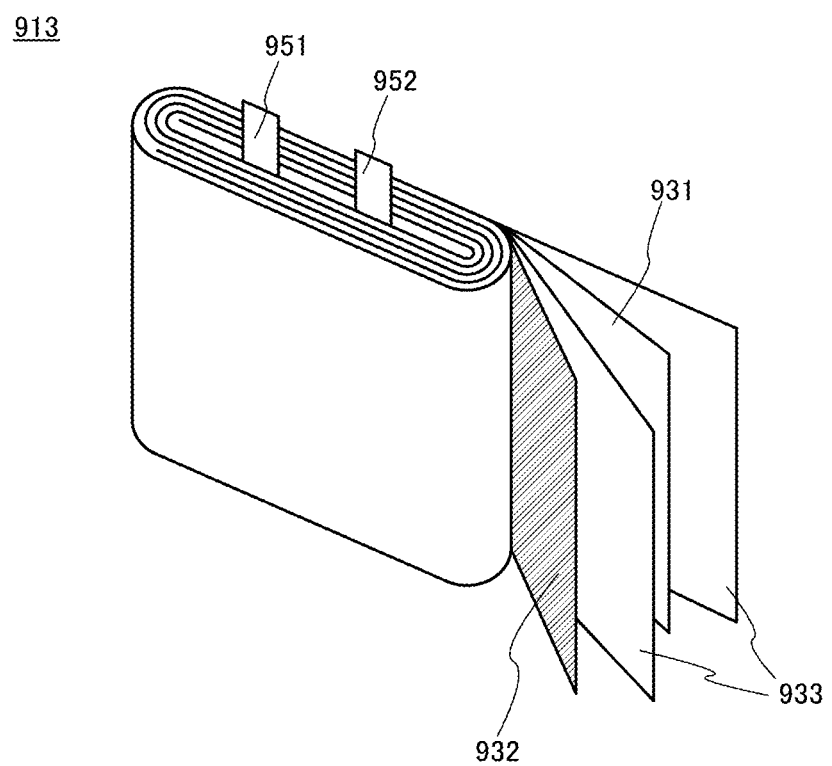
FIG. 9 illustrates an example of a secondary battery.

FIG. 9 illustrates the structure of the wound body 950. The wound body 950 includes a negative electrode 931, a positive electrode 932, and separators 933. The wound body 950 is obtained by winding a sheet of a stack in which the negative electrode 931 overlaps with the positive electrode 932 with the separator 933 provided therebetween. Note that a plurality of stacks each including the negative electrode 931, the positive electrode 932, and the separator 933 may be stacked.

The negative electrode 931 is connected to the terminal 911 in FIGS. 6A and 6B via one of the terminals 951 and 952. The positive electrode 932 is connected to the terminal 911 in FIGS. 6A and 6B via the other of the terminals 951 and 952.

When the positive electrode active material described in the above embodiment is used in the positive electrode 932, the secondary battery 913 with high capacity and excellent cycle characteristics can be obtained.

[Laminated Secondary Battery]

Next, an example of a laminated secondary battery will be described with reference to FIGS. 10A to 10C, FIGS. 11A and 11B, FIG. 12, FIG. 13, FIGS. 14A to 14C, FIGS. 15A, 15B1, 15B2, 15C, and 15D, and FIGS. 16A and 16B. When the laminated secondary battery has flexibility and is used in an electronic device at least part of which is flexible, the secondary battery can be bent as the electronic device is bent.

A laminated secondary battery 980 is described with reference to FIGS. 10A to 10C. The laminated secondary battery 980 includes a wound body 993 illustrated in FIG. 10A. The wound body 993 includes a negative electrode 994, a positive electrode 995, and a separator 996. The wound body 993 is, like the wound body 950 illustrated in FIG. 9, obtained by winding a sheet of a stack in which the negative electrode 994 overlaps with the positive electrode 995 with the separator 996 therebetween.

Note that the number of stacks each including the negative electrode 994, the positive electrode 995, and the separator 996 may be determined as appropriate depending on capacity and an element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 10A:
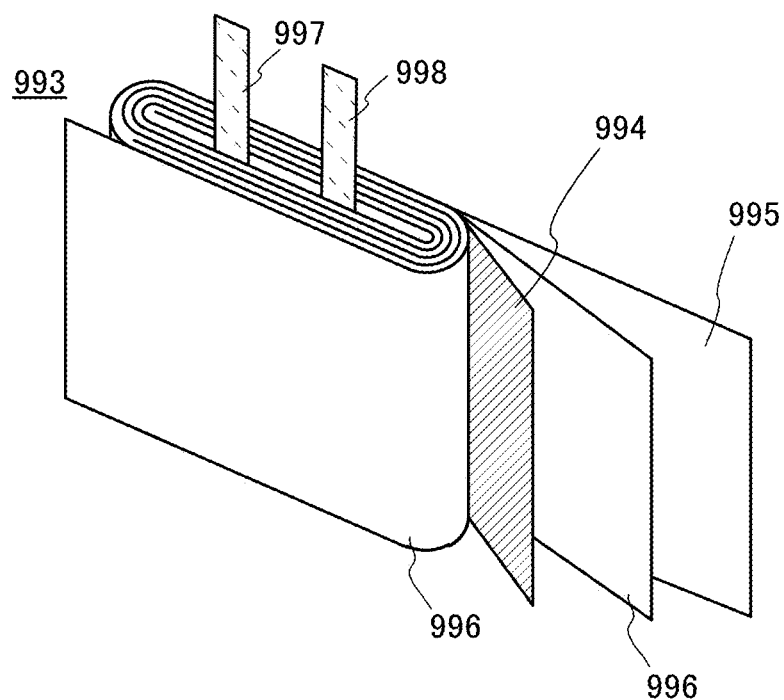
FIGS. 10A to 10C illustrate a laminated secondary battery.
Figure 10B:
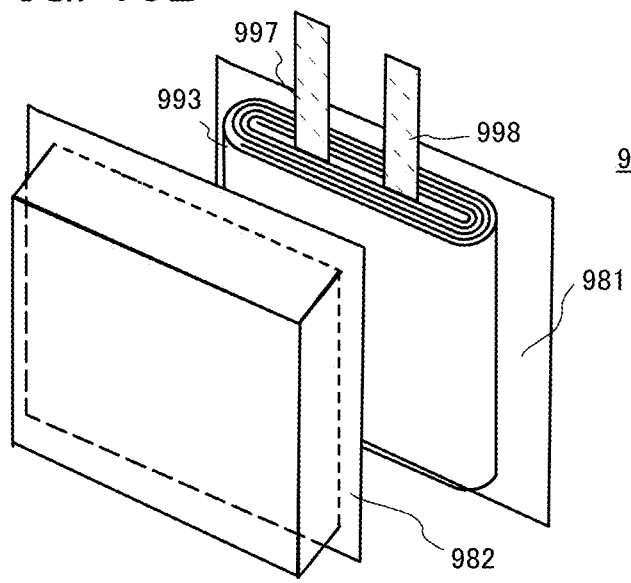
Figure 10C:
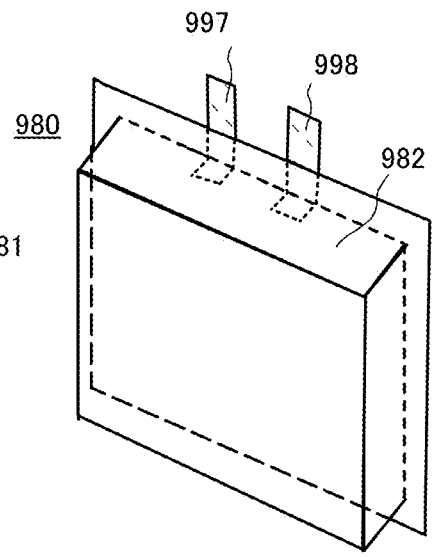

As illustrated in FIG. 10B, the wound body 993 is packed in a space formed by bonding a film 981 and a film 982 having a depressed portion that serve as exterior bodies by thermocompression bonding or the like, whereby the secondary battery 980 can be formed as illustrated in FIG. 10C. The wound body 993 includes the lead electrode 997 and the lead electrode 998, and is soaked in an electrolyte solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible secondary battery can be fabricated.

Although FIGS. 10B and 10C illustrate an example where a space is formed by two films, the wound body 993 may be placed in a space formed by bending one film.

When the positive electrode active material described in the above embodiment is used in the positive electrode 995, the secondary battery 980 with high capacity and excellent cycle characteristics can be obtained.

Figure 11A:
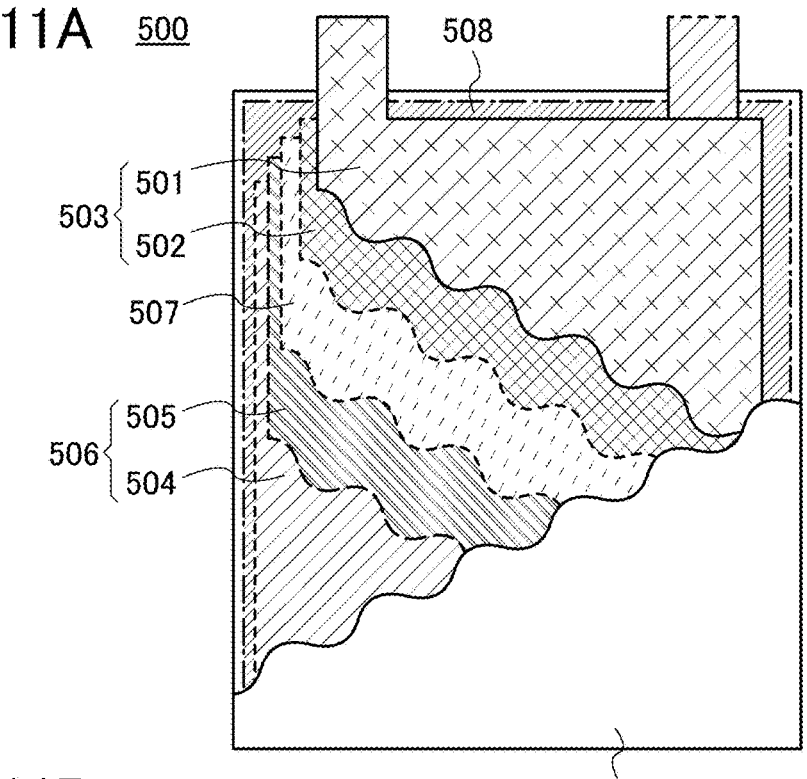
FIGS. 11A and 11B illustrate a laminated secondary battery.
Figure 11B:
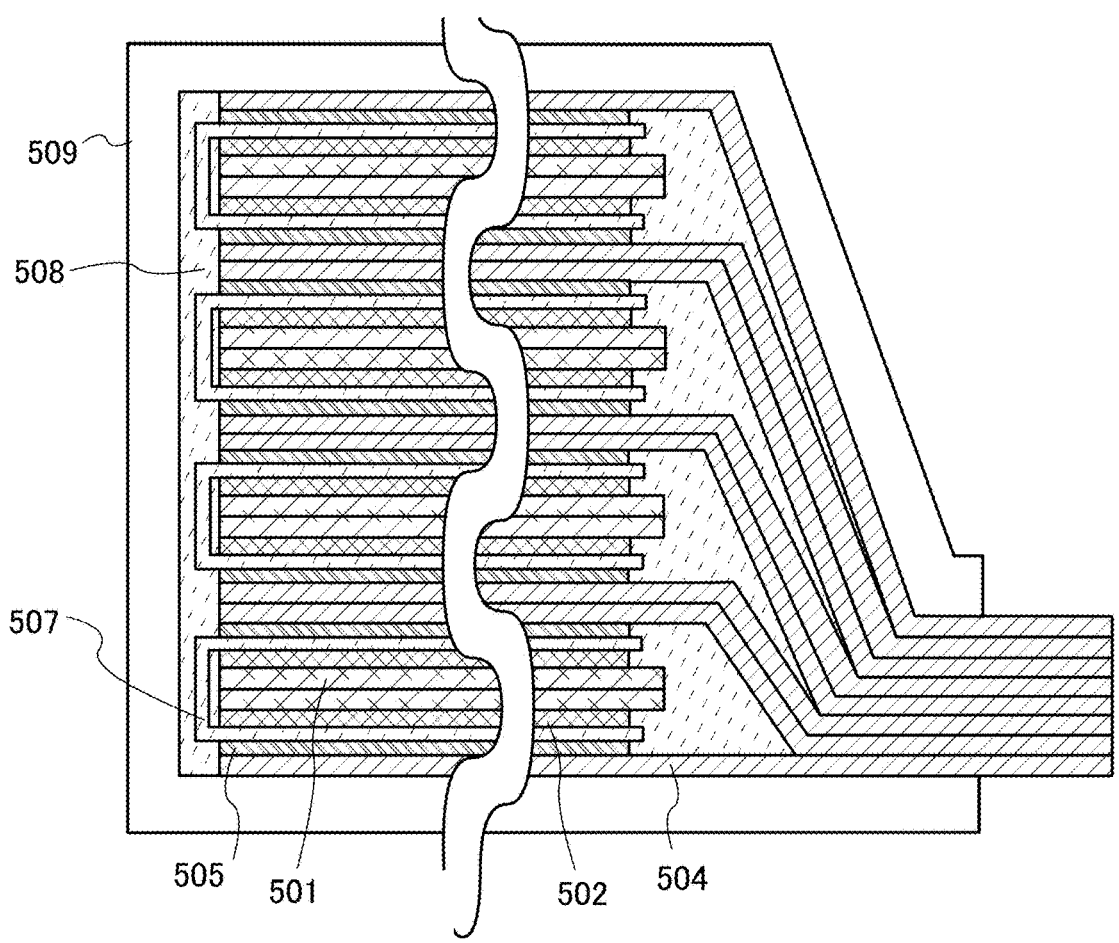

In FIGS. 10A to 10C, an example in which the secondary battery 980 includes a wound body in a space formed by films serving as exterior bodies is described; however, as illustrated in FIGS. 11A and 11B, a secondary battery may include a plurality of strip-shaped positive electrodes, a plurality of strip-shaped separators, and a plurality of strip-shaped negative electrodes in a space formed by films serving as exterior bodies, for example.

A laminated secondary battery 500 illustrated in FIG. 11A includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 in the exterior body 509. The exterior body 509 is filled with the electrolyte solution 508. The electrolyte solution described in Embodiment 2 can be used for the electrolyte solution 508.

In the laminated secondary battery 500 illustrated in FIG. 11A, the positive electrode current collector 501 and the negative electrode current collector 504 also serve as terminals for an electrical contact with an external portion. For this reason, the positive electrode current collector 501 and the negative electrode current collector 504 may be arranged so as to be partly exposed to the outside of the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, the lead electrode may be exposed to the outside of the exterior body 509.

As the exterior body 509 of the laminated secondary battery 500, for example, a laminate film having a three-layer structure can be employed in which a highly flexible metal thin film of aluminum, stainless steel, copper, nickel, or the like is provided over a film formed of a material such as polyethylene, polypropylene, polycarbonate, ionomer, or polyimide, and an insulating synthetic resin film of a polyamide-based resin, a polyester-based resin, or the like is provided over the metal thin film as the outer surface of the exterior body.

Figure 18A:
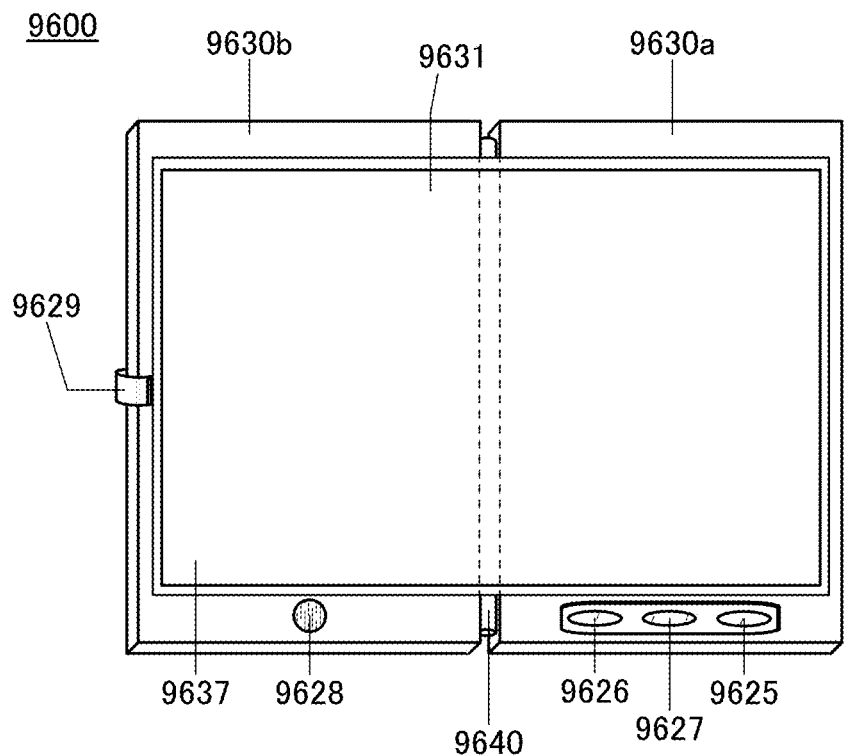
FIGS. 18A to 18C illustrate an example of an electronic device.

FIG. 11B illustrates an example of a cross-sectional structure of the laminated secondary battery 500. Although FIG. 18A illustrates an example including only two current collectors for simplicity, an actual battery includes a plurality of electrode layers.

The example in FIG. 11B includes 16 electrode layers. The laminated secondary battery 500 has flexibility even though including 16 electrode layers. FIG. 11B illustrates a structure including 8 layers of negative electrode current collectors 504 and 8 layers of positive electrode current collectors 501, i.e., 16 layers in total. Note that FIG. 11B illustrates a cross section of the lead portion of the negative electrode, and the 8 negative electrode current collectors 504 are bonded to each other by ultrasonic welding. It is needless to say that the number of electrode layers is not limited to 16, and may be more than 16 or less than 16. With a large number of electrode layers, the secondary battery can have high capacity. In contrast, with a small number of electrode layers, the secondary battery can have small thickness and high flexibility.

Figure 12:
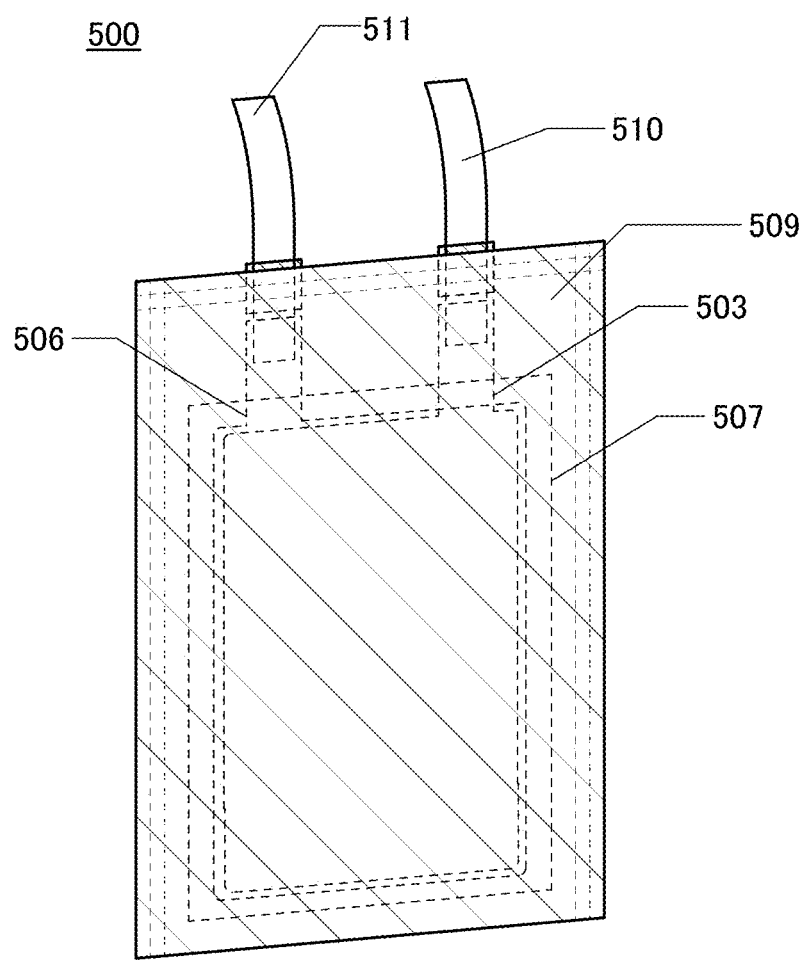
FIG. 12 is an external view of a secondary battery.
Figure 13:
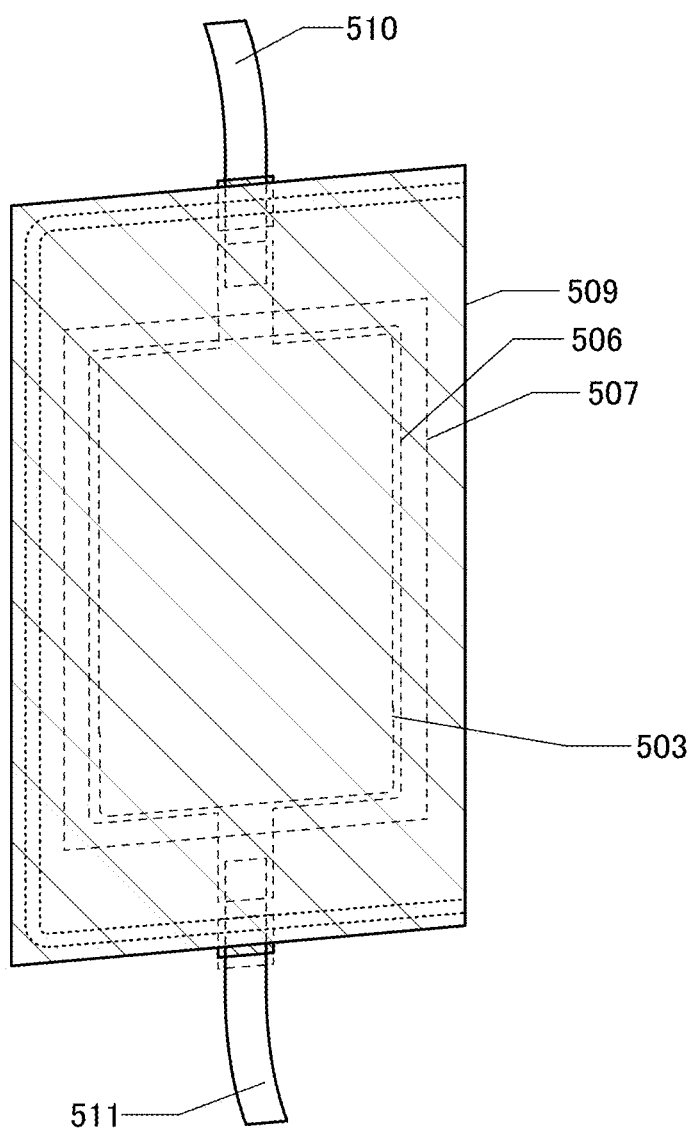
FIG. 13 is an external view of a secondary battery.

FIGS. 12 and 13 each illustrate an example of the external view of the laminated secondary battery 500. In FIGS. 12 and 13, the positive electrode 503, the negative electrode 506, the separator 507, the exterior body 509, a positive electrode lead electrode 510, and a negative electrode lead electrode 511 are included.

Figure 14A:
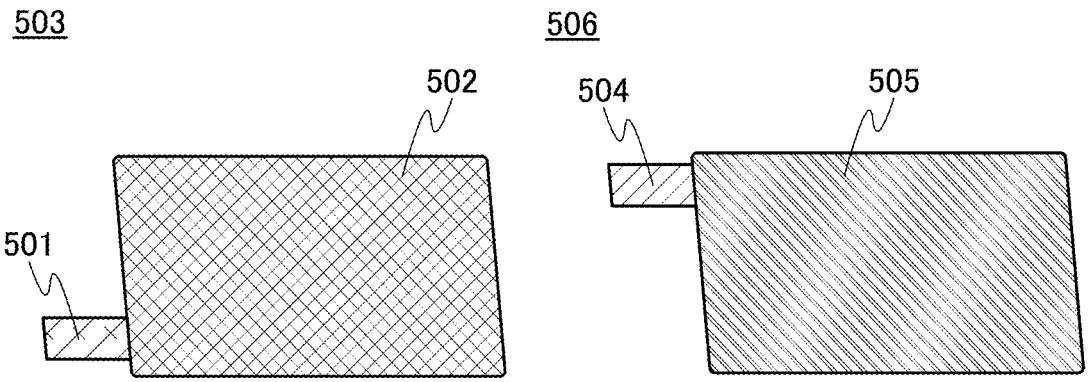
FIGS. 14A to 14C illustrate a manufacturing method of a secondary battery.

FIG. 14A illustrates external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes a region where the positive electrode current collector 501 is partly exposed (hereinafter referred to as a tab region). The negative electrode 506 includes the negative electrode current collector 504, and the negative electrode active material layer 505 is formed on a surface of the negative electrode current collector 504. The negative electrode 506 also includes a region where the negative electrode current collector 504 is partly exposed, that is, a tab region. The areas and the shapes of the tab regions included in the positive electrode and the negative electrode are not limited to those illustrated in FIG. 14A.

[Method for Manufacturing Laminated Secondary Battery]

Figure 14B:
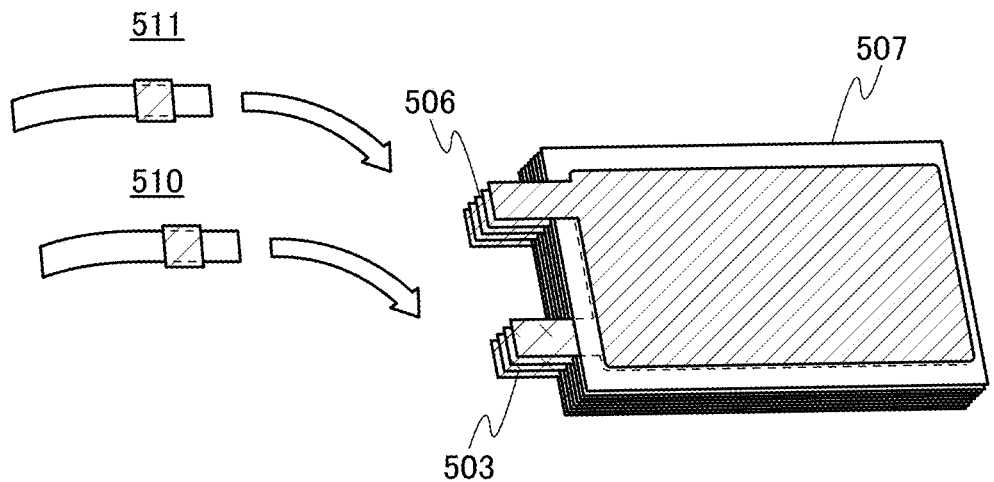

Here, an example of a method for manufacturing the laminated secondary battery whose external view is illustrated in FIG. 12 will be described with reference to FIGS. 14B and 14C.

First, the negative electrode 506, the separator 507, and the positive electrode 503 are stacked. FIG. 14B illustrates a stack including the negative electrode 506, the separator 507, and the positive electrode 503. An example described here includes 5 negative electrodes and 4 positive electrodes.

Next, the tab regions of the positive electrodes 503 are bonded to each other, and the tab region of the positive electrode on the outermost surface and the positive electrode lead electrode 510 are bonded to each other. The bonding can be performed by ultrasonic welding, for example. In a similar manner, the tab regions of the negative electrodes 506 are bonded to each other, and the negative electrode lead electrode 511 is bonded to the tab region of the negative electrode on the outermost surface.

After that, the negative electrode 506, the separator 507, and the positive electrode 503 are placed over the exterior body 509.

Figure 14C:
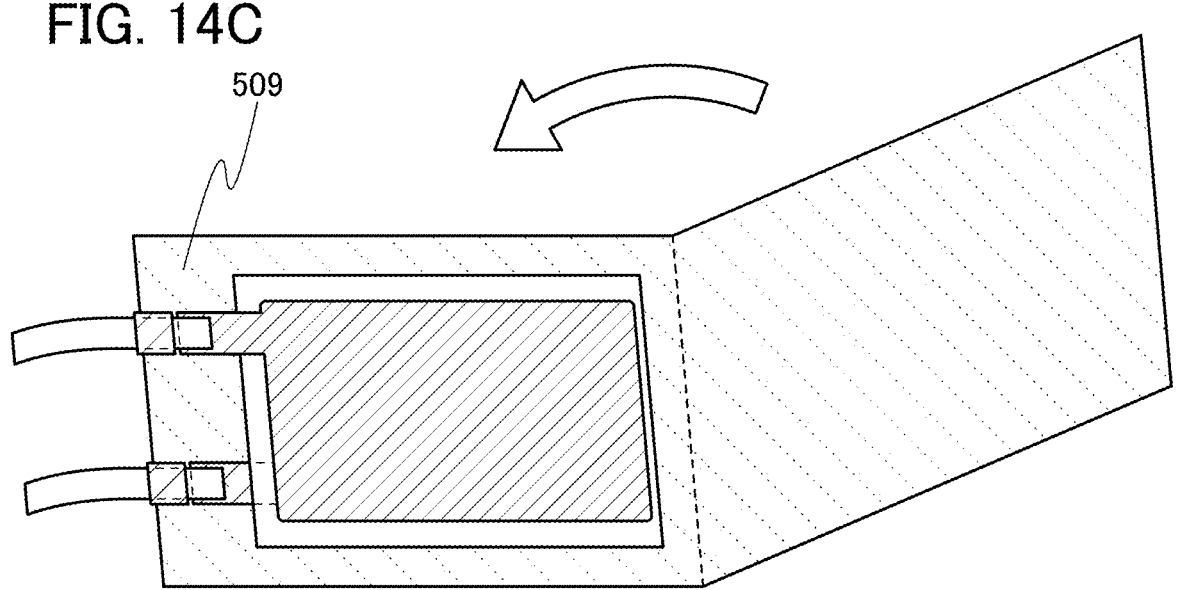

Subsequently, the exterior body 509 is folded along a dashed line as illustrated in FIG. 14C. Then, the outer edge of the exterior body 509 is bonded. The bonding can be performed by thermocompression bonding, for example. At this time, a part (or one side) of the exterior body 509 is left unbonded (to provide an inlet) so that the electrolyte solution 508 can be introduced later.

Next, the electrolyte solution 508 is introduced into the exterior body 509 from the inlet of the exterior body 509. The electrolyte solution 508 is preferably introduced in a reduced pressure atmosphere or in an inert gas atmosphere. Lastly, the inlet is bonded. In the above manner, the laminated secondary battery 500 can be manufactured.

When the positive electrode active material described in the above embodiment is used in the positive electrode 503, the secondary battery 500 with high capacity and excellent cycle characteristics can be obtained.

[Bendable Secondary Battery]

Next, an example of a bendable secondary battery is described with reference to FIGS. 15A, 15B1, 15B2, 15C and 15D and FIGS. 16A and 16B.

FIG. 15A is a schematic top view of a bendable secondary battery 250. FIGS. 15B1, 15B2, and 15C are schematic cross-sectional views taken along cutting line C1-C2, cutting line C3-C4, and cutting line A1-A2, respectively, in FIG. 15A. The battery 250 includes an exterior body 251 and a positive electrode 211a, and a negative electrode 211b held in the exterior body 251. A lead 212a electrically connected to the positive electrode 211a and a lead 212b electrically connected to the negative electrode 211b are extended to the outside of the exterior body 251. In addition to the positive electrode 211a and the negative electrode 211b, an electrolyte solution (not illustrated) is enclosed in a region surrounded by the exterior body 251.

Figure 16A:
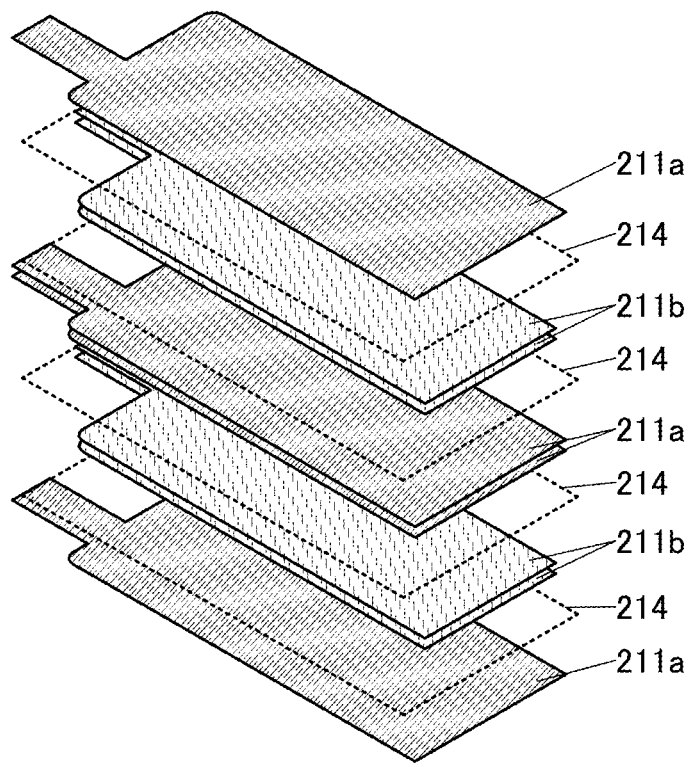
FIGS. 16A and 16B illustrate a bendable secondary battery.
Figure 16B:
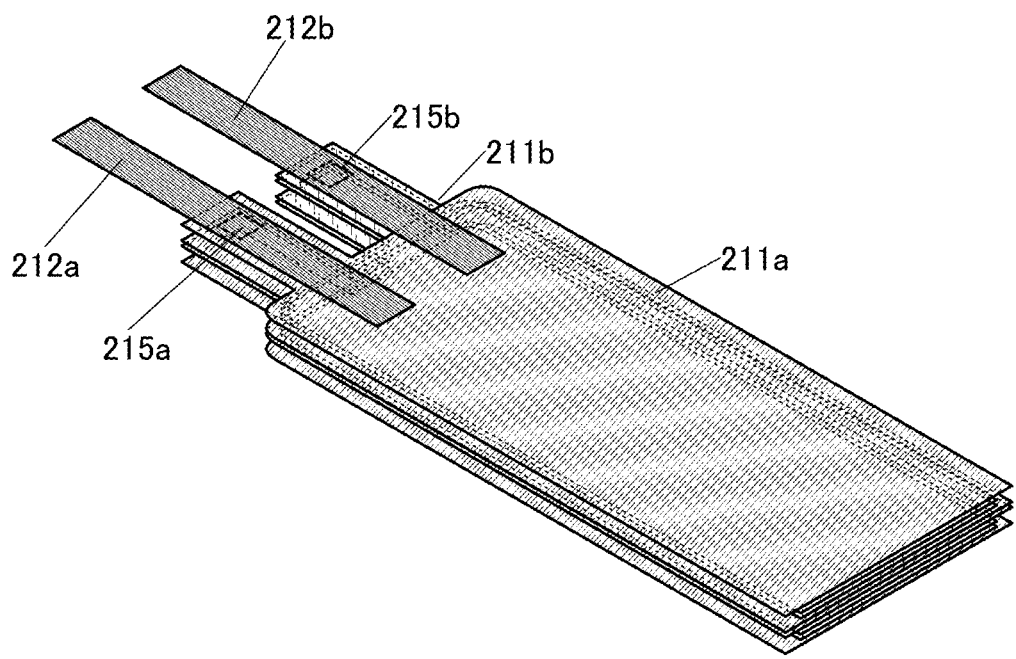

FIGS. 16A and 16B illustrate the positive electrode 211a and the negative electrode 211b included in the battery 250. FIG. 16A is a perspective view illustrating the stacking order of the positive electrode 211a, the negative electrode 211b, and the separator 214. FIG. 16B is a perspective view illustrating the lead 212a and the lead 212b in addition to the positive electrode 211a and the negative electrode 211b.

As illustrated in FIG. 16A, the battery 250 includes a plurality of strip-shaped positive electrodes 211a, a plurality of strip-shaped negative electrodes 211b, and a plurality of separators 14. The positive electrode 211a and the negative electrode 211b each include a projected tab portion and a portion other than the tab. A positive electrode active material layer is formed on one surface of the positive electrode 211a other than the tab portion, and a negative electrode active material layer is formed on one surface of the negative electrode 211b other than the tab portion.

The positive electrodes 211a and the negative electrodes 211b are stacked so that surfaces of the positive electrodes 211a on each of which the positive electrode active material layer is not formed are in contact with each other and that surfaces of the negative electrodes 211b on each of which the negative electrode active material layer is not formed are in contact with each other.

Furthermore, the separator 214 is provided between the surface of the positive electrode 211a on which the positive electrode active material is formed and the surface of the negative electrode 211b on which the negative electrode active material is formed. In FIG. 16A, the separator 214 is shown by a dotted line for easy viewing.

In addition, as illustrated in FIG. 16B, the plurality of positive electrodes 211a are electrically connected to the lead 212a in a bonding portion 215a. The plurality of negative electrodes 211b are electrically connected to the lead 212b in a bonding portion 215b.

Next, the exterior body 251 is described with reference to FIGS. 15B1, 15B2, 15C, and 15D.

The exterior body 251 has a film-like shape and is folded in half with the positive electrodes 211a and the negative electrodes 211b between facing portions of the exterior body 251. The exterior body 251 includes a folded portion 261, a pair of seal portions 262, and a seal portion 263. The pair of seal portions 262 is provided with the positive electrodes 211a and the negative electrodes 211b positioned therebetween and thus can also be referred to as side seals. The seal portion 263 has portions overlapping with the lead 212a and the lead 212b and can also be referred to as a top seal.

Part of the exterior body 251 that overlaps with the positive electrodes 211a and the negative electrodes 211b preferably has a wave shape in which crest lines 271 and trough lines 272 are alternately arranged. The seal portions 262 and the seal portion 263 of the exterior body 251 are preferably flat.

FIG. 15B1 shows a cross section cut along the part overlapping with the crest line 271. FIG. 15B2 shows a cross section cut along the part overlapping with the trough line 272. FIGS. 15B1 and 15B2 correspond to cross sections of the battery 250, the positive electrodes 211a, and the negative electrodes 211b in the width direction.

The distance between an end portion of the negative electrode 211b in the width direction and the seal portion 262 is referred to as a distance La. When the battery 250 changes in shape, for example, is bent, the positive electrode 211a and the negative electrode 211b change in shape such that the positions thereof are shifted from each other in the length direction as described later. At the time, if the distance La is too short, the exterior body 251 and the positive electrode 211a and the negative electrode 211b are rubbed hard against each other, so that the exterior body 251 is damaged in some cases. In particular, when a metal film of the exterior body 251 is exposed, there is concern that the metal film is corroded by the electrolyte solution. Thus, the distance La is preferably set as long as possible. However, if the distance La is too long, the volume of the battery 250 is increased.

The distance La between the end portion of the negative electrode 211b and the seal portion 262 is preferably increased as the total thickness of the stacked positive electrodes 211a and negative electrodes 211b is increased.

Specifically, when the total thickness of the stacked positive electrodes 211a and negative electrodes 211b and the separators 214 (not illustrated) is referred to as a thickness t, the distance La is preferably 0.8 times or more and 3.0 times or less, further preferably 0.9 times or more and 2.5 times or less, still further preferably 1.0 times or more and 2.0 times or less as large as the thickness t. When the distance La is in the above-described range, a compact battery which is highly reliable for bending can be obtained.

Furthermore, when a distance between the pair of seal portions 262 is referred to as a distance Lb, it is preferable that the distance Lb be sufficiently longer than a width Wb of the negative electrode 211b. In this case, even when the positive electrode 211a and the negative electrode 211b come into contact with the exterior body 251 by change in the shape of the battery 250 such as repeated bending, the position of part of the positive electrode 211a and the negative electrode 211b can be shifted in the width direction; thus, the positive and negative electrodes 211a and 211b and the exterior body 251 can be effectively prevented from being rubbed against each other.

For example, the difference between the distance Lb (i.e., the distance between the pair of seal portions 262) and the width Wb of the negative electrode 211b is preferably 1.6 times or more and 6.0 times or less, further preferably 1.8 times or more and 5.0 times or less, still further preferably 2.0 times or more and 4.0 times or less as large as the total thickness t of the positive electrode 211a and the negative electrode 211b.

In other words, the distance Lb, the width Wb, and the thickness t preferably satisfy the relation of the following Formula 1.

$$\frac{Lb - Wb}{2t} \geq a \qquad \text{(Formula 1)}$$

In the formula, a is 0.8 or more and 3.0 or less, preferably 0.9 or more and 2.5 or less, further preferably 1.0 or more and 2.0 or less.

FIG. 15C illustrates a cross section including the lead 212a and corresponds to a cross section of the battery 250, the positive electrode 211a, and the negative electrode 211b in the length direction. As illustrated in FIG. 15C, a space 273 is preferably provided between end portions of the positive electrode 211a and the negative electrode 211b in the length direction and the exterior body 251 in the folded portion 261.

FIG. 15D is a schematic cross-sectional view of the battery 250 in a state of being bent. FIG. 15D corresponds to a cross section along cutting line B1-B2 in FIG. 15A.

When the battery 250 is bent, a part of the exterior body 251 positioned on the outer side in bending is unbent and the other part positioned on the inner side changes its shape as it shrinks. More specifically, the part of the exterior body 251 positioned on the outer side in bending changes its shape such that the wave amplitude becomes smaller and the length of the wave period becomes larger. In contrast, the part of the exterior body 251 positioned on the inner side in bending changes its shape such that the wave amplitude becomes larger and the length of the wave period becomes smaller. When the exterior body 251 changes its shape in this manner, stress applied to the exterior body 251 due to bending is relieved, so that a material itself that forms the exterior body 251 does not need to expand and contract. As a result, the battery 250 can be bent with weak force without damage to the exterior body 251.

Furthermore, as illustrated in FIG. 15D, when the battery 250 is bent, the positions of the positive electrode 211a and the negative electrode 211b are shifted relatively. At this time, ends of the stacked positive electrodes 211a and negative electrodes 211b on the seal portion 263 side are fixed by the fixing member 217. Thus, the plurality of positive electrodes 211a and the plurality of negative electrodes 211b are more shifted at a position closer to the folded portion 261. Therefore, stress applied to the positive electrode 211a and the negative electrode 211b is relieved, and the positive electrode 211a and the negative electrode 211b themselves do not need to expand and contract. As a result, the battery 250 can be bent without damage to the positive electrode 211a and the negative electrode 211b.

Furthermore, the space 273 is provided between the end portions of the positive and negative electrodes 211a and 211b and the exterior body 251, whereby the relative positions of the positive electrode 211a and the negative electrode 211b can be shifted while the end portions of the positive electrode 211a and the negative electrode 211b located on an inner side when the battery 250 is bent do not contact the exterior body 251.

In the battery 250 illustrated in FIGS. 15A, 15B1, 15B2, 15C and 15D and FIGS. 16A and 16B, the exterior body, the positive electrode 211a, and the negative electrode 211b are less likely to be damaged and the battery characteristics are less likely to deteriorate even when the battery 250 is repeatedly bent and unbent. When the positive electrode active material described in the above embodiment is used for the positive electrode 211a included in the battery 250, a battery with more excellent cycle characteristics can be obtained.

Embodiment 4

In this embodiment, examples of electronic devices including the secondary battery of one embodiment of the present invention are described.

First, FIGS. 17A to 17G show examples of electronic devices including the bendable secondary battery described in Embodiment 3. Examples of an electronic device including a flexible secondary battery include television sets (also referred to as televisions or television receivers), monitors of computers or the like, digital cameras or digital video cameras, digital photo frames, mobile phones (also referred to as cellular phones or mobile phone devices), portable game machines, portable information terminals, audio reproducing devices, and large game machines such as pachinko machines.

In addition, a flexible secondary battery can be incorporated along a curved inside/outside wall surface of a house or a building or a curved interior/exterior surface of an automobile.

Figure 17A:
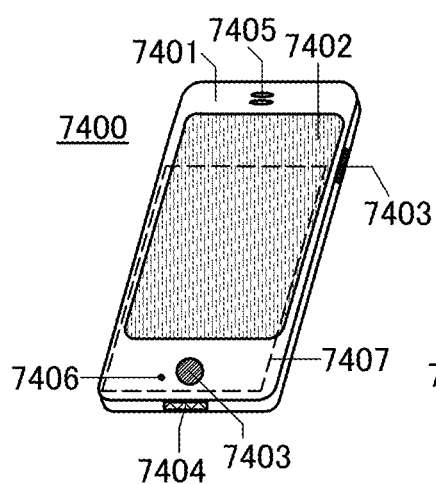
FIGS. 17A to 17G illustrate an example of an electronic device.

FIG. 17A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a secondary battery 7407. When the secondary battery of one embodiment of the present invention is used as the secondary battery 7407, a lightweight mobile phone with a long lifetime can be provided.

Figure 17B:
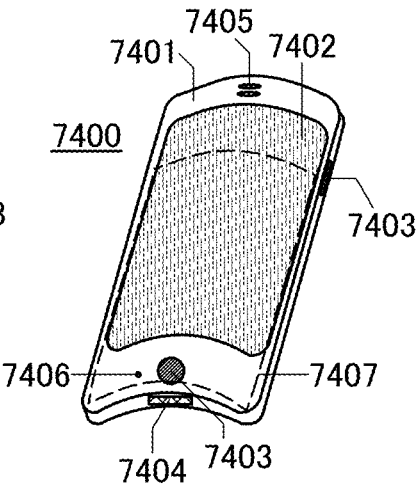
Figure 17C:
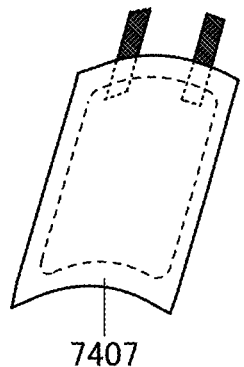

FIG. 17B illustrates the mobile phone 7400 that is bent. When the whole mobile phone 7400 is curved by external force, the secondary battery 7407 included in the mobile phone 7400 is also curved. FIG. 17C illustrates the curved secondary battery 7407. The secondary battery 7407 is a thin storage battery. The secondary battery 7407 is curved and fixed. Note that the secondary battery 7407 includes a lead electrode 7408 electrically connected to a current collector 7409.

Figure 17D:
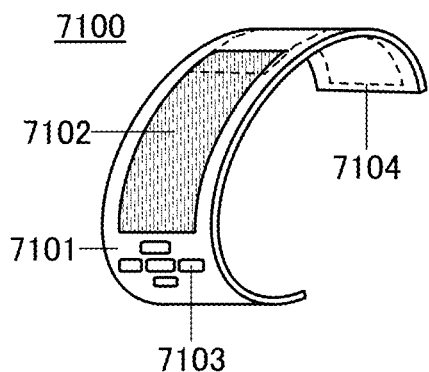
Figure 17E:
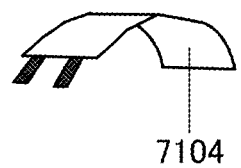

FIG. 17D illustrates an example of a bangle display device. A portable display device 7100 includes a housing 7101, a display portion 7102, an operation button 7103, and a secondary battery 7104. FIG. 17E illustrates the bent secondary battery 7104. When the curved secondary battery 7104 is on a user's arm, the housing changes its form and the curvature of a part or the whole of the secondary battery 7104 is changed. Note that the radius of curvature of a curve at a point refers to the radius of the circular arc that best approximates the curve at that point. The reciprocal of the radius of curvature is curvature. Specifically, part or the whole of the housing or the main surface of the secondary battery 7104 is changed in the range of radius of curvature from 40 mm to 150 mm. When the radius of curvature at the main surface of the secondary battery 7104 is greater than or equal to 40 mm and less than or equal to 150 mm, the reliability can be kept high. When the secondary battery of one embodiment of the present invention is used as the secondary battery 7104, a lightweight portable display device with a long lifetime can be provided.

Figure 17F:
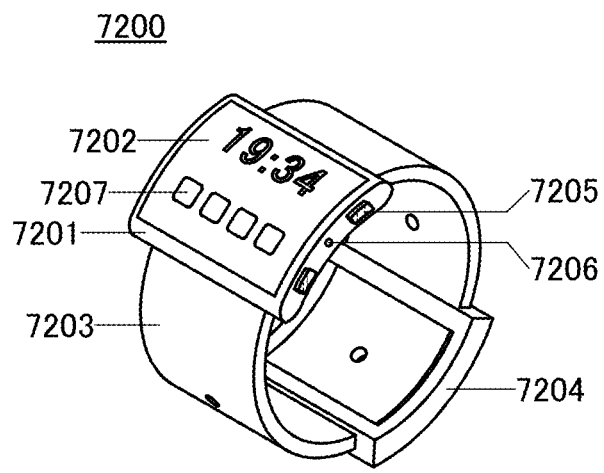

FIG. 17F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. For example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 includes the secondary battery of one embodiment of the present invention. When the secondary battery of one embodiment of the present invention is used, a lightweight portable information terminal with a long lifetime can be provided. For example, the secondary battery 7104 illustrated in FIG. 17E that is in the state of being curved can be provided in the housing 7201. Alternatively, the secondary battery 7104 illustrated in FIG. 17E can be provided in the band 7203 such that it can be curved.

A portable information terminal 7200 preferably includes a sensor. As the sensor, for example a human body sensor such as a fingerprint sensor, a pulse sensor, or a temperature sensor, a touch sensor, a pressure sensitive sensor, an acceleration sensor, or the like is preferably mounted.

Figure 17G:
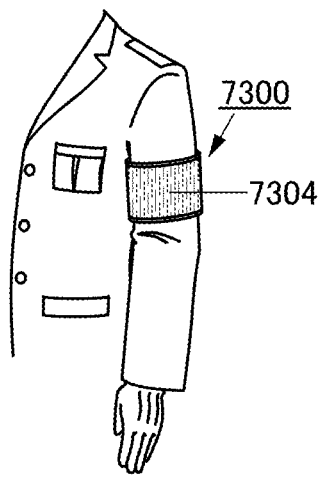

FIG. 17G illustrates an example of an armband display device. A display device 7300 includes a display portion 7304 and the secondary battery of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

When the secondary battery of one embodiment of the present invention is used as the secondary battery included in the display device 7300, a lightweight display device with a long lifetime can be provided.

Figure 18B:
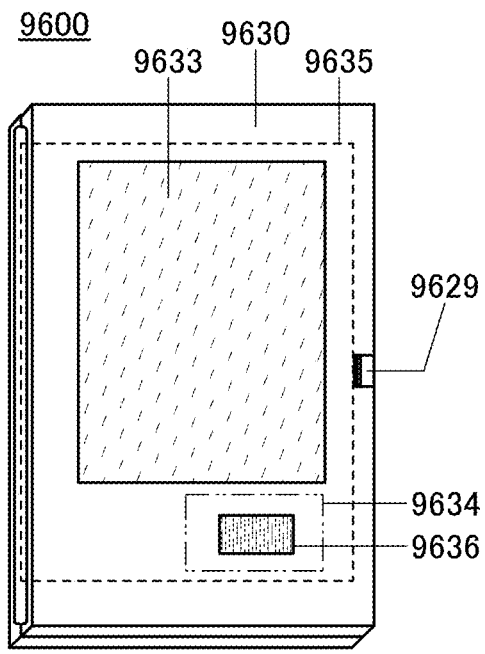

Next, FIGS. 18A and 18B illustrate an example of a foldable tablet terminal. A tablet terminal 9600 illustrated in FIGS. 18A and 18B includes a housing 9630a, a housing 9630b, a movable portion 9640 connecting the housings 9630a and 9630b, a display portion 9631, a display mode changing switch 9626, a power switch 9627, a power saving mode changing switch 9625, a fastener 9629, and an operation switch 9628. A flexible panel is used for the display portion 9631, whereby a tablet terminal with a larger display portion can be provided. FIG. 18A illustrates the tablet terminal 9600 that is opened, and FIG. 18B illustrates the tablet terminal 9600 that is closed.

The tablet terminal 9600 includes a power storage unit 9635 inside the housings 9630a and 9630b. The power storage unit 9635 is provided across the housings 9630a and 9630b, passing through the movable portion 9640.

Part of the display portion 9631 can be a touch panel region and data can be input when a displayed operation key is touched. A switching button for showing/hiding a keyboard of the touch panel is touched with a finger, a stylus, or the like, so that keyboard buttons can be displayed on the display portion 9631.

The display mode switch 9626 can switch the display between a portrait mode and a landscape mode, and between monochrome display and color display, for example. The power saving mode changing switch 9625 can control display luminance in accordance with the amount of external light in use of the tablet terminal 9600, which is measured with an optical sensor incorporated in the tablet terminal 9600. Another detection device including a sensor for detecting inclination, such as a gyroscope sensor or an acceleration sensor, may be incorporated in the tablet terminal, in addition to the optical sensor.

The tablet terminal is closed in FIG. 18B. The tablet terminal includes the housing 9630, a solar cell 9633, and a charge and discharge control circuit 9634 including a DC-DC converter 9636. The secondary battery of one embodiment of the present invention is used as the power storage unit 9635.

The tablet terminal 9600 can be folded such that the housings 9630a and 9630b overlap with each other when not in use. Thus, the display portion 9631 can be protected, which increases the durability of the tablet terminal 9600.

With the power storage unit 9635 including the secondary battery of one embodiment of the present invention which has high capacity and excellent cycle characteristics, the tablet terminal 9600 which can be used for a long time for a long period can be provided.

The tablet terminal illustrated in FIGS. 18A and 18B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the power storage unit 9635 can be charged efficiently.

Figure 18C:
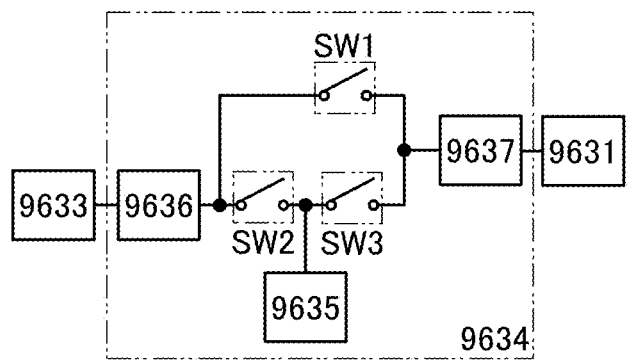

The structure and operation of the charge and discharge control circuit 9634 illustrated in FIG. 18B will be described with reference to a block diagram in FIG. 18C. The solar cell 9633, the power storage unit 9635, the DC-DC converter 9636, a converter 9637, switches SW1 to SW3, and the display portion 9631 are illustrated in FIG. 18C, and the power storage unit 9635, the DC-DC converter 9636, the converter 9637, and the switches SW1 to SW3 correspond to the charge and discharge control circuit 9634 in FIG. 18B.

First, an example of the operation in the case where power is generated by the solar cell 9633 using external light is described. The voltage of electric power generated by the solar cell is raised or lowered by the DC-DC converter 9636 to a voltage for charging the power storage unit 9635. When the power from the solar cell 9633 is used for the operation of the display portion 9631, the switch SW1 is turned on and the voltage of the power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module that transmits and receives power wirelessly (without contact) to charge the battery or with a combination of other charging means.

Figure 19:
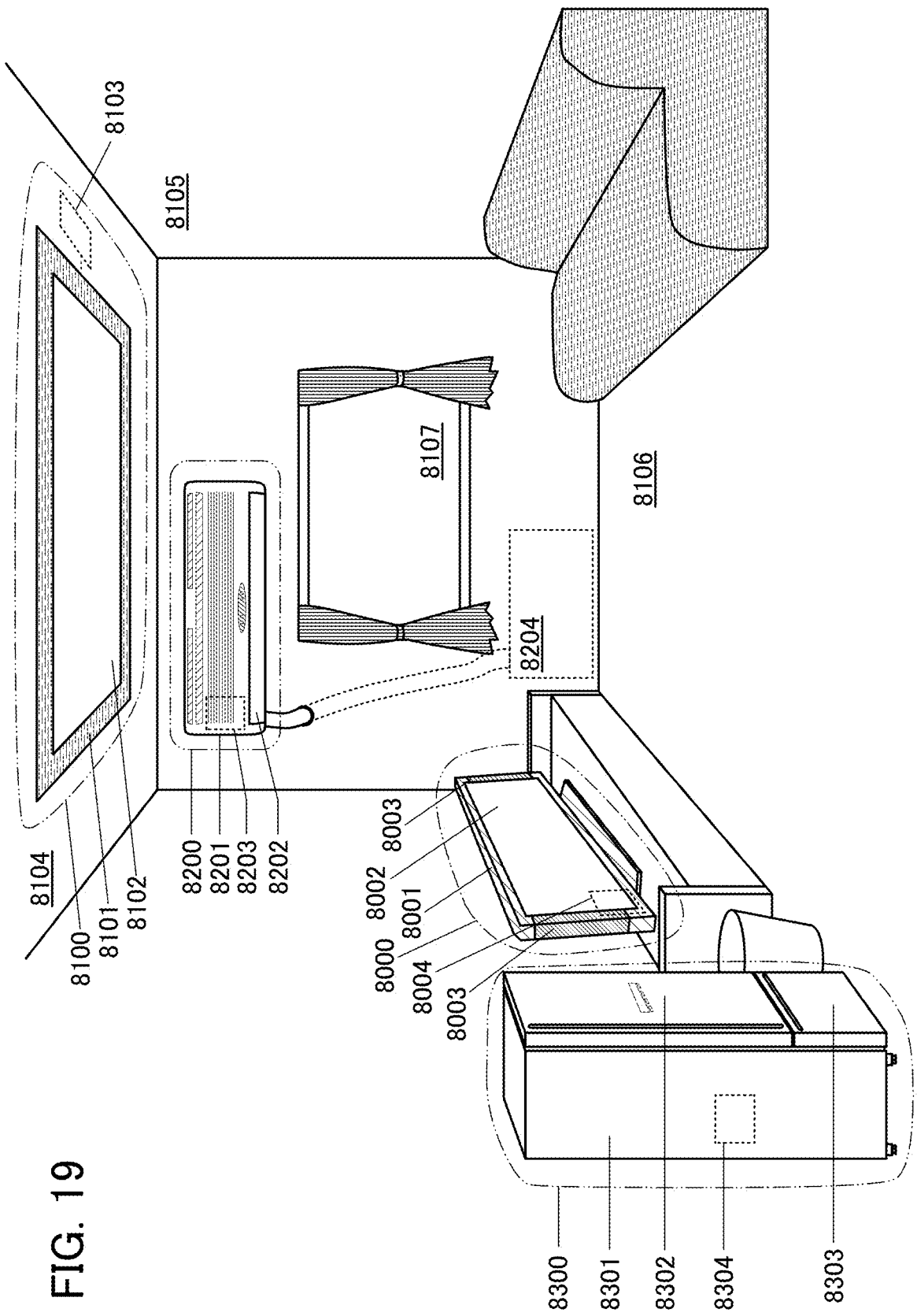
FIG. 19 illustrates an example of an electronic device.

FIG. 19 illustrates other examples of electronic devices. In FIG. 19, a display device 8000 is an example of an electronic device including a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive electric power from a commercial power supply. Alternatively, the display device 8000 can use electric power stored in the secondary battery 8004. Thus, the display device 8000 can operate with the use of the secondary battery 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoretic display device, a digital micromirror device (DMD), a plasma display panel (PDP), or a field emission display (FED) can be used for the display portion 8002.

Note that the display device includes, in its category, all of information display devices for personal computers, advertisement displays, and the like other than TV broadcast reception.

In FIG. 19, an installation lighting device 8100 is an example of an electronic device using a secondary battery 8103 of one embodiment of the present invention. Specifically, the lighting device 8100 includes a housing 8101, a light source 8102, the secondary battery 8103, and the like. Although FIG. 19 illustrates the case where the secondary battery 8103 is provided in a ceiling 8104 on which the housing 8101 and the light source 8102 are installed, the secondary battery 8103 may be provided in the housing 8101. The lighting device 8100 can receive electric power from a commercial power supply. Alternatively, the lighting device 8100 can use electric power stored in the secondary battery 8103. Thus, the lighting device 8100 can operate with the use of the secondary battery 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 19 as an example, the secondary battery of one embodiment of the present invention can be used as an installation lighting device provided in, for example, a wall 8105, a floor 8106, a window 8107, or the like other than the ceiling 8104. Alternatively, the secondary battery can be used in a tabletop lighting device or the like.

As the light source 8102, an artificial light source which emits light artificially by using power can be used. Specifically, an incandescent lamp, a discharge lamp such as a fluorescent lamp, and a light-emitting element such as an LED or an organic EL element are given as examples of the artificial light source.

In FIG. 19, an air conditioner including an indoor unit 8200 and an outdoor unit 8204 is an example of an electronic device including a secondary battery 8203 of one embodiment of the present invention. Specifically, the indoor unit 8200 includes a housing 8201, an air outlet 8202, the secondary battery 8203, and the like. Although FIG. 19 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply. Alternatively, the air conditioner can use electric power stored in the secondary battery 8203. Particularly in the case where the secondary batteries 8203 are provided in both the indoor unit 8200 and the outdoor unit 8204, the air conditioner can operate with the use of the secondary battery 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 19 as an example, the secondary battery of one embodiment of the present invention can be used in an air conditioner in which the functions of an indoor unit and an outdoor unit are integrated in one housing.

In FIG. 19, an electric refrigerator-freezer 8300 is an example of an electronic device using a secondary battery 8304 of one embodiment of the present invention. Specifically, the electric refrigerator-freezer 8300 includes a housing 8301, a refrigerator door 8302, a freezer door 8303, the secondary battery 8304, and the like. The secondary battery 8304 is provided in the housing 8301 in FIG. 19. The electric refrigerator-freezer 8300 can receive electric power from a commercial power supply. Alternatively, the electric refrigerator-freezer 8300 can use electric power stored in the secondary battery 8304. Thus, the electric refrigerator-freezer 8300 can operate with the use of the secondary battery 8304 of one embodiment of the present invention as an uninterruptible power supply even when electric power cannot be supplied from a commercial power supply due to power failure or the like.

In addition, in a time period when electronic devices are not used, particularly when the proportion of the amount of power which is actually used to the total amount of power which can be supplied from a commercial power source (such a proportion referred to as a usage rate of power) is low, power can be stored in the secondary battery, whereby the usage rate of power can be reduced in a time period when the electronic devices are used. For example, in the case of the electric refrigerator-freezer 8300, power can be stored in the secondary battery 8304 in night time when the temperature is low and the refrigerator door 8302 and the freezer door 8303 are not often opened and closed. On the other hand, in daytime when the temperature is high and the refrigerator door 8302 and the freezer door 8303 are frequently opened and closed, the secondary battery 8304 is used as an auxiliary power source; thus, the usage rate of power in daytime can be reduced.

According to one embodiment of the present invention, the secondary battery can have excellent cycle characteristics. Furthermore, in accordance with one embodiment of the present invention, a secondary battery with high capacity can be obtained; thus, the secondary battery itself can be made more compact and lightweight. Thus, the secondary battery of one embodiment of the present invention is used in the electronic device described in this embodiment, whereby a more lightweight electronic device with a longer lifetime can be obtained. This embodiment can be implemented in appropriate combination with any of the other embodiments.

Embodiment 5

In this embodiment, examples of vehicles including the secondary battery of one embodiment of the present invention are described.

The use of secondary batteries in vehicles enables production of next-generation clean energy vehicles such as hybrid electric vehicles (HEVs), electric vehicles (EVs), and plug-in hybrid electric vehicles (PHEVs).

Figure 20A:
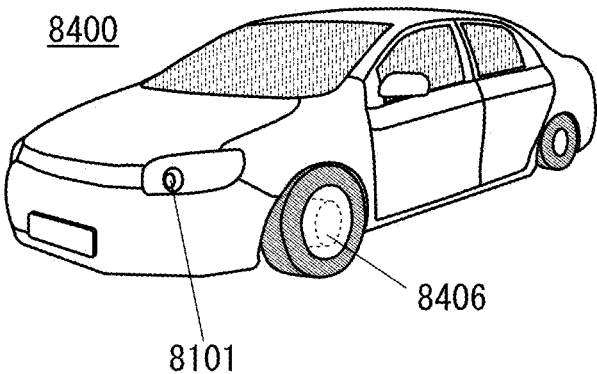
FIGS. 20A to 20C illustrate an example of an electronic device.
Figure 20B:
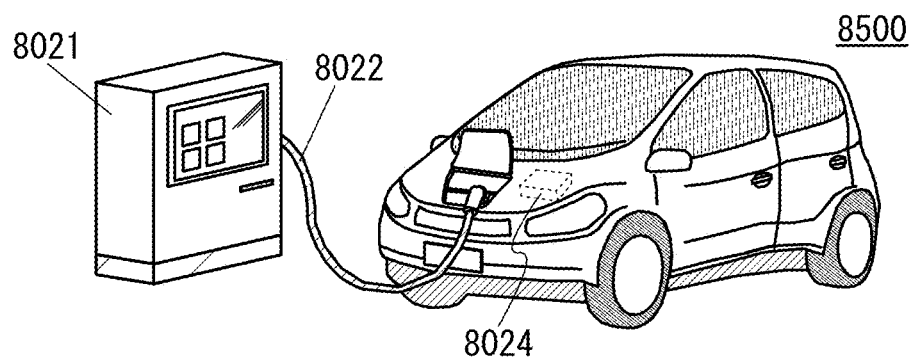
Figure 20C:
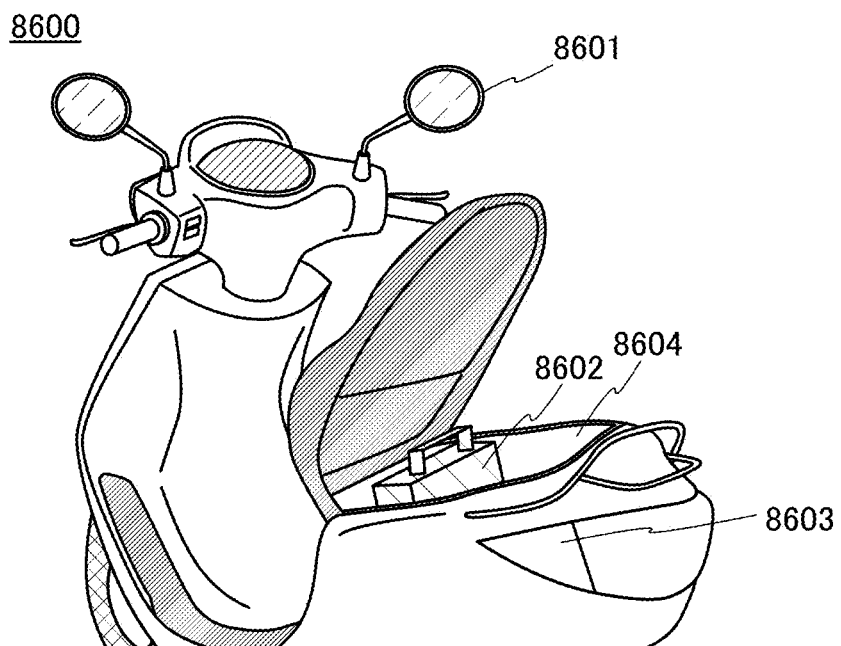
Figure 21A:
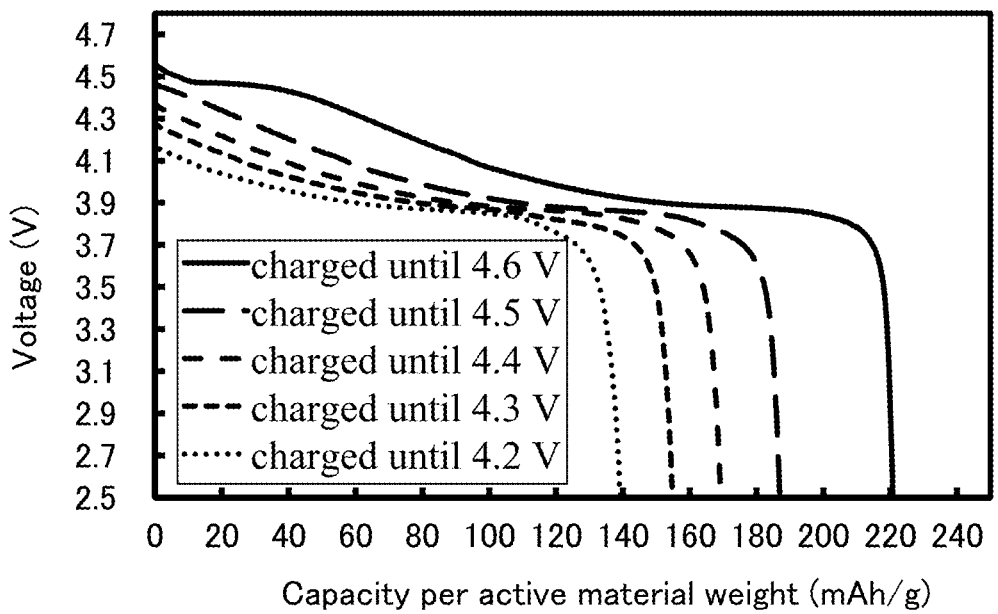
FIGS. 21A and 21B show characteristics of a conventional secondary battery.
Figure 21B:
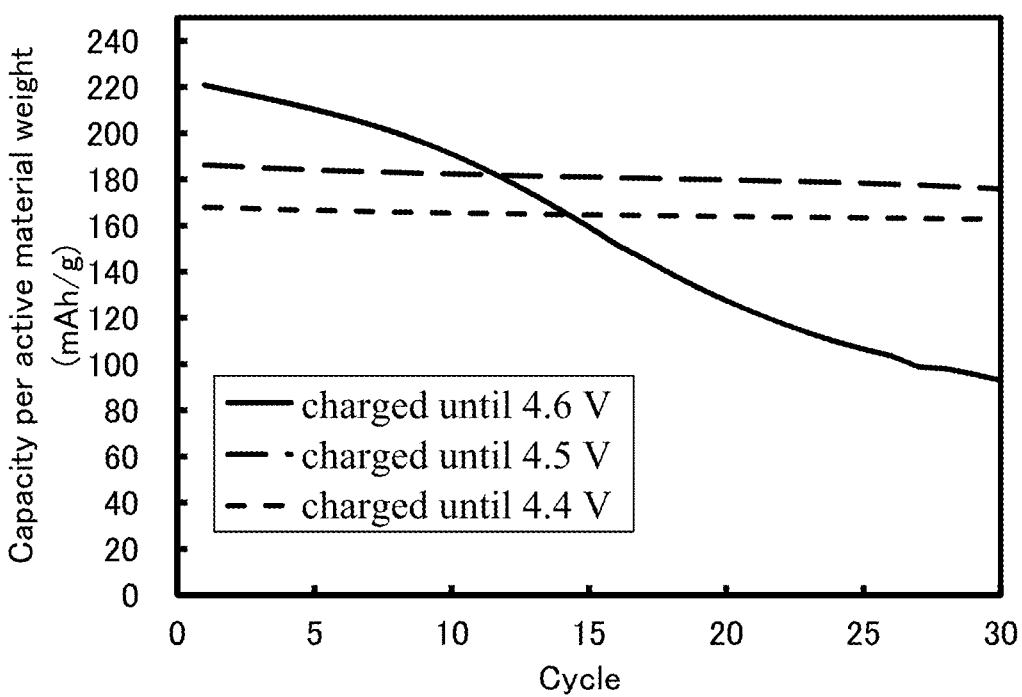

FIGS. 20A to 20C each illustrate an example of a vehicle using the secondary battery of one embodiment of the present invention. An automobile 8400 illustrated in FIG. 20A is an electric vehicle that runs on the power of an electric motor. Alternatively, the automobile 8400 is a hybrid electric vehicle capable of driving appropriately using either an electric motor or an engine. One embodiment of the present invention can provide a high-mileage vehicle. The automobile 8400 includes the secondary battery. As the secondary battery, the modules of the secondary batteries illustrated in FIGS. 12C and 12D may be arranged to be used in a floor portion in the automobile. Alternatively, a battery pack in which a plurality of secondary batteries each of which is illustrated in FIGS. 17A to 17C are combined may be placed in a floor portion in the automobile. The secondary battery is used not only for driving an electric motor 8406, but also for supplying electric power to a light-emitting device such as a headlight 8401 or a room light (not illustrated).

The secondary battery can also supply electric power to a display device of a speedometer, a tachometer, or the like included in the automobile 8400. Furthermore, the secondary battery can supply electric power to a semiconductor device included in the automobile 8400, such as a navigation system.

FIG. 20B illustrates an automobile 8500 including the secondary battery. The automobile 8500 can be charged when the secondary battery is supplied with electric power through external charging equipment by a plug-in system, a contactless power feeding system, or the like. In FIG. 20B, a secondary battery 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. With the use of a plug-in technique, the secondary battery 8024 included in the automobile 8500 can be charged by being supplied with electric power from the outside, for example. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. A solar cell may be provided in the exterior of the automobile to charge the secondary battery when the automobile stops or moves. To supply electric power in such a contactless manner, an electromagnetic induction method or a magnetic resonance method can be used.

FIG. 20C shows an example of a motorcycle using the secondary battery of one embodiment of the present invention. A motor scooter 8600 illustrated in FIG. 20C includes a secondary battery 8602, side mirrors 8601, and indicators 8603. The secondary battery 8602 can supply electric power to the indicators 8603.

Furthermore, in the motor scooter 8600 illustrated in FIG. 20C, the secondary battery 8602 can be held in a storage unit under seat 8604. It is preferable that the secondary battery 8602 can be held in the storage unit under seat 8604 even with a small size. It is preferable that the secondary battery 8602 is detachable; thus, the secondary battery 8602 is carried indoors when it is charged, and is stored before the motorcycle is driven.

In accordance with one embodiment of the present invention, the secondary battery can have improved cycle characteristics and the capacity of the secondary battery can be increased. Thus, the secondary battery itself can be made more compact and lightweight. The compact and lightweight secondary battery contributes to a reduction in the weight of a vehicle, and thus increases the driving radius. Furthermore, the secondary battery included in the vehicle can be used as a power source for supplying electric power to products other than the vehicle. In such a case, the use of a commercial power source can be avoided at peak time of electric power demand, for example. If the use of a commercial power source can be avoided at peak time of electric power demand, the avoidance can contribute to energy saving and a reduction in carbon dioxide emissions. Moreover, if the cycle characteristics are excellent, the secondary battery can be used for a long period; thus, the use amount of rare metals such as cobalt can be reduced.

This embodiment can be implemented in appropriate combination with the other embodiments.

Example 1

In this example, cobalt was used for a transition metal contained in a first region of a positive electrode active material. Then, the positive electrode active material prepared by adding magnesium and fluorine to the starting material, and a positive electrode active material prepared without adding magnesium and fluorine as a comparative example were prepared and their characteristics were analyzed. Also, the cycle characteristics were evaluated by changing the concentration of magnesium and fluorine added to the starting material.

<Fabrication of Samples 1 to 6 of Positive Electrode Active Material>

Samples 1 to 6 of positive electrode active materials were prepared with varying concentrations of magnesium source and fluorine source. Lithium carbonate and cobalt oxide were used as common starting materials. Magnesium oxide and lithium fluoride were used as addition starting materials different from each sample.

In the sample 1, magnesium oxide and lithium fluoride were added to the starting material so as to contain 0.5 atomic % of magnesium and 1 atomic % of fluorine with respect to cobalt contained in the common starting material. Hereinafter, this is referred to as "in the sample 1, 0.5 mol % MgO and 1 mol % LiF were used as an addition starting material".

As described above, in this specification and the like, the amount of the addition starting material is indicated by atomic % or mol % with respect to the transition metal contained in the common starting material. The same applies to the sample 2 and the following.

For the sample 2, 0.5 mol % MgO and 0.5 mol % LiF with respect to cobalt were used as addition starting materials. For the sample 3, 0.5 mol % MgO and 2 mol % LiF were used as addition starting materials. For the sample 4 which is a comparative example, 1 mol % LiF was used as an addition starting material, and magnesium was not added. For the sample 5 which is a comparative example, 0.5 mol % MgO was used as an addition starting material, and fluorine was not added. For the sample 6 which is a comparative example, neither magnesium nor fluorine was added. The common starting materials and the addition starting materials for each sample are shown in Table 1.

TABLE 1

| | Common starting material | Addition starting material | Mg:F (atomic ratio) |
|---|---|---|---|
| Sample 1 | Li₂CO₃, Co₃O₄ | 0.5 mol % MgO, 1 mol % LiF | 1:2 |
| Sample 2 | | 0.5 mol % MgO, 0.5 mol % LiF | 1:1 |
| Sample 3 | | 0.5 mol % MgO, 2 mol % LiF | 1:4 |
| Sample 4 (comparative example) | | 1 mol % LiF | — |
| Sample 5 (comparative example) | | 0.5 mol % MgO | — |
| Sample 6 (comparative example) | | — | — |

A positive electrode active material was obtained from each of the above six samples in the following process, as in the manufacturing method described in Embodiment 1: mixing of starting materials, first heating, cooling, sieving, second heating, cooling, and recovery. For the particles in the middle of this process and the positive electrode active material after the process, the following analysis was carried out.

<STEM-EDX>

Figure 22A:
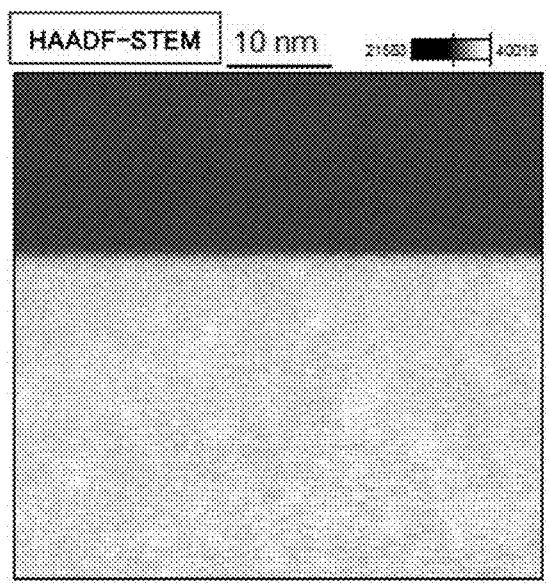
FIGS. 22A to 22C are a STEM image and EDX mappings of a positive electrode active material in Example 1.
Figure 22B:
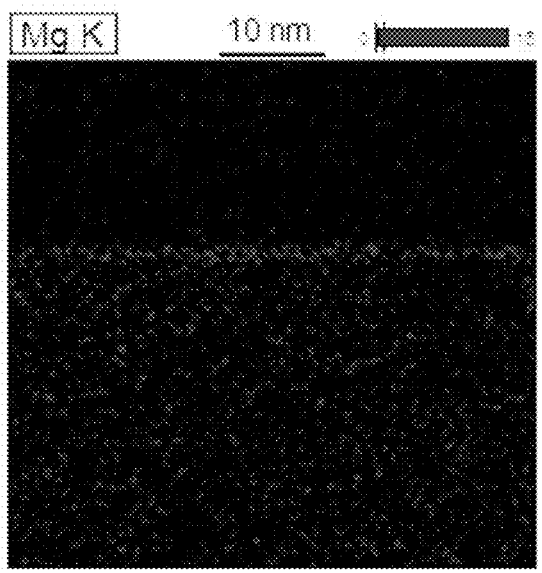
Figure 22C:
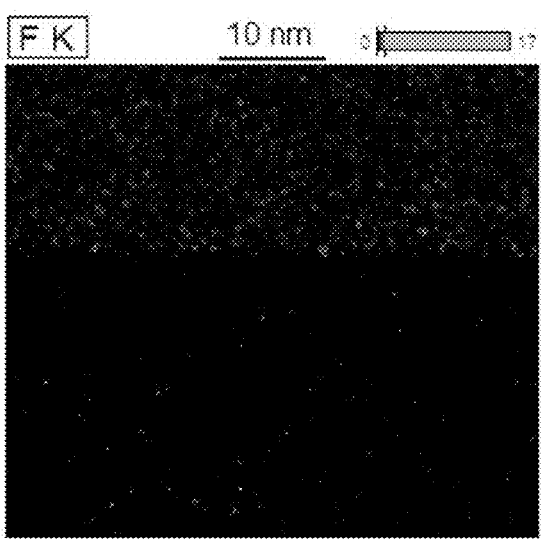
Figure 23A:
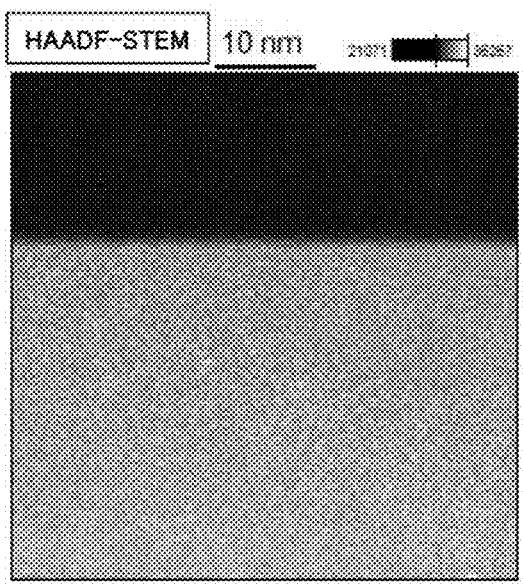
FIGS. 23A to 23C are a STEM image and EDX mappings of a positive electrode active material in Example 1.
Figure 23B:
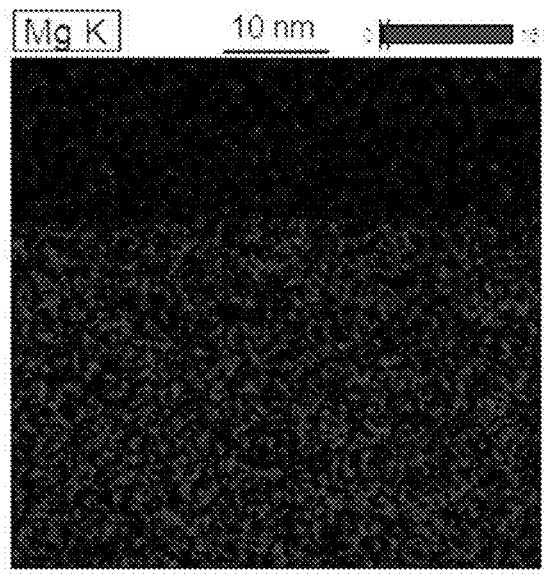
Figure 23C:
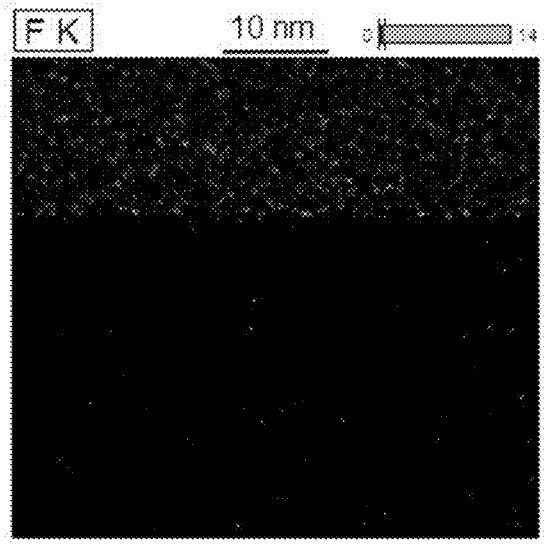

For the sample 1 and the sample 5 (comparative example), a section near the surface of the particle before the second heating was analyzed using STEM-EDX. FIGS. 22A to 22C show STEM-EDX images of the sample 1 before the second heating. FIGS. 23A to 23C show STEM-EDX images of the sample 5 (comparative example) before the second heating. FIGS. 22A and 23A show STEM images. FIGS. 22B and 23B show magnesium mappings. FIGS. 22C and 23C show fluorine mappings.

As shown in FIG. 22B, in the sample 1 containing magnesium and fluorine as starting materials, it was observed that magnesium segregated to some extent near the surface of the particles before performing the second heating. The segregated region was about 1 nm to 2 nm from the surface of the particles.

On the other hand, as shown in the EDX mapping in FIG. 23B, in the sample 5 containing magnesium as a starting material but containing no fluorine, no segregation of magnesium into the vicinity of the surface was observed.

Note that as shown in FIG. 22C and FIG. 23C, almost no fluorine was observed in an inner portion of the positive electrode active material in both of the sample 1 and the sample 5. This is thought to be because EDX is hard to detect fluorine which is a lightweight element.

<X-Ray Photoelectron Spectroscopy (XPS)>

Next, for the sample 1 and the sample 5 (comparative example), the amount of magnesium near the surface of the positive electrode active material before and after the second heating was analyzed.

The XPS analysis conditions were as follows.
Measurement device: Quantera II manufactured by PHI, Inc.
X-ray source: monochromated Al (1486.6 eV)
Detection area: 100 μm φ
Detection depth: about 4 to 5 nm (extraction angle 45°)
Measurement spectrum: wide, Li1s, Co2p, Ti2p, O1s, C1s, F1s, S2p, Ca2p, Mg1s, Na1s, Zr3d The results of quantifying the concentration of each element using XPS are shown in Table 2. The quantitative accuracy is about ±1 atomic %. The lower limit of detection is about 1 atomic %, depending on the element. In Ca, the Mg Auger peak separated by waveform is removed, so the quantitative error is larger than usual.

Table 3 shows the calculation results of the existence ratio of each element when cobalt is 1.

TABLE 2

| | Quantitative value (atomic %) | | | |
|---|---|---|---|---|
| | Li | Co | O | C |
| Sample 5 Before second heating | 15.000 | 16.600 | 47.800 | 17.600 |
| Sample 5 After second heating | 16.600 | 15.700 | 48.200 | 16.600 |
| Sample 1 Before second heating | 12.300 | 18.400 | 47.200 | 16.400 |
| Sample 1 After second heating | 12.900 | 16.700 | 47.400 | 16.500 |

| | Quantitative value (atomic %) | | | | | |
|---|---|---|---|---|---|---|
| | F | S | Ca | Mg | Na | Zr |
| Sample 5 Before second heating | 0.000 | 0.000 | 0.400 | 0.000 | 2.000 | 0.500 |
| Sample 5 After second heating | 0.000 | 0.000 | 0.400 | 0.000 | 2.100 | 0.400 |
| Sample 1 Before second heating | 0.800 | 0.000 | 0.500 | 2.800 | 1.300 | 0.400 |
| Sample 1 After second heating | 0.000 | 0.000 | 0.400 | 3.000 | 2.600 | 0.600 |

TABLE 3

| | Existence ratio | | | |
|---|---|---|---|---|
| | Li | Co | O | C |
| Sample 5 Before second heating | 0.904 | 1.000 | 2.880 | 1.060 |
| Sample 5 After second heating | 1.057 | 1.000 | 3.070 | 1.057 |
| Sample 1 Before second heating | 0.668 | 1.000 | 2.565 | 0.891 |
| Sample 1 After second heating | 0.772 | 1.000 | 2.838 | 0.988 |

| | Existence ratio | | | | | |
|---|---|---|---|---|---|---|
| | F | S | Ca | Mg | Na | Zr |
| Sample 5 Before second heating | 0.000 | 0.000 | 0.024 | 0.000 | 0.120 | 0.030 |
| Sample 5 After second heating | 0.000 | 0.000 | 0.025 | 0.000 | 0.134 | 0.025 |
| Sample 1 Before second heating | 0.043 | 0.000 | 0.027 | 0.152 | 0.071 | 0.022 |
| Sample 1 After second heating | 0.000 | 0.000 | 0.024 | 0.180 | 0.156 | 0.036 |

Figure 24:
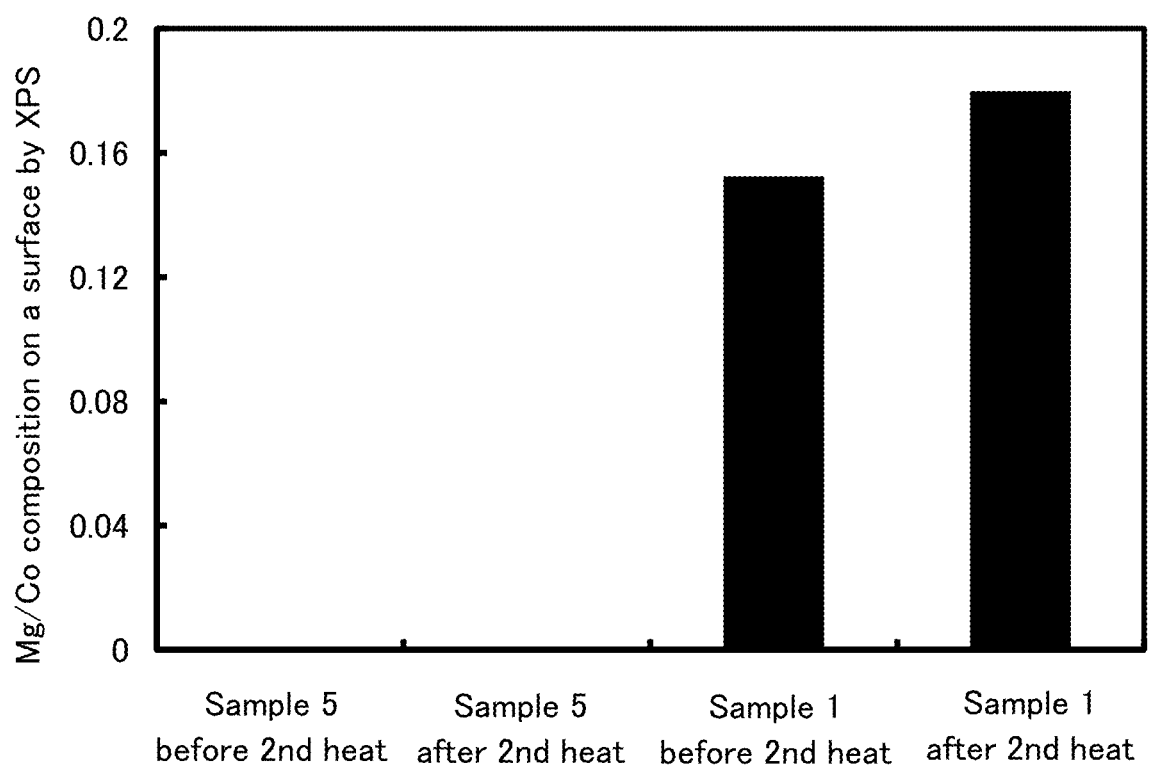
FIG. 24 is a graph showing the magnesium content in the vicinity of the surface of a positive electrode active material in Example 1.

Among the existence ratios of the elements shown in Table 3, a graph of magnesium is shown in FIG. 24.

As shown in Table 2, Table 3, and FIG. 24, in the sample 1 containing magnesium and fluorine as addition starting materials, magnesium was present near the surface of the positive electrode active material measurable by XPS even before the second heating. After the second heating, the amount of magnesium near the surface of the positive electrode active material further increased.

In other words, it seems that segregation of magnesium on the surface of the positive electrode active material advanced by the second heating. Thus, it was confirmed that the positive electrode active material of the sample 1 has a first region in the inner portion and a second region in the superficial portion, and that the first region contains lithium cobalt oxide and the second region contains magnesium.

On the other hand, in the sample 5 containing no fluorine as an addition starting material and containing only magnesium, the amount of magnesium near the surface of the positive electrode active material was lower than the detection lower limit both before and after the second heating. In other words, fluorine contained in the starting material surprisingly proved to have the effect of segregating magnesium in the superficial portion of the positive electrode active material.

<Cycle Characteristics>

Next, CR2032 (diameter 20 mm, height 3.2 mm) coin type secondary batteries were fabricated using a positive electrode active material of the sample 1 before and after the second heating, a positive electrode active material of the sample 5 before and after the first heating, and positive electrode active materials of the sample 2, sample 3, sample 4, and sample 6. Their cycle characteristics were evaluated.

A positive electrode formed by applying slurry in which the formed positive electrode active material, acetylene black (AB), and polyvinylidene fluoride (PVDF) were mixed at a weight ratio of positive electrode active material: AB:PVDF=95:2.5:2.5 to a current collector was used for the positive electrode.

A lithium metal was used for the counter electrode.

As an electrolyte contained in an electrolyte solution, 1 mol/L lithium hexafluorophosphate ($LiPF_6$) was used, and as the electrolyte solution, a solution in which ethylene carbonate (EC) and diethyl carbonate (DEC) at a volume ratio of EC:DEC=3:7 and vinylene carbonate (VC) at a 2 weight % were mixed was used.

A positive electrode can and a negative electrode can were formed of stainless steel (SUS).

The measurement temperature for the cycle characteristics test was 25° C. Charging was carried out at a constant current with a current density of 68.5 mA/g per active material weight and an upper limit voltage of 4.6 V, followed by constant voltage charge until a current density was reached to 1.4 mA/g. Discharge was carried out at a constant current with a current density of 68.5 mA/g per active material weight and with a lower limit voltage of 2.5 V. 30 cycles of charging and discharging were performed.

Figure 25A:
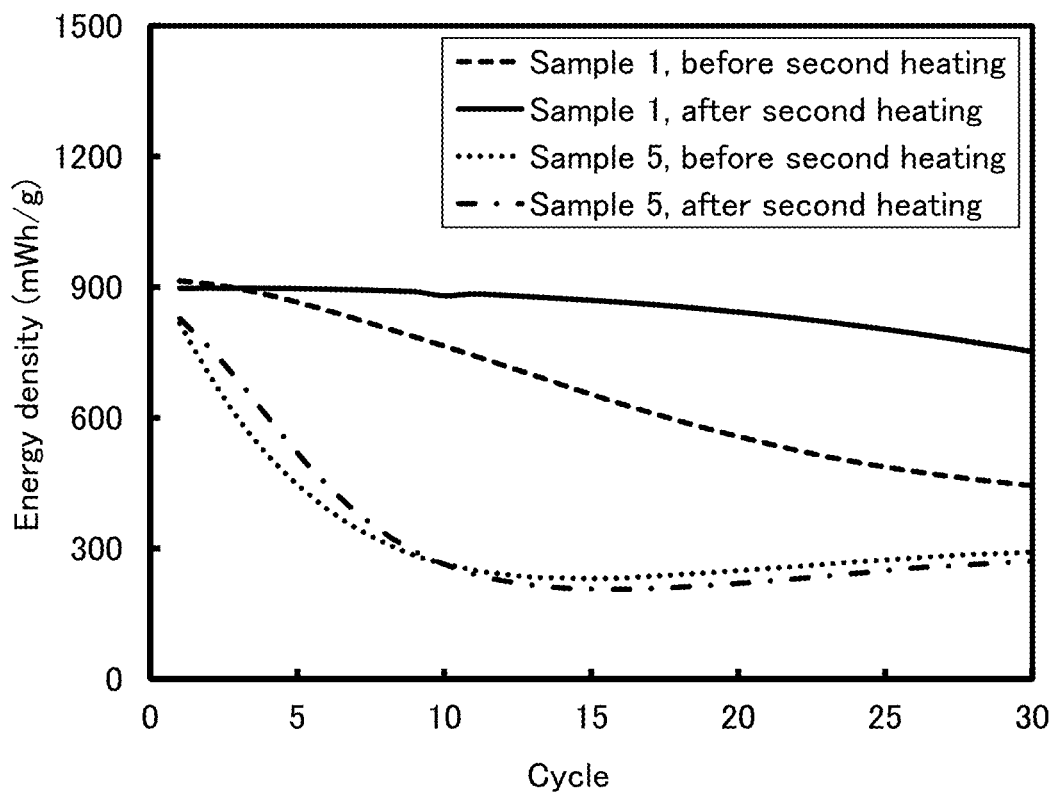
FIGS. 25A and 25B are graphs showing cycle characteristics of a secondary battery in Example 1.
Figure 25B:
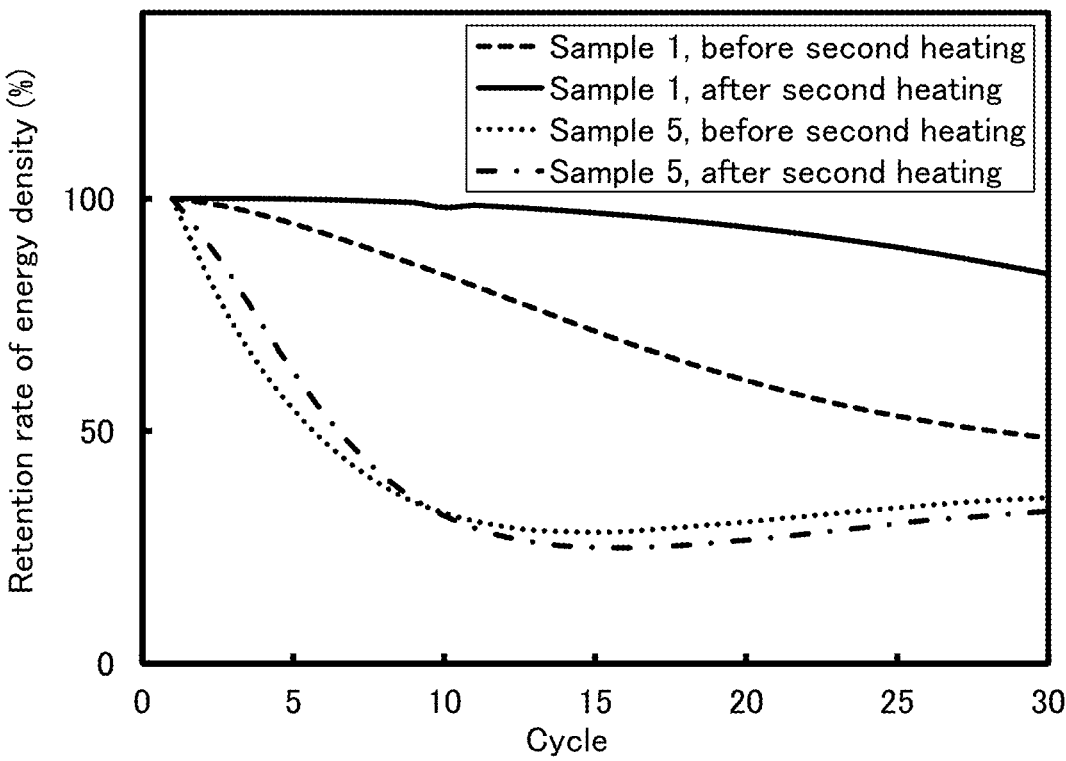

FIGS. 25A and 25B are graphs showing the cycle characteristics of the secondary battery using the positive electrode active material before and after the second heating of the sample 1 and before and after the first heating of the sample 5. FIG. 25A is an energy density at 4.6 V charging. FIG. 25B is a graph of energy density retention rate at 4.6 V charging. The energy density is the product of the discharge capacity and the discharge average voltage.

As shown in FIGS. 25A and 25B, in the sample 1 containing magnesium and fluorine added as the starting material, cycle performance was greatly improved by performing the second heating. The energy density was also favorable.

This is considered to be due to the fact that the amount of magnesium existing in the vicinity of the surface of the positive electrode active material was increased by performing the second heating, as is clear from the above XPS results.

On the other hand, in Sample 5 containing only magnesium as an addition starting material, no significant difference in cycle characteristics was observed before and after the second heating.

Figure 26:
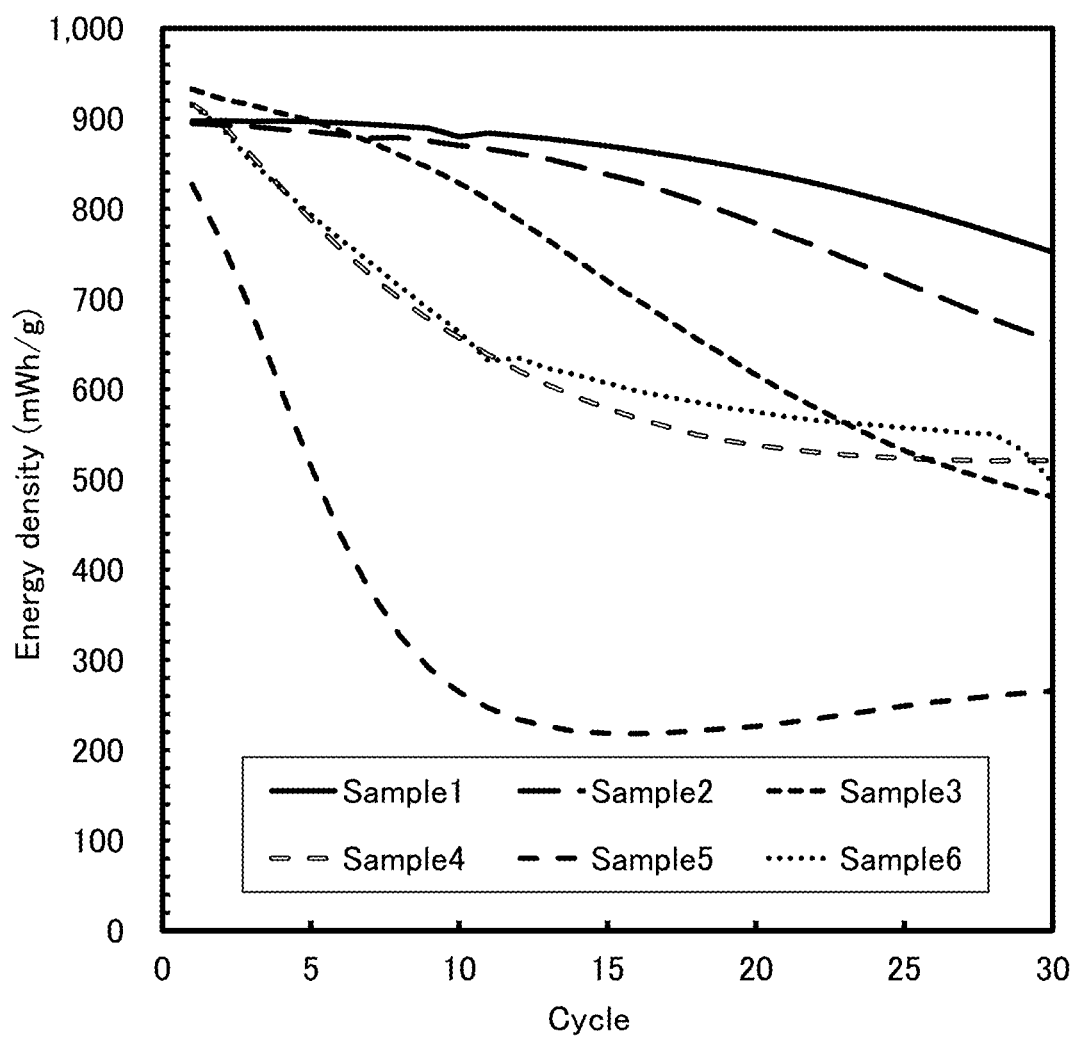
FIG. 26 is a graph showing cycle characteristics of a secondary battery in Example 1.
Figure 27:
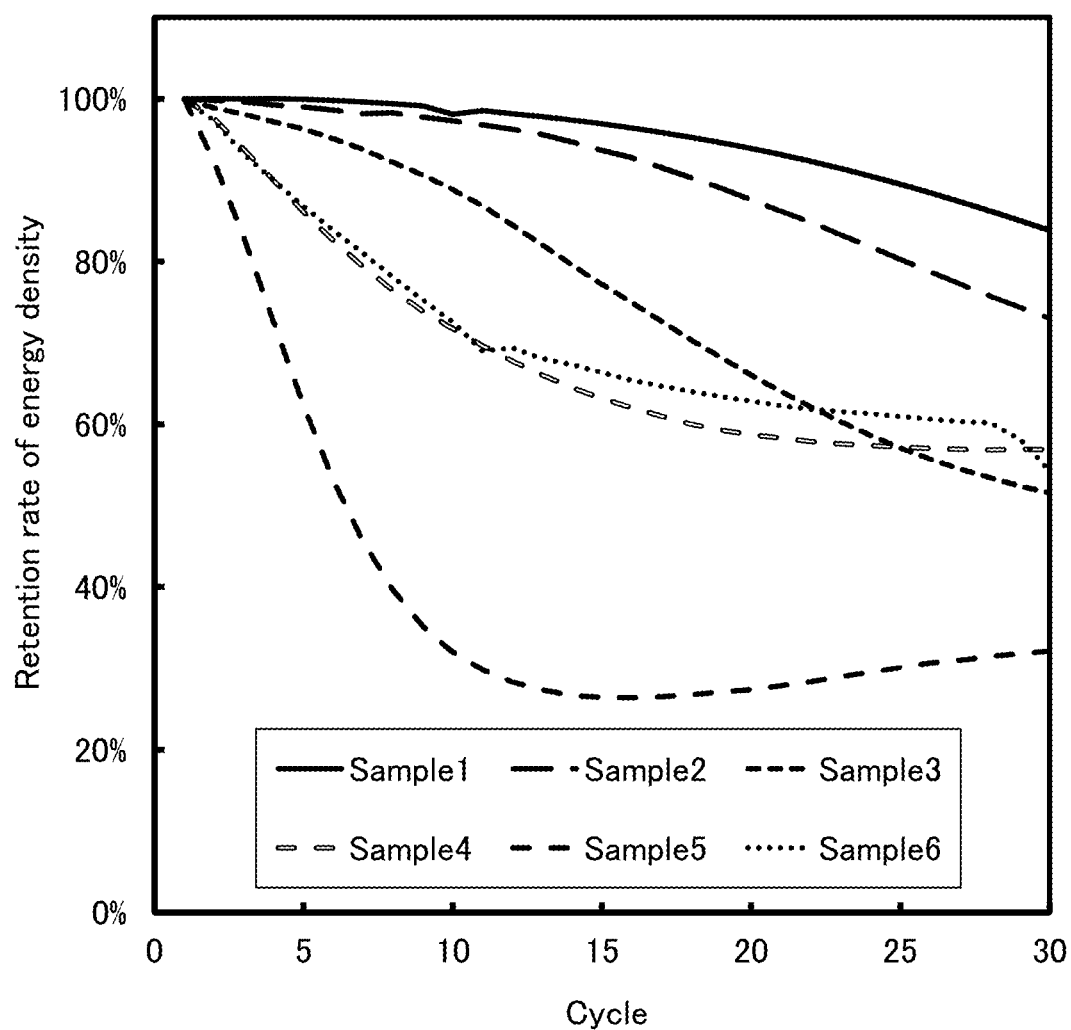
FIG. 27 is a graph showing cycle characteristics of a secondary battery in Example 1.

FIGS. 26 and 27 show graphs of the cycle characteristics of the secondary battery using the positive electrode active material of the sample 1 to the sample 6 after the second heating. FIG. 26 is a graph of energy density at 4.6 V charging, and FIG. 27 is a graph of energy density retention rate at 4.6 V charging.

As shown in FIG. 26 and FIG. 27, the sample 4 (comparative example) in which only fluorine was added to the starting material and the sample 5 (comparative example) in which only magnesium was added showed cycle characteristics inferior to the sample 6 (comparative example) in which neither magnesium nor fluorine was added.

On the other hand, the samples 1 to 3 in which magnesium and fluorine were added to the starting material showed good cycle characteristics. The best cycle characteristics were shown in the sample 1 in which the atomic ratio of magnesium to fluorine was 1:2. The sample 2 having a content ratio of magnesium to fluorine of 1:4 showed good cycle characteristics. As is clear from FIG. 26, not only the cycle characteristics but also the energy density was good.

It was revealed that a positive electrode active material exhibiting good cycle characteristics can be obtained by adding magnesium and fluorine to the starting material in this way. Further, the atomic ratio of magnesium to fluorine contained in the starting material is preferably Mg:F=1:x ($1.5 \le x \le 4$), and it became clear that Mg:F=about 1:2 is most preferable.

<Fabrication of Positive Electrode Active Materials of Samples 7 and 8>

Next, a positive electrode active material of the samples 7 and 8, in which the amount of addition was changed while keeping the ratio between magnesium and fluorine constant (Mg:F=1:2), was prepared.

For the sample 7, 1 mol % MgO and 2 mol % LiF were used as addition starting materials. For the sample 8, 2 mol % MgO and 4 mol % LiF were used as addition starting materials. For each of the sample 7 and the sample 8, the starting materials were mixed and subjected to the first heating, cooled, sieved, subjected to the second heating, cooled, and collected in the same manner as in the manufacturing method described in Embodiment 1. In this way, a positive electrode active material and a secondary battery were fabricated.

Table 4 shows common starting materials and addition starting materials of the sample 1, the sample 7, and the sample 8, in which the atomic ratio of magnesium to fluorine as raw material is Mg:F=1:2, and of the sample 6 without addition of magnesium and fluorine as a comparative example.

TABLE 4

| | Common starting material | Addition starting material | Mg:F (atomic ratio) |
|---|---|---|---|
| Sample 1 | Li$_2$CO$_3$ | 0.5 mol % MgO, 1 mol % LiF | 1:2 |
| Sample 7 | Co$_3$O$_4$ | 1 mol % MgO, 2 mol % LiF | 1:2 |
| Sample 8 | | 2 mol % MgO, 4 mol % LiF | 1:2 |
| Sample 6 (comparative example) | | 1 mol % LiF | — |

<Cycle Characteristics>

Figure 28A:
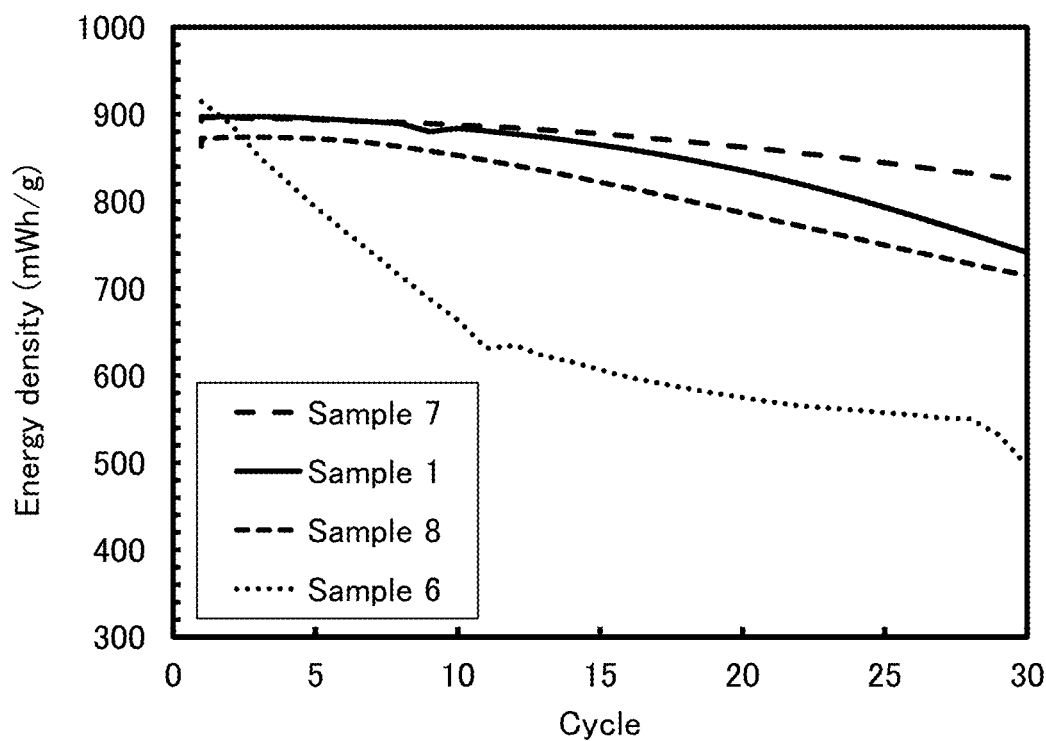
FIGS. 28A and 28B are graphs showing cycle characteristics of a secondary battery in Example 1.
Figure 28B:
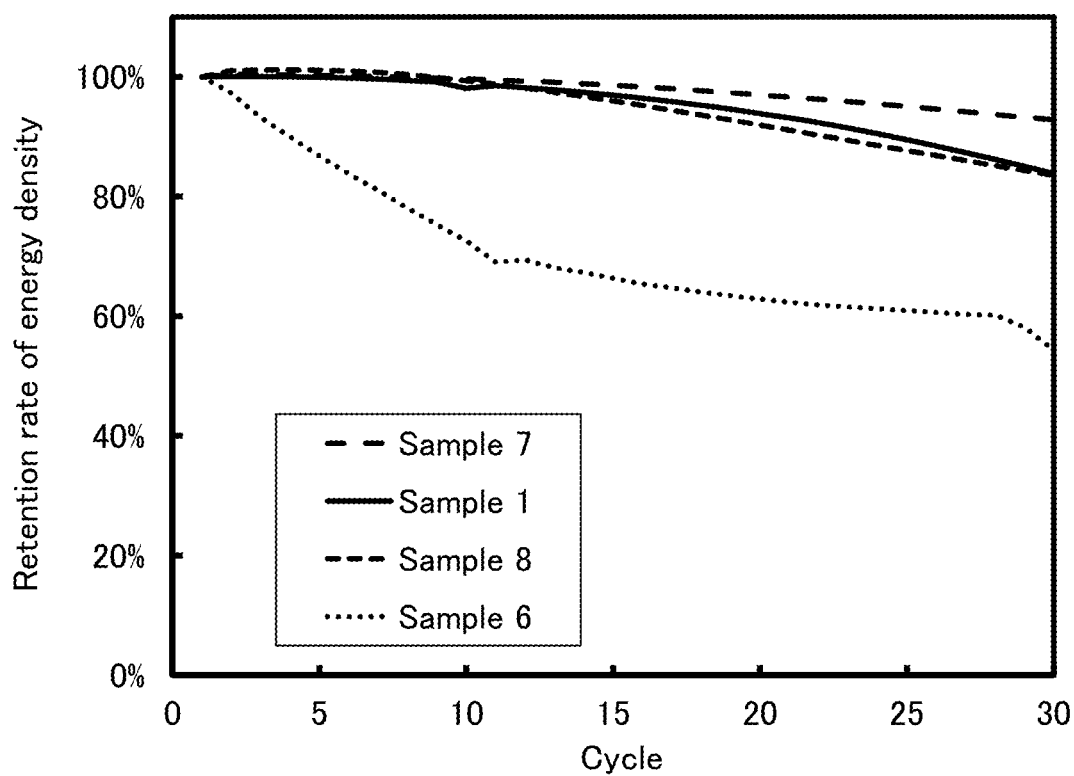

FIGS. 28A and 28B are graphs of cycle characteristics of secondary batteries using positive electrode active materials of the sample 1, the sample 7, the sample 8, and the sample 6 (comparative example). FIG. 28A is a graph of energy density at 4.6 V charging, and FIG. 28B is a graph of energy density retention rate at 4.6 V charging.

As shown in FIG. 28A and FIG. 28B, all samples in which the atomic number ratio of magnesium to fluorine of Mg:F=1:2 as a raw material showed good cycle characteristics. Among them, the sample 7 using 1 mol % MgO and 2 mol % LiF as addition starting materials showed the best cycle characteristics, and the energy density retention rate after 30 cycles was 93%. Also as apparent from FIG. 28A, not only the cycle characteristics but also the energy density was good.

Example 2

This example shows a comparison result of a positive electrode active material having a second region formed by segregation of magnesium and a positive electrode active material having a magnesium oxide layer formed by coating from the outside.

<Positive Electrode Active Material Having Second Region Formed by Segregation>

The sample 7 in Example 1 was used as a positive electrode active material having a second region formed by segregation of magnesium, in which 1 mol % MgO and 2 mol % LiF were used as addition starting materials.

<Positive Electrode Active Material Having MgO Formed by Coating from Outside>

As a positive electrode active material having a magnesium oxide layer formed by coating from outside, positive electrode active materials of the sample 9 (comparative example) and the sample 10 (comparative example) in which lithium cobalt oxide was coated with magnesium oxide using polygonal barrel sputtering were used. Manufacturing methods of the sample 9 (comparative example) and the sample 10 (comparative example) are described below.

Lithium cobalt oxide produced by NIPPON CHEMICAL INDUSTRIAL CO., LTD. (product name: C-10N) was used. For polygonal barrel sputtering, magnesium oxide was used as a target, power was set to 450 W, Ar and O$_2$ were used as sputtering gas to form a film. The partial pressures of Ar and O$_2$ were set at 0.6 Pa and 0.5 Pa, respectively. The processing time was 36 minutes for the sample 9 and 180 minutes for the sample 10.

STEM observation after polygonal barrel sputtering treatment revealed that a magnesium oxide layer of about 1 nm to 3 nm adhered to the surface of the positive electrode active material of the sample 9. In the sample 10, a magnesium oxide layer of about 6 nm to 8 nm adhered to the surface of the positive electrode active material.

After that, the sample 9 and the sample 10 were heated at 800° C. for 2 hours in the same manner as in the second heating described in Embodiment 1. Dry air having a temperature rise of 200° C./h and a dew point of −109° C. was flowed at 10 L/min.

The conditions for the sample 7, the sample 9 (comparative example), and the sample 10 (comparative example) to be compared in this example are shown in Table 5.

TABLE 5

| | Inner portion | Superficial portion |
|---|---|---|
| Sample 7 | LiCoO$_2$ | Second region formed by segregation, about 1 nm |
| Sample 9 (comparative example) | | MgO formed by barrel-sputtering, about 3 nm |
| Sample 10 (comparative example) | | MgO formed by barrel-sputtering, about 8 nm |

<STEM>

Figure 29A:
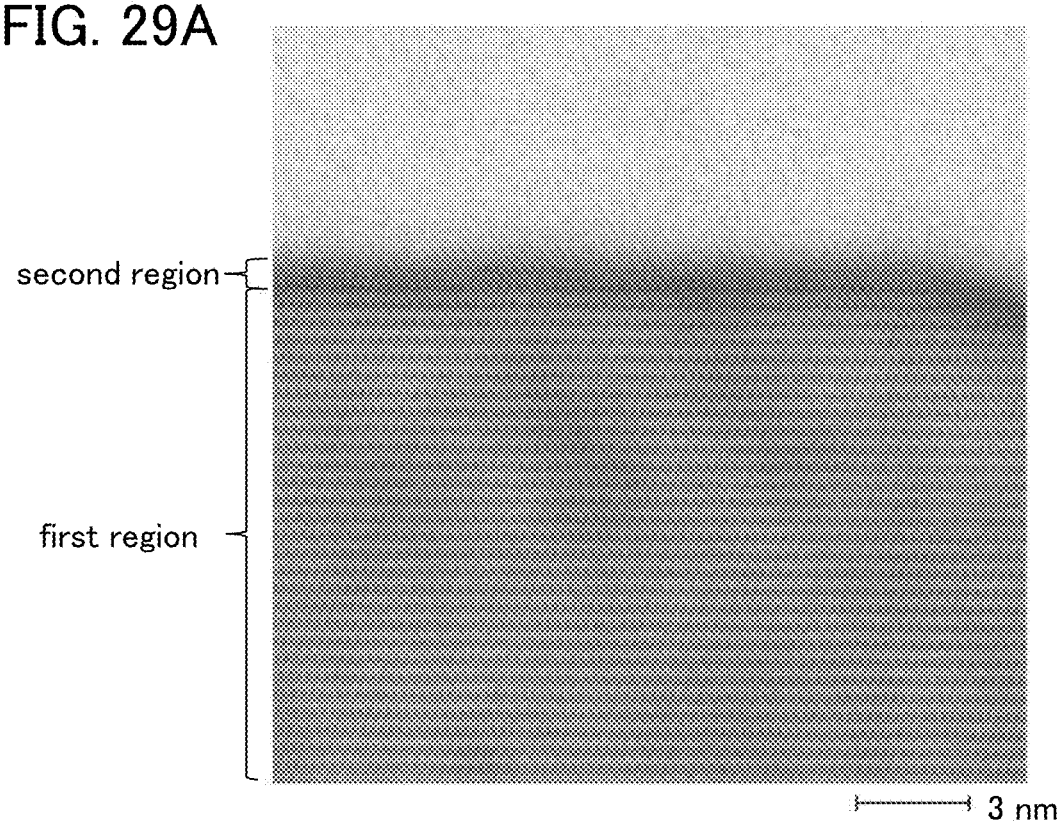
FIGS. 29A and 29B are STEM images of a positive electrode active material in Example 2.
Figure 29B:
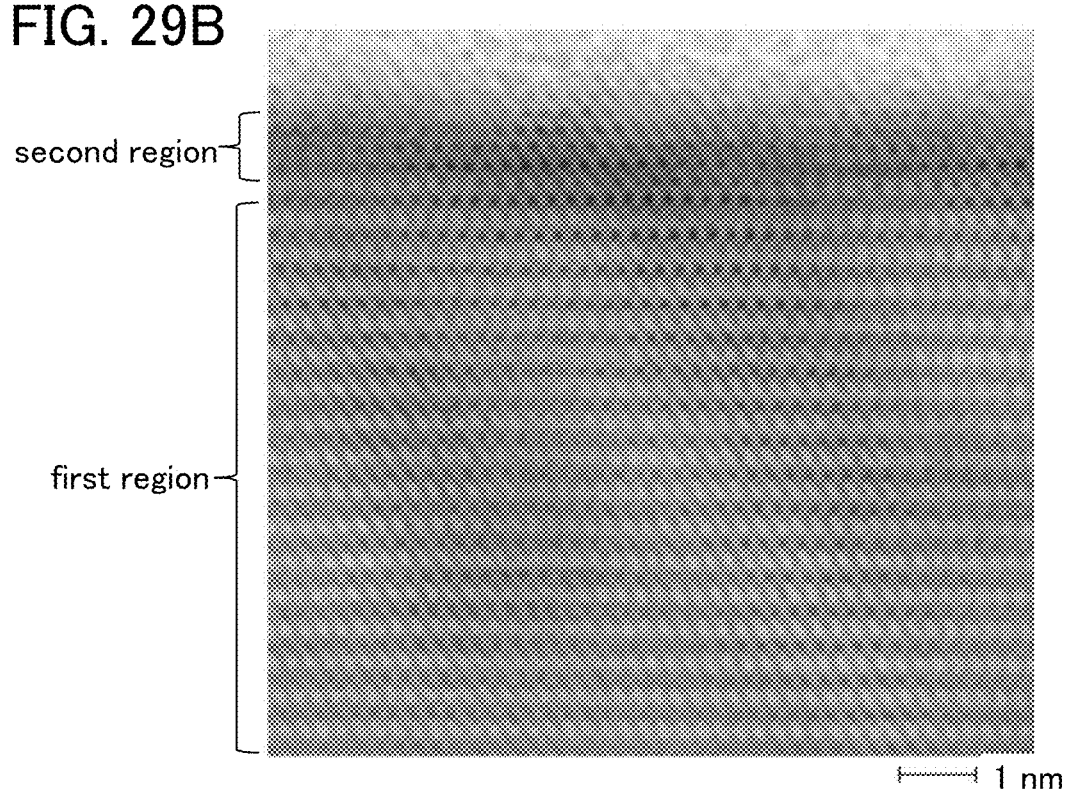
Figure 30A:
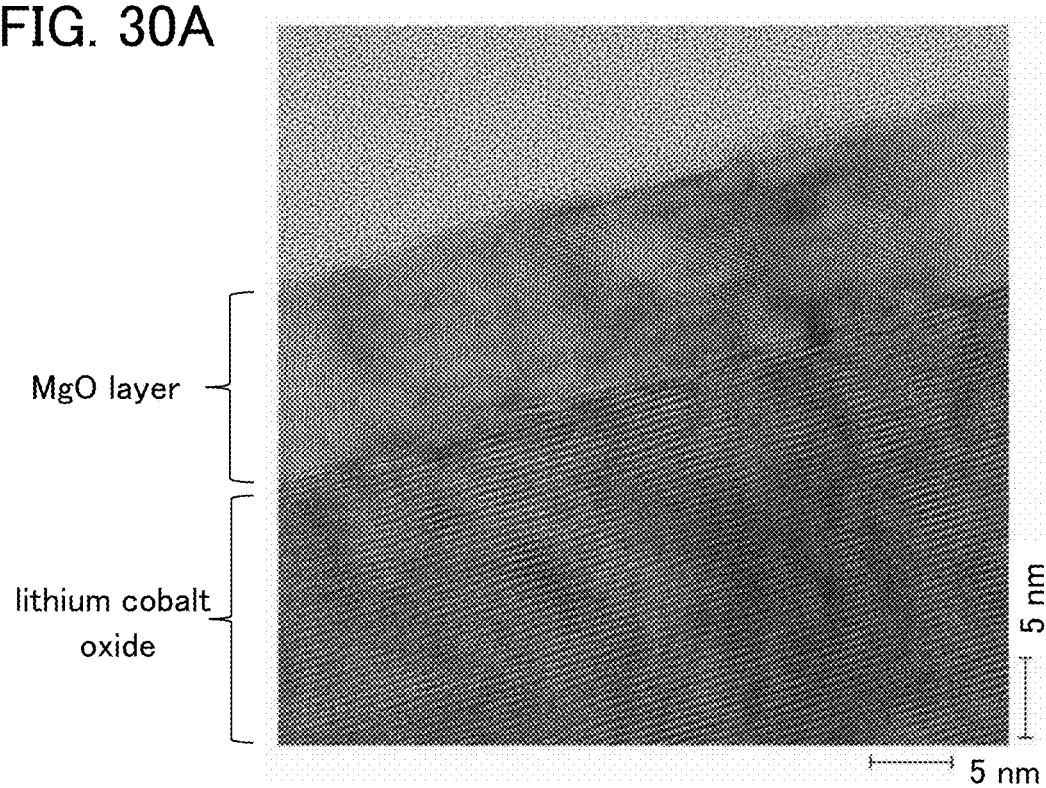
FIGS. 30A and 30B are STEM images of a positive electrode active material in Example 2.
Figure 30B:
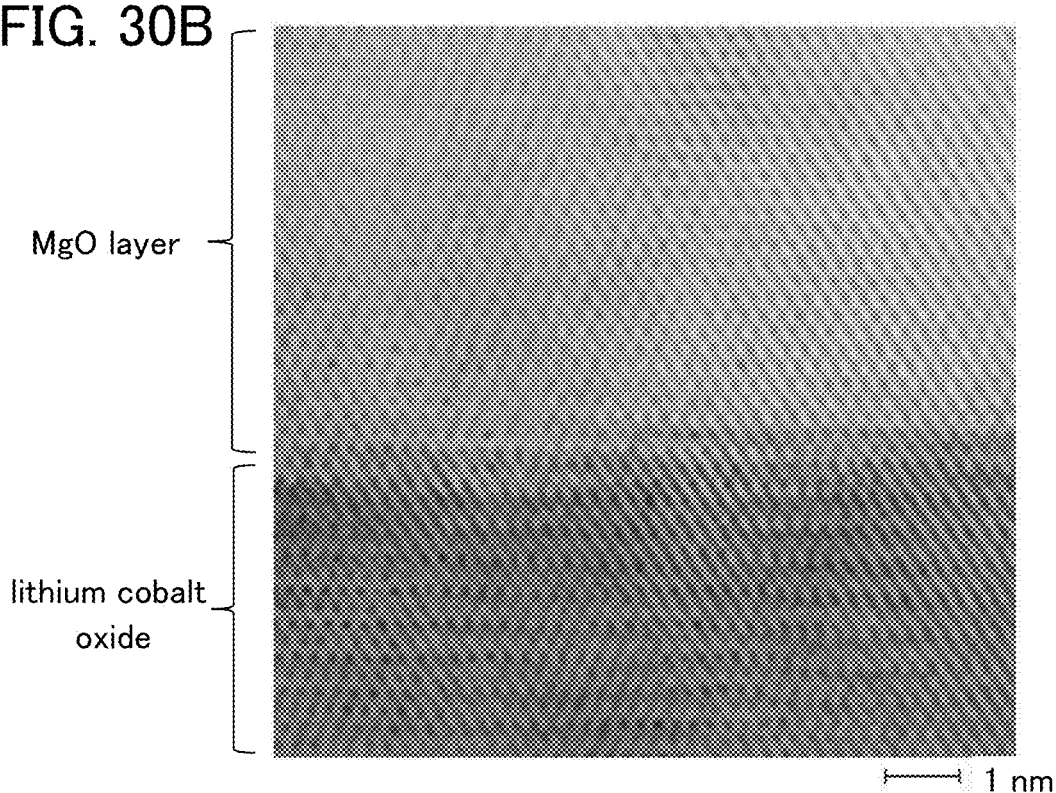

Cross sections of the positive electrode active materials of the sample 7 and the sample 10 (comparative example) were observed using STEM. FIGS. 29A and 29B show STEM images of the sample 7 having a second region formed by segregation. FIGS. 30A and 30B show STEM images of the sample 10 (comparative example) having a magnesium oxide layer formed by coating from the outside.

In the sample 7, it was possible to observe that the first region and the second region were different regions from the difference in image brightness or the like. As shown in FIGS. 29A and 29B, in the sample 7 having the second region formed by segregation, the second region of about 1 nm to 2 nm was observed.

Also in the sample 10 (comparative example), as shown in FIGS. 30A and 30B, it was possible to observe that a magnesium oxide layer was formed on lithium cobalt oxide from the difference in image brightness or the like. In the sample 10 (comparative example), the magnesium oxide layer of about 8 nm was observed.

In both of the sample 7 and the sample 10 (comparative example), at least part of the arrangement of cations and anions between different layers is aligned, and orientations of the crystal in the first region and the crystal in the second region were aligned.

<Charge and Discharge Characteristics>

Figure 31A:
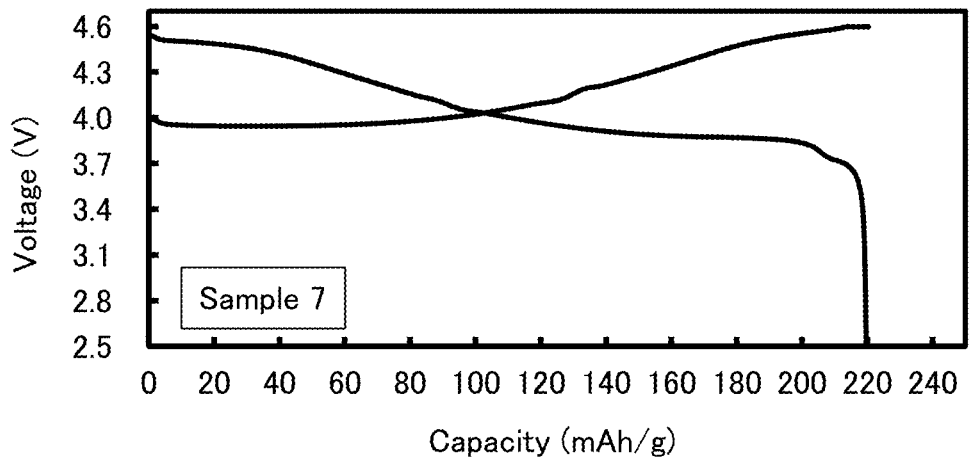
FIGS. 31A to 31C are graphs showing charge and discharge characteristics of a secondary battery in Example 2.
Figure 31B:
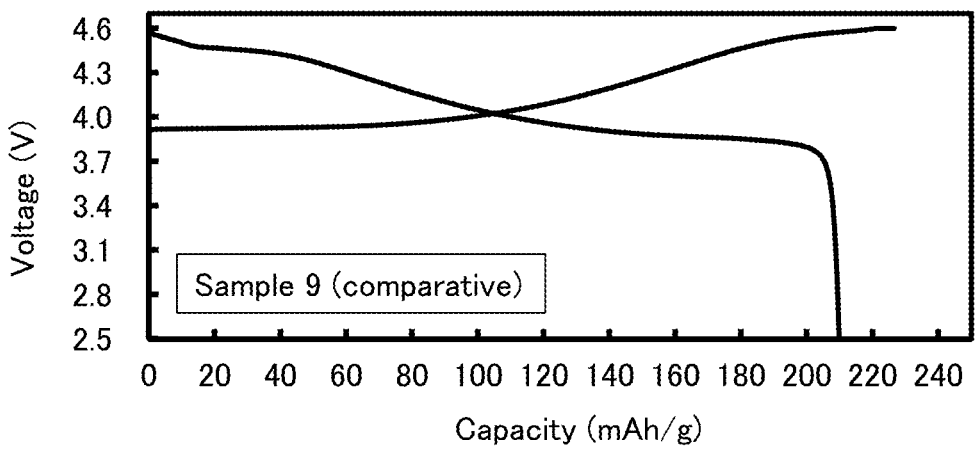
Figure 31C:
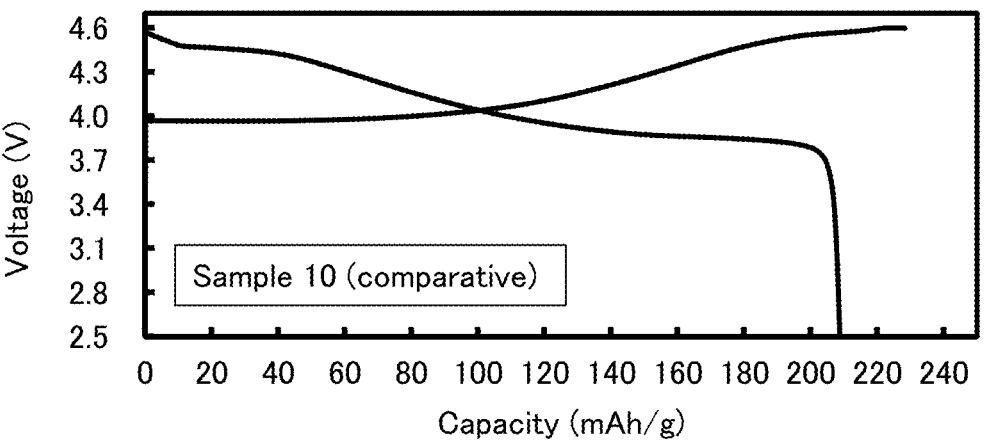

Secondary batteries were fabricated in the same manner as in Example 1 using the positive electrode active materials of the sample 7, the sample 9 (comparative example), and the sample 10 (comparative example), and charge and discharge characteristics were evaluated. FIGS. 31A, 31B, and 31C show the charge and discharge characteristics of the secondary battery using the positive electrode active material of the sample 7, the sample 9 (comparative example), and the sample 10 (comparative example), respectively.

As shown in FIGS. 31A to 31C, the sample 7 having the second region formed by the segregation of magnesium had larger capacity than the samples 9 and 10 having the magnesium oxide layer formed by polygonal barrel sputtering, and the sample 7, and exhibited better cycle characteristics.

Figure 32A:
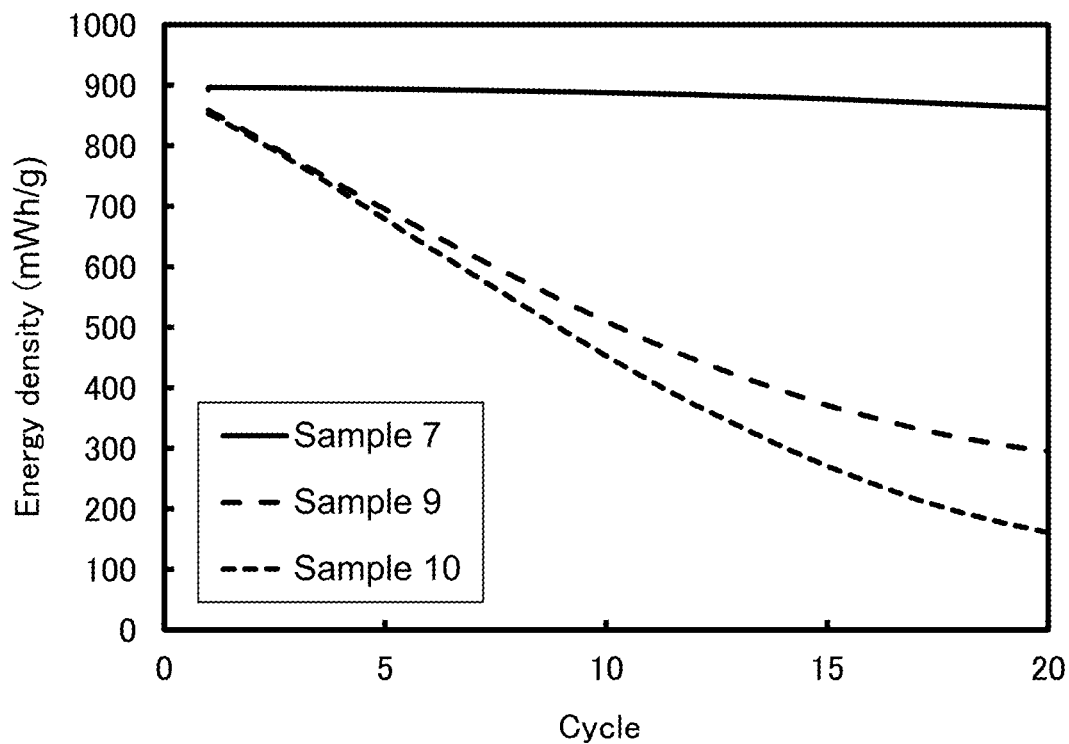
FIGS. 32A and 32B are graphs showing cycle characteristics of a secondary battery in Example 2.
Figure 32B:
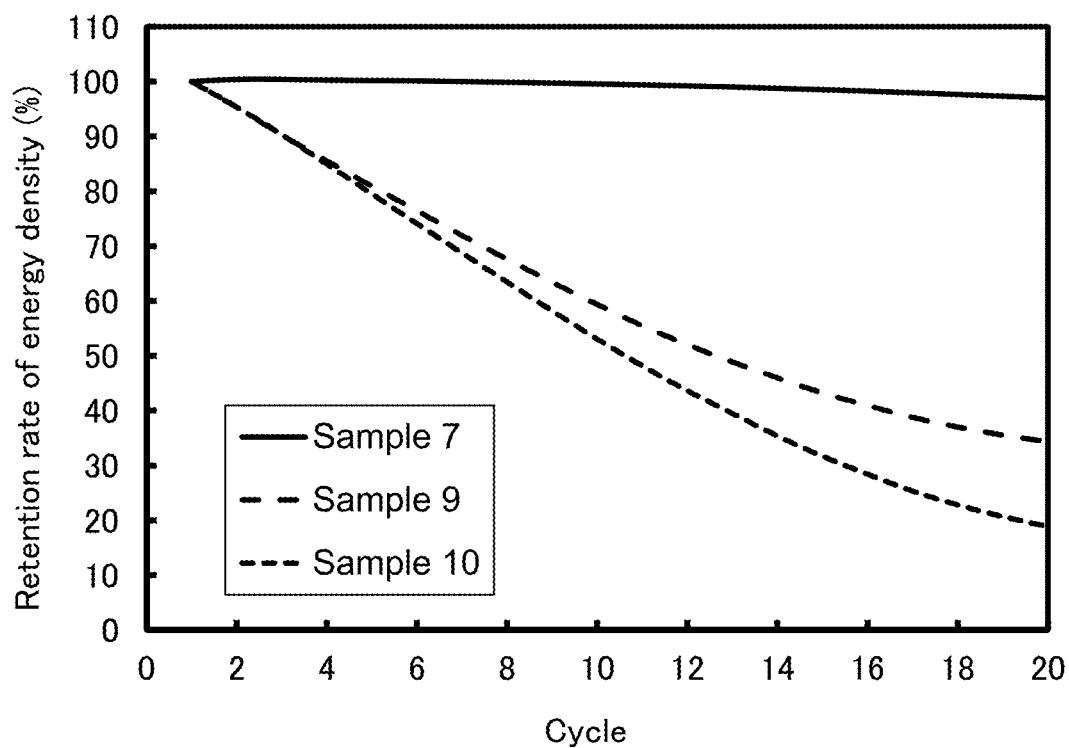

Next, the results of evaluating the cycle characteristics of the secondary batteries using the positive electrode active materials of the sample 7, the sample 9 (comparative example), and the sample 10 (comparative example) are shown in FIGS. 32A and 32B. The cycle characteristic test was carried out in the same manner as in Example 1.

FIG. 32A is a graph of an energy density at 4.6 V charging, and FIG. 32B is a graph of an energy density retention rate at 4.6 V charging. As shown in FIG. 32B, the sample 7 having the second region formed by segregation has much better cycle characteristics than the sample 9 and the sample 10 each having the magnesium oxide layer formed by the polygonal barrel sputtering. As shown in FIG. 32A, the energy density was also better in the sample 7.

Thus, it was revealed that the second region formed by the segregation of magnesium contributes to better charge and discharge characteristics and cycle characteristics than the magnesium oxide layer formed by the polygonal barrel sputtering.

From these results, it was presumed that the magnesium-containing region formed as a result of segregation of magnesium previously contained in the starting material on the surface contributes to the stabilization of the crystal structure of lithium cobalt oxide rather than the magnesium oxide layer coated from the outside of the lithium cobalt oxide particles.

Example 3

Figure 33A:
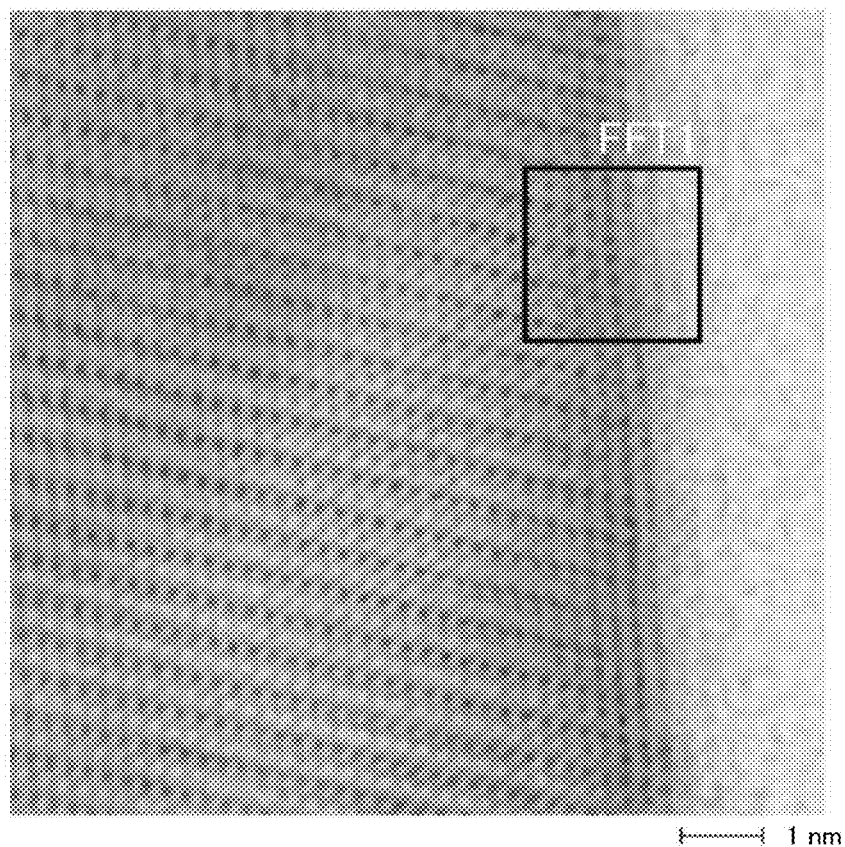
FIGS. 33A to 33C are a STEM image and FFT images of a positive electrode active material in Example 3.
Figure 33B:
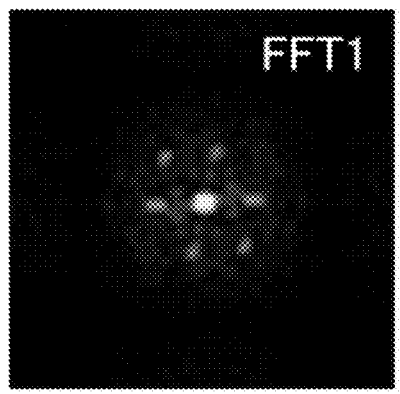
Figure 33C:
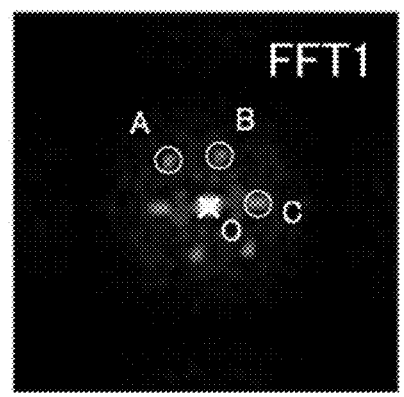

In this example, characteristics of the positive electrode active material having a second region formed by segregation of magnesium were clarified by various analyses.
<Analyzed Positive Electrode Active Material>
The sample 7 of Example 1 using 1 mol % MgO and 2 mol % LiF as addition starting materials was used as an analysis sample of this example.
<STEM, FFT>
FIGS. 33A to 33C and FIGS. 34A to 34C show STEM-FFT images of the cross section of the vicinity of the surface of the positive electrode active material of the sample 7 having the second region formed by segregation. FIG. 33A is a STEM image of the vicinity of the surface of the positive electrode active material, and FIG. 33B is the FFT (Fast Fourier Transform) image of the region indicated by FFT1 in FIG. 33A. Some luminescent spots of the FFT image of FIG. 33B are called A, B, C, 0 as shown in FIG. 33C.

Regarding the luminescent spots of the FFT image in the region indicated by FFT1, the measured values were d=0.20 nm for OA, d=0.24 nm for OB, and d=0.25 nm for OC. In addition, ∠AOB=53°, ∠BOC=74°, and ∠AOC=127°.

The results are close to d=0.21 nm for OA(200), d=0.24 nm for OB(1-11), d=0.24 nm for OC(-1-11), ∠AOB=55°, ∠BOC=70°, and ∠AOC=125° which are obtained from magnesium oxide (MgO) data (ICDD45-0945) in the ICDD (International Centre for Diffraction Data). Therefore, it became clear that the region indicated by FFT1 is a region having a rock salt type crystal structure and is an image of [011] incidence.

Figure 34A:
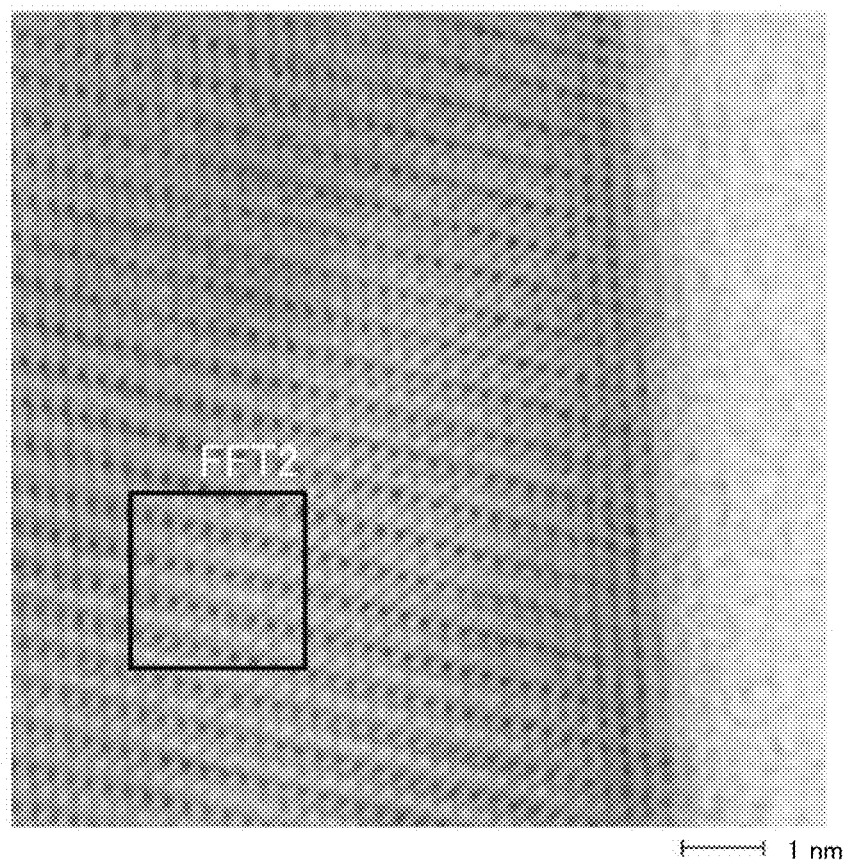
FIGS. 34A to 34C are a STEM image and FFT images of a positive electrode active material in Example 3.
Figure 34B:
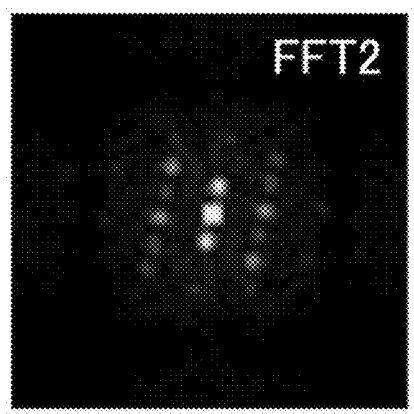
Figure 34C:
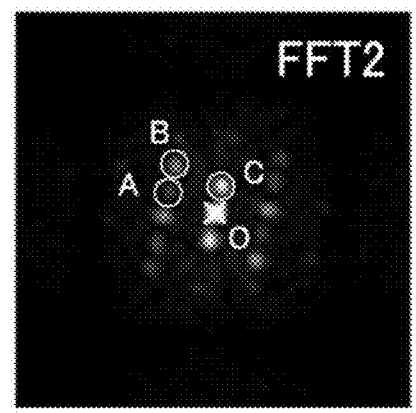

FIG. 34A is a STEM image of the vicinity of the surface of the positive electrode active material of FIG. 33A. FIG. 34B shows the FFT image of the region indicated by FFT2 in FIG. 34A. Some luminescent spot of the FFT image of FIG. 34B is called A, B, C, O as shown in FIG. 34C.

Regarding the luminescent spots of the FFT image in the region indicated by FFT2, the measured values were d=0.24 nm for OA, d=0.20 nm for OB, and d=0.45 nm for OC. In addition, ∠AOB=25°, ∠BOC=53°, and ∠AOC=78°.

The results are close to d=0.24 nm for OA(101), d=0.20 nm for OB(104), d=0.47 nm for OC(003), ∠AOB=25°, ∠BOC=55°, and ∠AOC=80° which are obtained from lithium cobalt oxide (LiCoO$_2$) data (ICDD50-0653) in the ICDD database. Therefore, it became clear that the region indicated by FFT2 is a region containing lithium cobalt oxide and is an image of [010] incidence.

Furthermore, from the STEM images of FIG. 33A and FIG. 34A, it was observed that the brightness of the image was different between the first region and the second region, and that orientations of the crystal in the first region and the crystal in the second region were aligned.
<STEM-EDX>
Next, analysis results of the vicinity of the surface and the vicinity of crystal defects of the sample 7 using STEM-EDX are shown in FIGS. 35A to 35C, FIG. 36, and FIGS. 37A1 to 37B2.

Figure 35A:
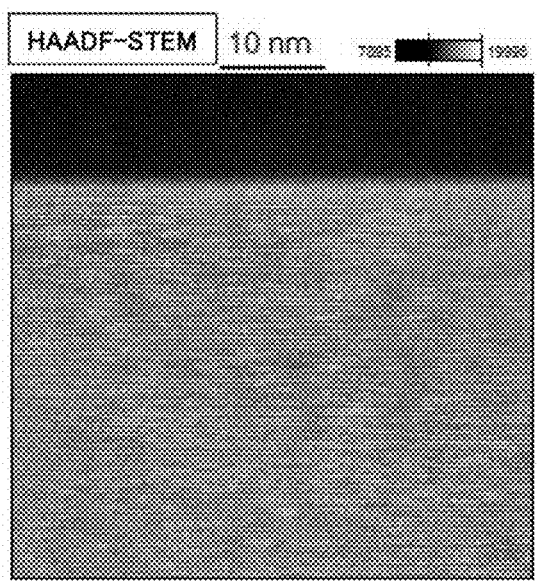
FIGS. 35A to 35C are a STEM image and EDX mappings of a positive electrode active material in Example 3.
Figure 35B:
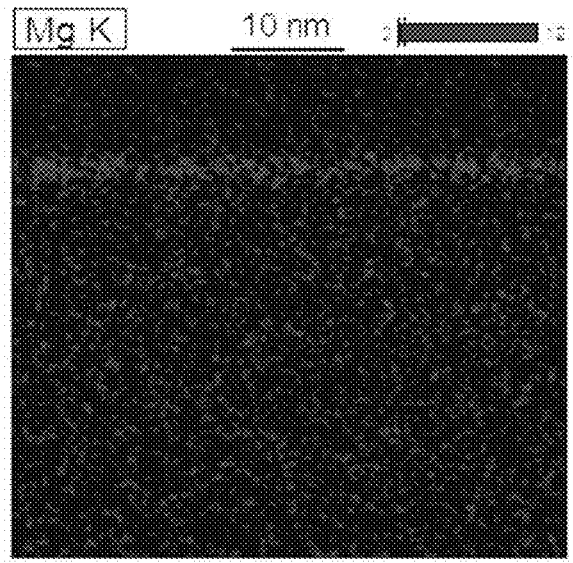
Figure 35C:
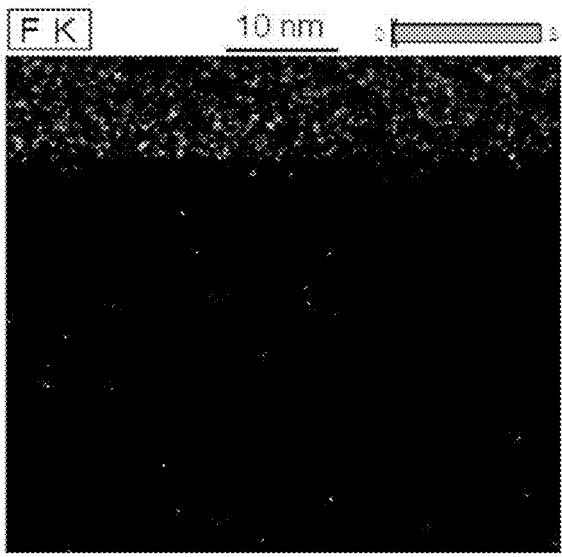

FIGS. 35A to 35C show the STEM-EDX analysis results of the vicinity of the surface of the positive electrode active material of the sample 7. FIG. 35A shows the STEM image, FIG. 35B shows the magnesium mapping, and FIG. 35C shows the fluorine mapping.

Magnesium in the vicinity of the surface of the positive electrode active material was observed more clearly in the sample 7 (FIGS. 35A to 35C) in which 1 mol % MgO and 2 mol % LiF were added as starting materials than in the sample 1 (FIGS. 22A to 22C) in which 0.5 mol % MgO and 1 mol % LiF were added as starting materials described in Example 1. This supports the result of Example 1 that the larger the amount of magnesium in the vicinity of the surface of the positive electrode active material is, the better the cycle characteristic is.

Figure 36:
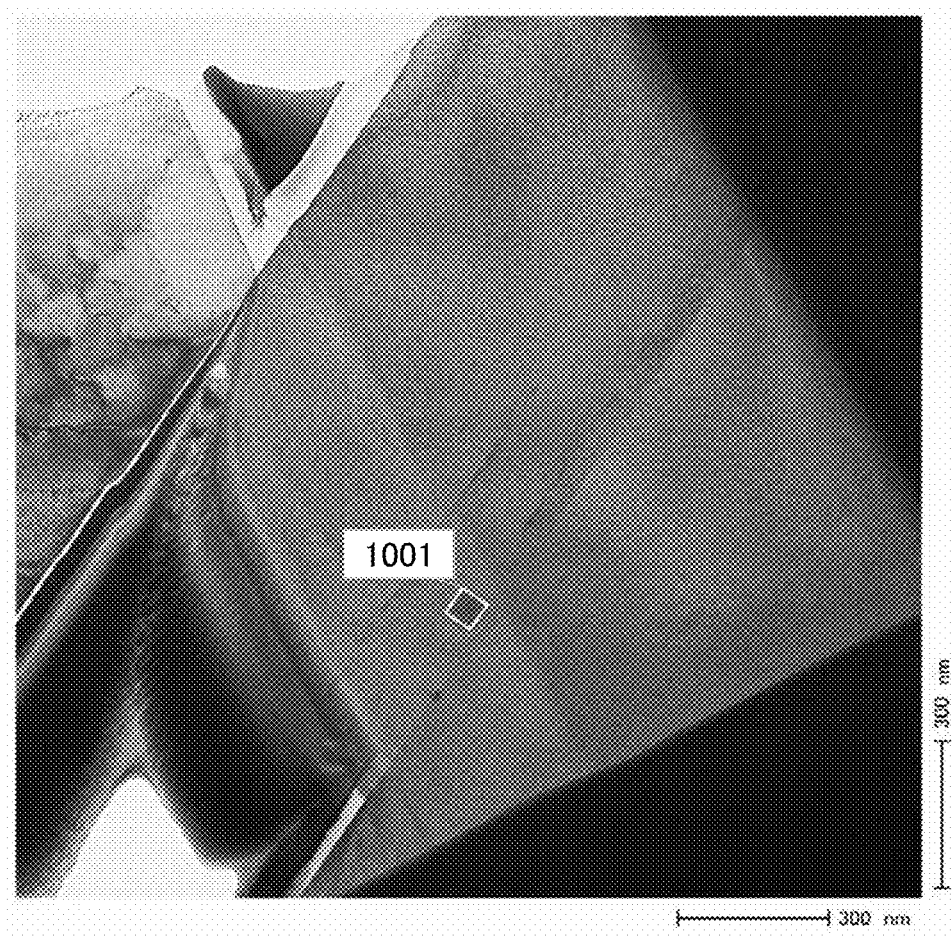
FIG. 36 is a TEM image of a positive electrode active material in Example 3.

FIG. 36 is a cross-sectional TEM image of the vicinity of the crystal defects of the positive electrode active material of the sample 7. In a crystal defect 1001 in FIG. 36, portions, which seem to be crystal defects, with different brightness from other portions were observed.

FIGS. 37A1 to 37B2 show STEM-EDX analysis results of the crystal defect 1001 in FIG. 36.

FIG. 37A1 shows a STEM image of the crystal defect 1001. FIG. 37A2 shows the magnesium mapping. FIG. 37B1 shows the fluorine mapping. FIG. 37B2 shows the zirconium mapping.

As shown in FIG. 37A2, segregation of magnesium was observed in the crystal defect of the positive electrode active material of the sample 7 and its vicinity. This shows that the sample 7 is the positive electrode active material having a second region not only in the vicinity of the surface but also in the inner portion. In addition, as shown in FIG. 37B2, zirconium segregation was also observed in the inner portion of the second region. Since the step of mixing the starting materials is carried out by a ball mill and zirconium is used for the material of the ball mill, there is a possibility that zirconium enters the sample 7. Moreover, as shown in FIG. 37B1, fluorine is hardly detected in the inner portion of the second region. This is probably because fluorine, which is a lightweight element, is difficult to detect with EDX.
<ToF-SIMS>
Next, the positive electrode active material of the sample 7 having the second region formed by segregation is analyzed using ToF-SIMS to investigate the distribution of magnesium and fluorine in the depth direction, and the analysis results are shown in FIG. 38.

Analysis was carried out in the depth direction from the surface of the positive electrode active material by alternately repeating ToF-SIMS analysis and sputtering using particles of multiple positive electrode active materials as samples. TOF.SIMS 5-300 (manufactured by ION-TOF GmbH) was used as the measuring device. Cs was used as an ion source for sputtering. The analysis was conducted in the range of about 50 μm square.

Figure 38:
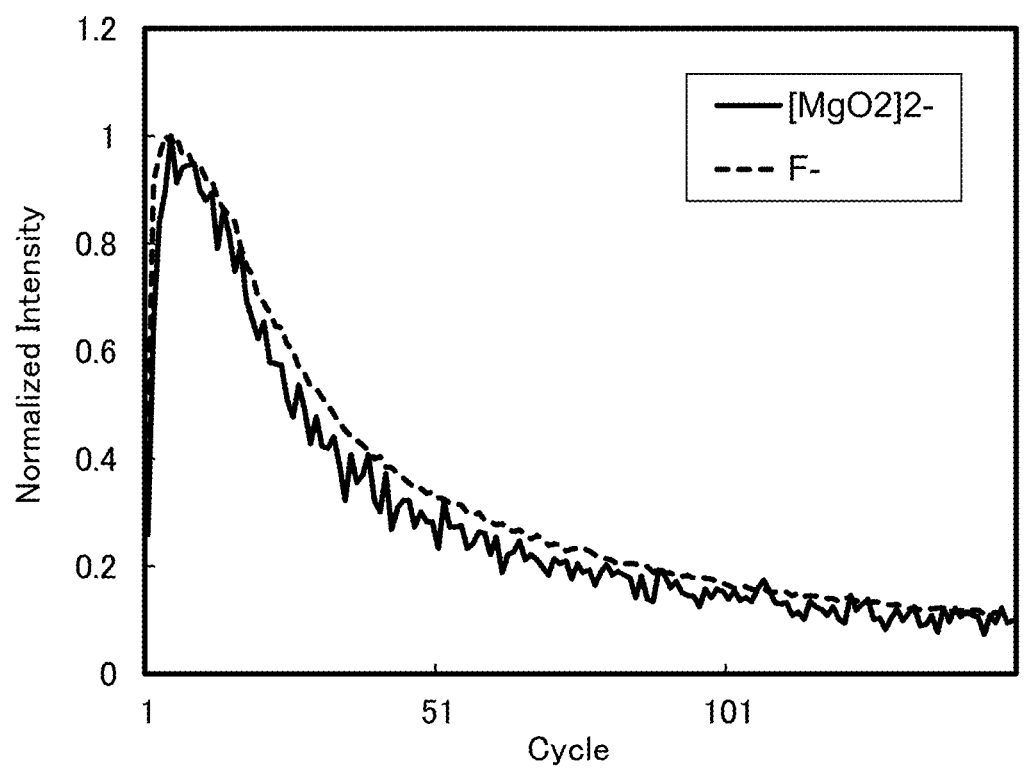
FIG. 38 shows ToF-SIMS depth analysis of a positive electrode active material in Example 3.

FIG. 38 shows a graph of the intensity of magnesium oxide ion ($[MgO_2]^{2-}$) and fluoride ion ($F^-$). The horizontal axis shows the number of measurements (the number of cycles). Since the analysis on negative ions was carried out in this measurement, the distribution of magnesium was evaluated by the intensity of $[MgO_2]^{2-}$. Note that each intensity was normalized by setting the maximum value to 1.

As shown in FIG. 38, it was revealed that in the sample 7 having the second region formed by segregation of magnesium, the distribution of magnesium and fluorine in the depth direction overlapped with the peak.

<XPS>

Figure 39:
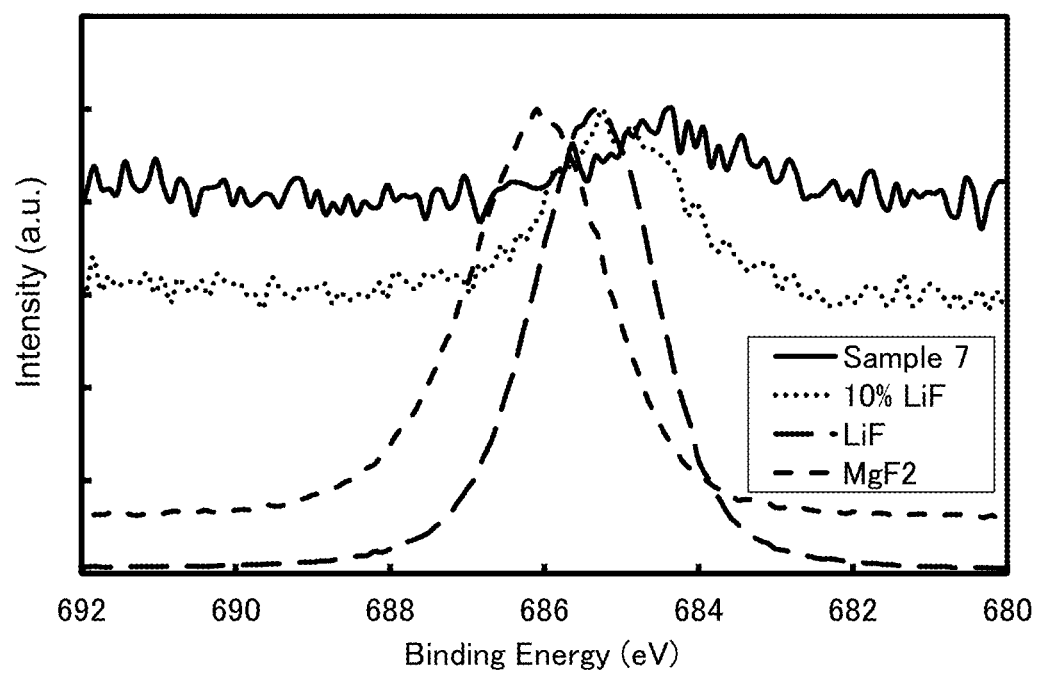
FIG. 39 shows XPS spectra of a positive electrode active material in Example 3.

Next, Table 6 and FIG. 39 show the results of analyzing the positive electrode active material of the sample 7 using XPS before and after the second heating. The XPS analysis was carried out in the same manner as in Example 1.

The results of quantifying the concentration of each element of the sample 7 using XPS are shown in Table 6. Note that the quantitative accuracy is about ±1 atomic %, and the detection lower limit is about 1 atomic % depending on the element. In Ca, the curve-fitting Mg Auger peak is removed, and the quantitative error is larger than usual.

TABLE 6

| | Quantitative value (atomic %) | | | | | | | | | |
|---|---|---|---|---|---|---|---|---|---|---|
| | Li | Co | Ti | O | C | F | S | Ca | Mg | Na | Zr |
| Sample 7 Before second heating | 12.2 | 17.9 | 0.0 | 47.9 | 14.5 | 1.6 | 0.0 | 0.4 | 3.7 | 1.4 | 0.3 |
| Sample 7 After second heating | 12.5 | 15.9 | 0.0 | 46.6 | 14.7 | 1.4 | 0.2 | 0.7 | 5.5 | 2.2 | 0.3 |

The quantitative values in Table 6 are values in the range of from 4 nm to 5 nm in depth from the surface of the positive electrode active material toward the center, which can be analyzed by XPS, and when the total amount of lithium, cobalt, titanium, oxygen, carbon, fluorine, sulfur, calcium, magnesium, sodium, and zirconium is taken as 100 atomic %.

As shown in Table 6, in the range of from 4 nm to 5 nm in depth from the surface toward the center of the sample 7 having the second region formed by segregation after the second heating, the magnesium concentration was 5.5 atomic % and the fluorine concentration was 1.4 atomic % when the total amount of lithium, cobalt, titanium, oxygen, carbon, fluorine, sulfur, calcium, magnesium, sodium, and zirconium was taken as 100%.

When the total amount of lithium, cobalt, oxygen, fluorine, and magnesium was taken as 100%, the concentration of magnesium was calculated to be 6.7%, and the concentration of fluorine was calculated to be 1.7%.

The ratio of the concentration of magnesium to fluorine was within the range of Mg:F=y:1 (3≤y≤5), more precisely Mg:F=about 3.9:1.

Next, the results of analyzing the bonding state of fluorine in the sample 7 after the second heating by the surface XPS analysis are shown in FIG. 39. As a comparative example, the results of a sample prepared in the same manner as in the sample 7 except that 10 mol % LiF was used as an addition starting material and no magnesium was added are shown. The XPS spectra of standard samples of $MgF_2$ and LiF are also shown.

As shown in FIG. 39, in the sample in which 10 mol % LiF was used as an addition starting material and no magnesium was added, the peak of the binding energy of fluorine was about 685 eV which is equal to LiF, and it was considered that LiF is the main bonding state for fluorine on the superficial portion of the positive electrode active material. On the other hand, in the sample 7 having 1 mol % MgO and 2 mol % LiF added as the starting material and having the second region, the peak of the binding energy of fluorine on the superficial portion of the positive electrode active material was 682 eV or more and less than 685 eV, more accurately, was 684.3 eV, which was not consistent with either $MgF_2$ or LiF. In other words, fluorine contained in the second region of the positive electrode active material was presumed to exist in a bonded state not $MgF_2$ or LiF.

Example 4

In the present example, examination results of the temperature of the second heating and the atmosphere during the second heating when the positive electrode active material having the second region formed by segregation was formed will be described.

<<Temperature of Second Heating>>

<Preparation of Positive Electrode Active Materials of Sample 11 to Sample 13>

Positive electrode active material of the sample 11 to the sample 13, in which the temperature of the second heating was changed, were prepared. For all starting materials, lithium carbonate and cobalt oxide were used as common starting materials, and 1 mol % MgO and 2 mol % LiF were used as addition starting materials.

The positive electrode active materials were prepared in the same manner as in the sample 7 of Example 1 except that the temperature of the second heating was 700° C. for the sample 11, 900° C. for the sample 12, and 1000° C. for the sample 13. Note that the temperature of the second heating for the sample 7 was 800° C. The temperature of the second heating for each sample is shown in Table 7.

TABLE 7

| | Addition starting material | Temperature of second heating (° C.) |
|---|---|---|
| Sample 11 | 1 mol % MgO | 700 |
| Sample 7 | 2 mol % LiF | 800 |
| Sample 12 | | 900 |
| Sample 13 | | 1000 |

Figure 40A:
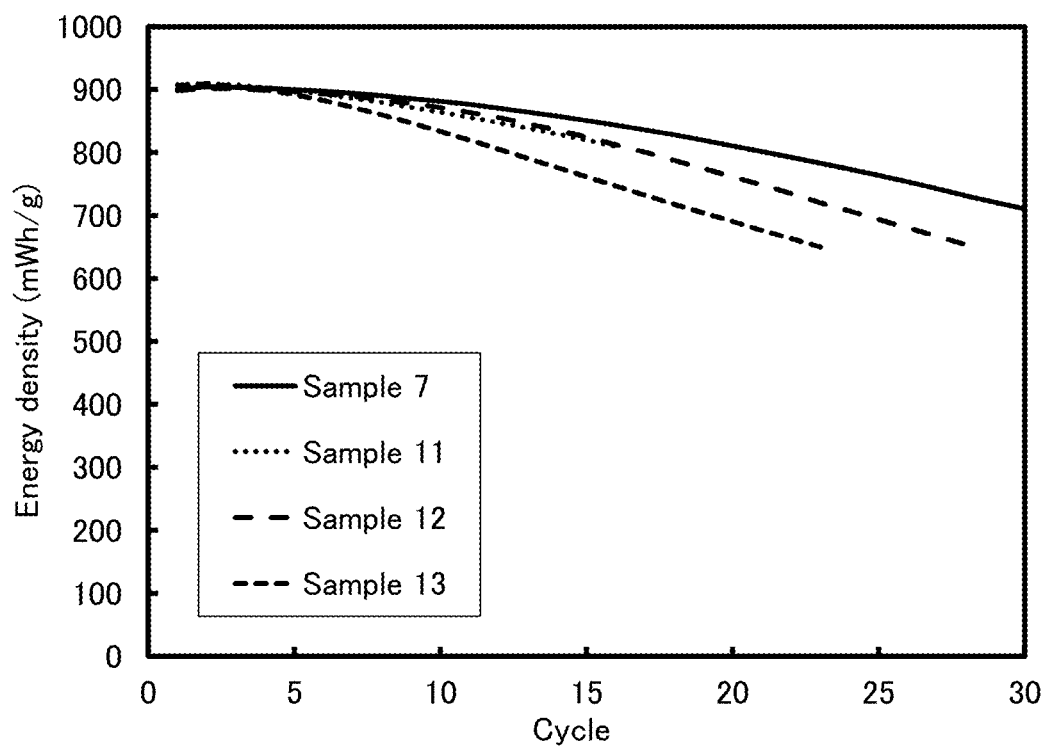
FIGS. 40A and 40B are graphs showing cycle characteristics of a secondary battery in Example 4.
Figure 40B:
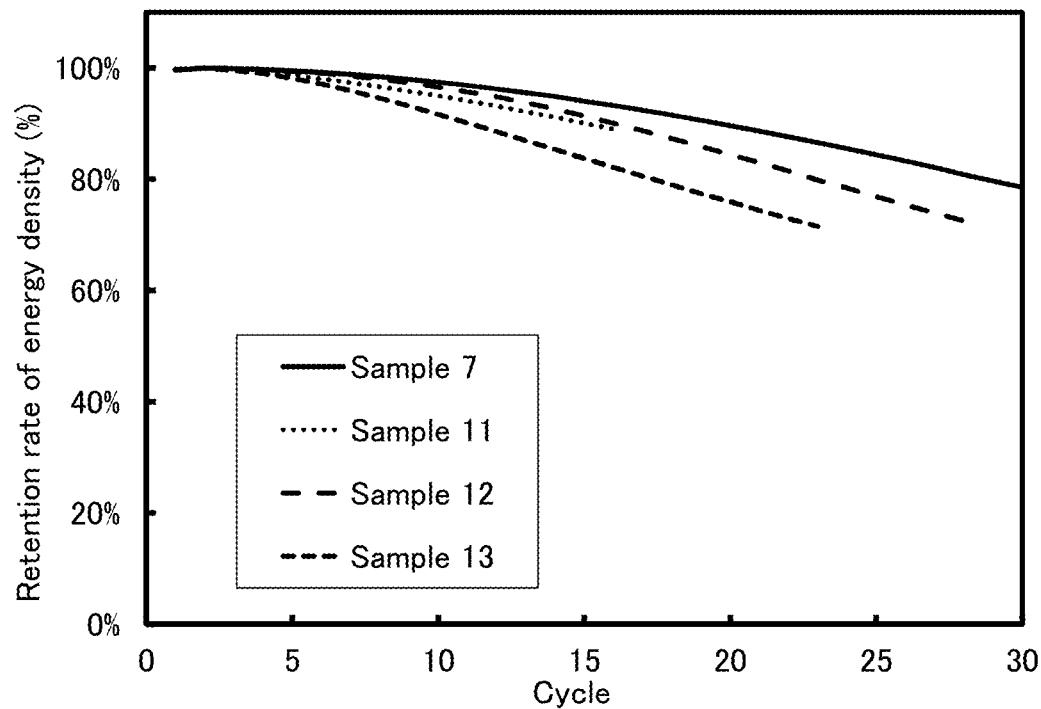

Secondary batteries were prepared in the same manner as in Example 1, using the positive electrode active materials of the sample 7 and the sample 11 to the sample 13, and the cycle characteristics were evaluated. The cycle characteristics of the sample 7 and the sample 11 to sample 13 are shown in FIGS. 40A and 40B. The charge and discharge conditions were the same as those in Example 1.

FIG. 40A is a graph of energy density at 4.6 V charging, and FIG. 40B is a graph of energy density retention rate at 4.6 V charging. As shown in FIG. 40B, the sample 7 with the second heating temperature of 800° C. showed the best cycle characteristics. The sample 11 at the second heating temperature of 700° C. and the sample 12 at 900° C. had the second best cycle characteristics. Even in the sample 13 at which the second heating temperature of 1000° C., the energy density retention rate after 20 cycles was 76%. This can be said that the sample 13 exhibited favorable cycle characteristics as compared with the sample 6 shown in FIG.

26 that had no addition starting material and had the energy density retention rate of 63% after 20 cycles.

Accordingly, the temperature of the second heating is preferably 700° C. or more and 1000° C. or less, more preferably 700° C. or more and 900° C. or less, and much more preferably approximately 800° C.

<<Atmosphere of Second Heating>>
<Preparation of Positive Electrode Active Material of Sample 14 to Sample 16>

Positive electrode active materials of the sample 14 to the sample 16 were prepared by changing the atmosphere of the second heating from dry air to 100% oxygen. For all starting materials, lithium carbonate and cobalt oxide were used as common starting materials, and 1 mol % MgO and 2 mol % LiF were used as addition starting materials. The positive electrode active materials were prepared in the same manner as the sample 7, the sample 12, and the sample 13, except that the second heating was changed to an oxygen atmosphere.

Secondary batteries were fabricated in the same manner as in Example 1, using the positive electrode active materials of the sample 14 to the sample 16, and the cycle characteristics were evaluated together with the samples 7, 12, and 13.

Figure 41A:
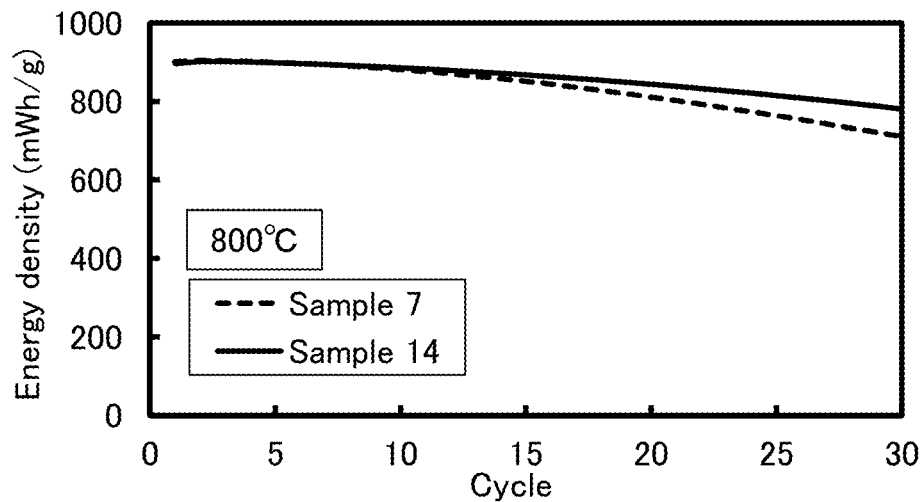
FIGS. 41A to 41C are graphs showing cycle characteristics of a secondary battery in Example 4.
Figure 41B:
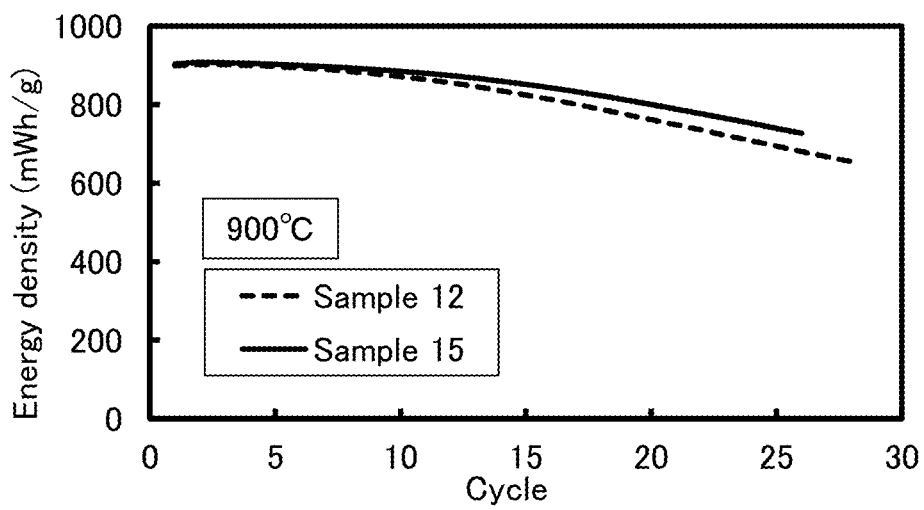
Figure 41C:
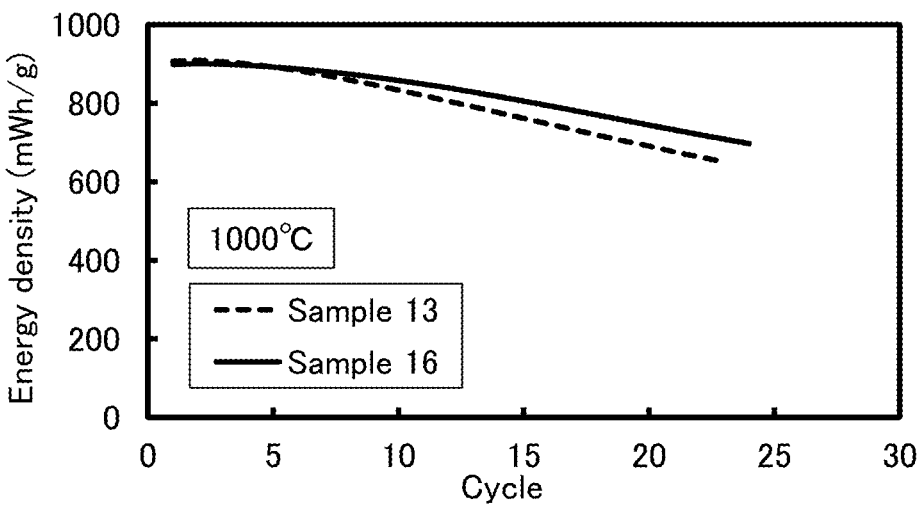
Figure 42A:
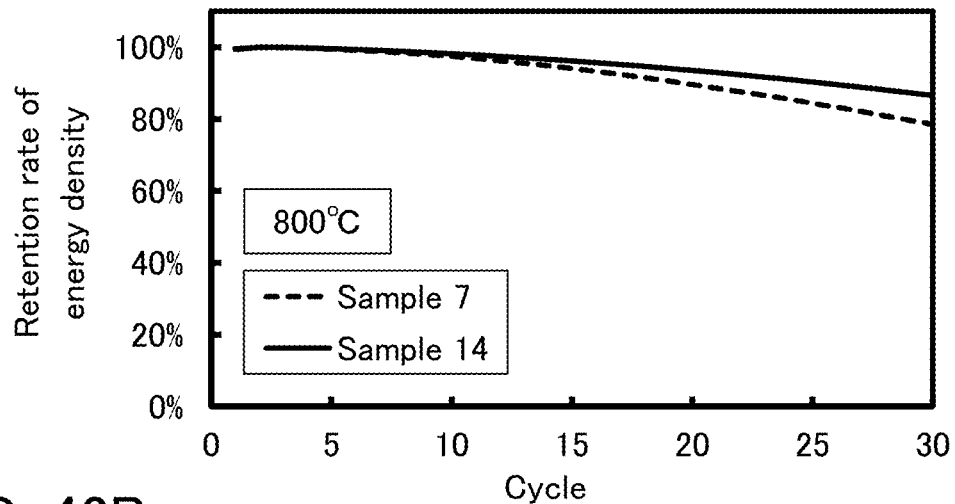
FIGS. 42A to 42C are graphs showing cycle characteristics of a secondary battery in Example 4.
Figure 42B:
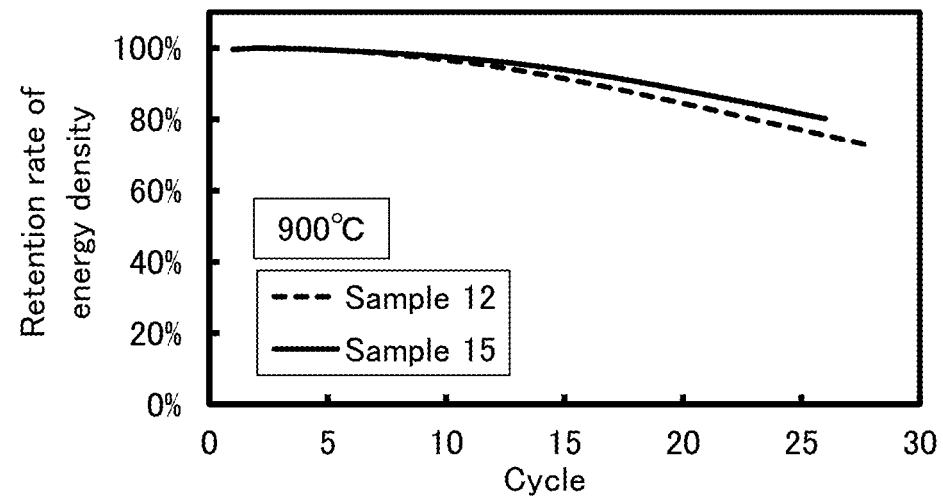
Figure 42C:
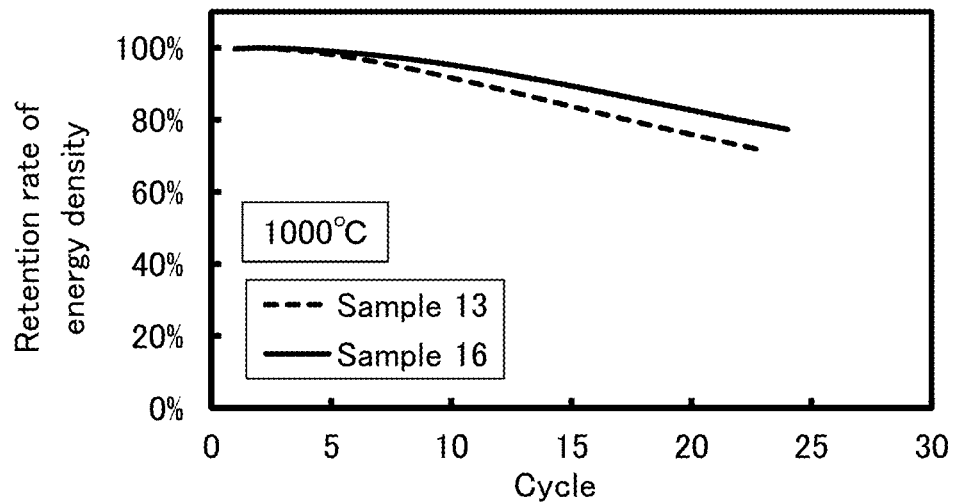

Graphs of energy density and cycle characteristics of the sample 7 and the sample 12 to the sample 16 are shown in FIGS. 41A to 41C and FIGS. 42A to 42C. FIGS. 41A to 41C are graphs of energy density, and FIGS. 42A to 42C are graphs of cycle characteristics. FIGS. 41A and 42A show the energy density and the cycle characteristics of the sample 14 and the sample 7 with the second heating temperature of 800° C. FIGS. 41B and 42B show the energy density and the cycle characteristics of the sample 15 and the sample 12 with the second heating temperature of 900° C. FIGS. 41C and 42C show the energy density and the cycle characteristics of the sample 16 and the sample 13 with the second heating temperature of 1000° C. The second heating atmosphere and the second heating temperature of each sample shown in FIGS. 41A to 41C and FIGS. 42A to 42C are shown in Table 8.

TABLE 8

| | Temperature of second heating (° C.) | Atmosphere of second heating |
|---|---|---|
| Sample 14 | 800 | $O_2$ |
| Sample 7 | 800 | Dry Air |
| Sample 15 | 900 | $O_2$ |
| Sample 12 | 900 | Dry Air |
| Sample 16 | 1000 | $O_2$ |
| Sample 13 | 1000 | Dry Air |

As shown in FIGS. 41A to 41C, when the second heating at 800° C., 900° C., and 1000° C. was performed, the second heating performed in an oxygen atmosphere contributed to better cycle characteristics than that performed in the dry air.

Example 5

In this example, the cycle characteristics when magnesium and fluorine were used as addition starting materials and the cycle characteristics when an element other than magnesium or fluorine was used were compared.

<<Comparison Between Fluorine and Chlorine>>

First, the cycle characteristics were compared between the case of using magnesium and fluorine as the addition starting materials and the case of using chlorine instead of fluorine.

<Preparation of Positive Electrode Active Material of Samples 17 and 18>

For the sample 7, 1 mol % MgO and 2 mol % LiF with respect to cobalt were used as addition starting materials. For the sample 17, 1 mol % MgO, 1 mol % LiF, and 1 mol % LiCl were used. For the sample 18 as a comparative example, 1 mol % MgO and 2 mol % LiCl were used. For the sample 6 as a comparative example, neither magnesium nor fluorine nor chlorine was added.

For the sample 7, the sample 17, the sample 18, and the sample 6, positive electrode active materials were prepared in the same manner as in Example 2, and secondary batteries using them were prepared, to evaluate the cycle characteristics. The cycle characteristic test was carried out in the same manner as in Example 1.

<Cycle Characteristics>

Table 9 shows the addition starting materials and the energy density retention rate after 20 cycles of each sample.

TABLE 9

| | Addition starting material | Energy density retention rate (%) at 4.6 V charging after 20 cycles |
|---|---|---|
| Sample 7 | 1 mol % MgO, 2 mol % LiF | 97.0 |
| Sample 17 | 1 mol % MgO, 1 mol % LiF, 1 mol % LiCl | 80.2 |
| Sample 18 (comparative example) | 1 mol % MgO, 2 mol % LiCl | 55.8 |
| Sample 6 (comparative example) | — | 62.9 |

As shown in Table 9, when chlorine was added in place of fluorine, cycle characteristics tended to decrease. However, in the sample 17 having 1 mol % fluorine and 1 mol % chlorine, the energy density retention rate after 20 cycles was 80% or more. This was a good cycle characteristic as compared with the sample 6 having neither magnesium nor fluorine nor chlorine.

<<Comparison Between Magnesium and Other Metals>>

Next, the cycle characteristics were compared between the case where magnesium and fluorine were used as addition starting materials and the case where other metals were used instead of magnesium.

<Preparation of Positive Electrode Active Material of Sample 19 to Sample 29>

The sample 7 of Example 1 was used as a sample using magnesium and fluorine as addition starting materials. For a sample 19 as a comparative example, 1 mol % MgO, 1 mol % $TiO_2$, and 2 mol % LiF were used as addition starting materials. For a sample 20 as a comparative example, 1 mol % $ZrO_2$ and 2 mol % LiF were used as addition starting materials. For a sample 21 as a comparative example, 1 mol % $TiO_2$ and 2 mol % LiF were used as addition starting materials. For a sample 22 as a comparative example, 1 mol % $V_2O_5$ and 2 mol % LiF were used as addition starting materials. For a sample 23 as a comparative example, 1 mol % ZnO and 2 mol % LiF were used as addition starting materials. For a sample 24 as a comparative example, 1 mol % CaO and 2 mol % LiF were used as addition starting materials. For a sample 25 as a comparative example, 1 mol % $Al_2O_3$ and 2 mol % LiF were used as addition starting materials. For a sample 26 as a comparative example, 1 mol % $MoO_2$ and 2 mol % LiF were used as addition starting materials. For a sample 27 as a comparative example, 1 mol % SrO and 2 mol % LiF were used as addition starting materials. For a sample 28 as a comparative example, 1 mol % NaF and 1 mol % LiF were used as addition starting materials. For a sample 29 as a comparative example, 1 mol % BaO and 2 mol % LiF were used as addition starting materials. As a comparative example in which neither fluorine nor any metal was added, the sample 6 of Example 1 was used.

For the sample 6, the sample 7, and the samples 19 to 29, positive electrode active materials were prepared in the same manner as in Example 1, and secondary batteries using them were prepared to evaluate cycle characteristics.

<Cycle Characteristics>

Table 10 shows the addition starting materials and the energy density retention rate after 20 cycles of each sample.

TABLE 10

| | Addition starting material | Energy density retention rate (%) at 4.6 V charging after 20 cycles |
|---|---|---|
| Sample 7 | 1 mol % MgO, 2 mol % LiF | 97.0 |
| Sample 19 (comparative example) | 1 mol % MgO, 1 mol % TiO$_2$, 2 mol % LiF | 58.5 |
| Sample 20 (comparative example) | 1 mol % ZrO$_2$, 2 mol % LiF | 58.4 |
| Sample 21 (comparative example) | 1 mol % TiO$_2$, 2 mol % LiF | 55.2 |
| Sample 22 (comparative example) | 1 mol % V$_2$O$_5$, 2 mol % LiF | 54.8 |
| Sample 23 (comparative example) | 1 mol % ZnO, 2 mol % LiF | 53.8 |
| Sample 24 (comparative example) | 1 mol % CaO, 2 mol % LiF | 51.0 |
| Sample 25 (comparative example) | 1 mol % Al$_2$O$_3$, 2 mol % LiF | 49.7 |
| Sample 26 (comparative example) | 1 mol % MoO$_2$, 2 mol % LiF | 49.5 |
| Sample 27 (comparative example) | 1 mol % SrO, 2 mol % LiF | 49.0 |
| Sample 28 (comparative example) | 1 mol % NaF, 1 mol % LiF | 47.3 |
| Sample 29 (comparative example) | 1 mol % BaO, 2 mol % LiF | 4.9 |
| Sample 6 (comparative example) | — | 62.9 |

As shown in Table 10, when other metals were added in place of magnesium, cycle characteristics tended to deteriorate.

From these results, it became clear that it is extremely effective way to use magnesium and fluorine in combination as addition starting materials.

From the previous example, it was revealed that magnesium segregates on the surface of the positive electrode active material by adding magnesium and fluorine as starting materials of the positive electrode active material. Moreover, it became clear that the positive electrode active material can have high capacity and excellent cycle characteristics since it has a good coating layer formed by segregation.

A secondary battery having such a positive electrode active material has high capacity and long lifetime, so it is suitable for portable electronic devices. Furthermore, when used to cars and other vehicles, it is also possible to avoid using commercial power at the peak of electric power demand, which can contribute to energy saving and reduction of carbon dioxide emissions.

Example 6

In the present example, evaluation results of a prepared positive electrode active material in which nickel, manganese, and cobalt are used as the transition metal of the first region will be described.

<Sample 31, sample 32>

A sample 31 having magnesium and fluorine and a sample 32 having neither magnesium nor fluorine as a comparative example were prepared.

The sample 31 was a sample obtained by adding 1 atomic % of magnesium and 2 atomic % of fluorine with respect to the sum of nickel, manganese, and cobalt as starting materials. In addition, the atomic ratio between nickel, manganese, and cobalt as starting materials was Ni:Mn:Co=1:1:1.

First, lithium carbonate (Li$_2$CO$_3$) was used as the lithium source of the common starting material. As the nickel source, nickel oxide (NiO) was used. As the manganese source, manganese oxide (MnO$_2$) was used. As the cobalt source, cobalt oxide (Co$_3$O$_4$) was used. As the magnesium source of the addition starting material, magnesium oxide (MgO) was used. As the fluorine source, lithium fluoride (LiF) was used.

Each starting material was weighed so as to have an atomic ratio of LiCo$_{0.323}$Mn$_{0.333}$Ni$_{0.333}$O$_2$+MgO$_{0.01}$LiF$_{0.02}$.

Next, the weighed starting materials were mixed with a ball mill.

Then, the mixed starting materials were baked. The baking was performed at 950° C. for 10 hours under the following conditions: the temperature rising rate was 200° C./h; and the flow rate of dry air atmosphere was 10 L/min.

Through the above process, particles of composite oxide containing lithium, nickel, manganese, cobalt, fluorine, and magnesium were synthesized.

The synthesized composite oxide particles were cooled to room temperature.

Then, the composite oxide particles were heated. The heating was performed in a dry air atmosphere under the following conditions: the temperature was 800° C. (the temperature rising rate was 200° C./h); and the retention time was two hours.

The heated particles were cooled to room temperature and subjected to crushing treatment. In the crushing treatment, the particles were made to pass through a sieve having an aperture width of 53 μm.

The particles which were subjected to the crushing treatment were used as a positive electrode active material of the sample 31.

For the sample 32, each starting material was weighed to have an atomic ratio of LiCo$_{0.333}$Mn$_{0.333}$Ni$_{0.333}$O$_2$. In addition, baking was performed at 1000° C. For other than that, the fabrication method of the sample 31 can be referred to.

Table 11 shows the fabrication conditions of the samples 31 and 32.

TABLE 11

| | Common starting material | Addition starting material | Mg:F (atomic ratio) |
|---|---|---|---|
| Sample 31 | Li$_2$CO$_3$ NiO, MnO$_2$, Co$_3$O$_4$ | 1 mol % MgO, 2 mol % LiF | 1:2 |
| Sample 32 | | — | — |

<Cycle Characteristics>

Next, CR2032 coin-type secondary batteries (with a diameter of 20 mm and a height of 3.2 mm) were fabricated using the positive electrode active materials of the sample 31 and the sample 32 formed in the above manners. Their cycle characteristics were evaluated.

A positive electrode formed by applying slurry in which the positive electrode active materials of the samples 31 and 32, acetylene black (AB), and polyvinylidene fluoride (PVDF) were mixed at a weight ratio of positive electrode active material:AB:PVDF=95:2.5:2.5 to an aluminum foil current collector was used. N-methyl-2-pyrrolidone (NMP) was used as a solvent.

A lithium metal was used for the counter electrode.

As an electrolyte contained in an electrolyte solution, 1 mol/L lithium hexafluorophosphate (LiPF$_6$) was used. As the electrolyte solution, a solution in which ethylene carbonate (EC) and diethyl carbonate (DEC) at a volume ratio of EC:DEC=3:7 and vinylene carbonate (VC) at a 2 weight % were mixed was used.

A positive electrode can and a negative electrode can were formed of stainless steel (SUS).

The measurement temperature in the cycle characteristics test was 25° C. Charging was carried out at a constant current with a current density of 68.5 mA/g per active material weight, and an upper limit voltage of 4.6 V. After that, constant voltage charging was performed until the current density reached 1.4 mA/g. Discharge was carried out at a constant current with a current density of 68.5 mA/g per active material weight, with a lower limit voltage of 2.5 V.

Figure 43A:
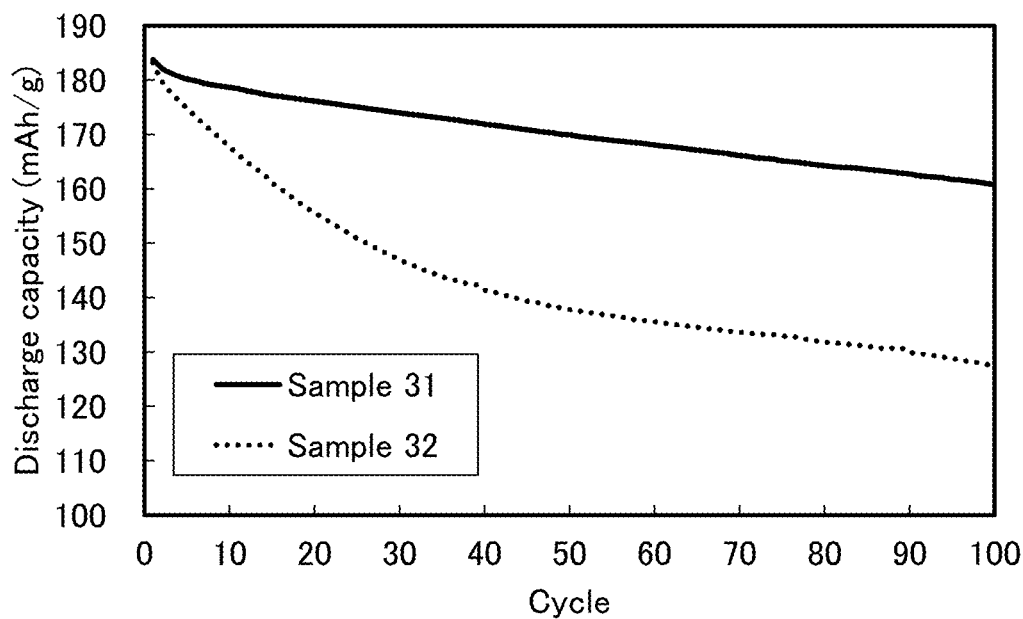
FIGS. 43A and 43B are graphs showing cycle characteristics of a secondary battery in Example 6.
Figure 43B:
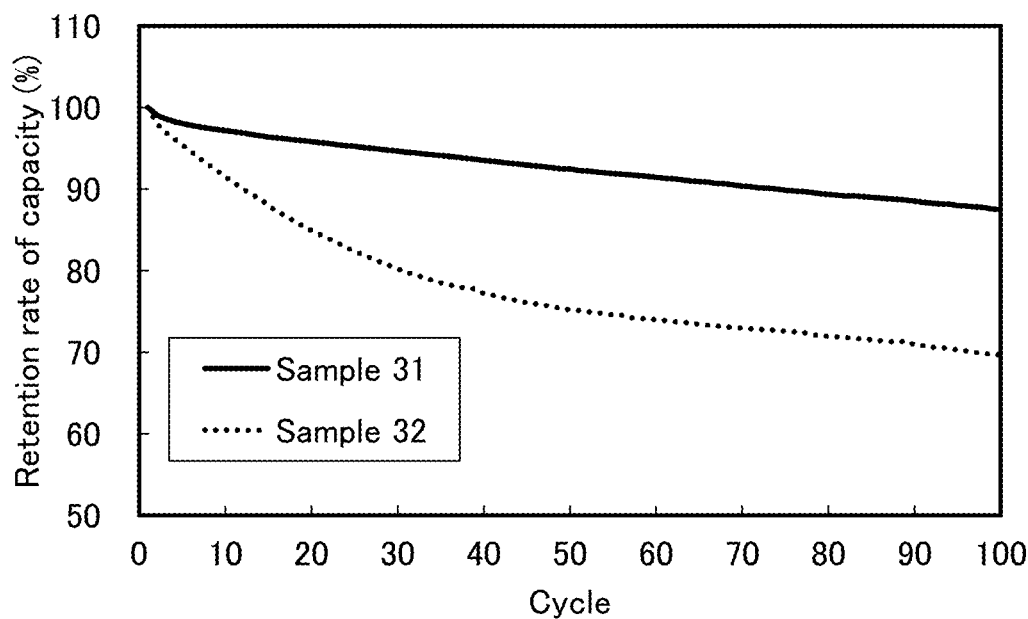

FIG. 43A shows the discharge capacity of the secondary batteries using the positive electrode active materials of the sample 31 and the sample 32 at 4.6 V charging. FIG. 43B shows the discharge capacity retention rate thereof.

Compared to the sample 32 with no addition of magnesium or fluorine, the sample 31 with addition of magnesium and fluorine showed very good cycle characteristics.

Next, the results of various analyzes of the sample 31 are shown below.

<STEM-FFT>

Figure 44A:
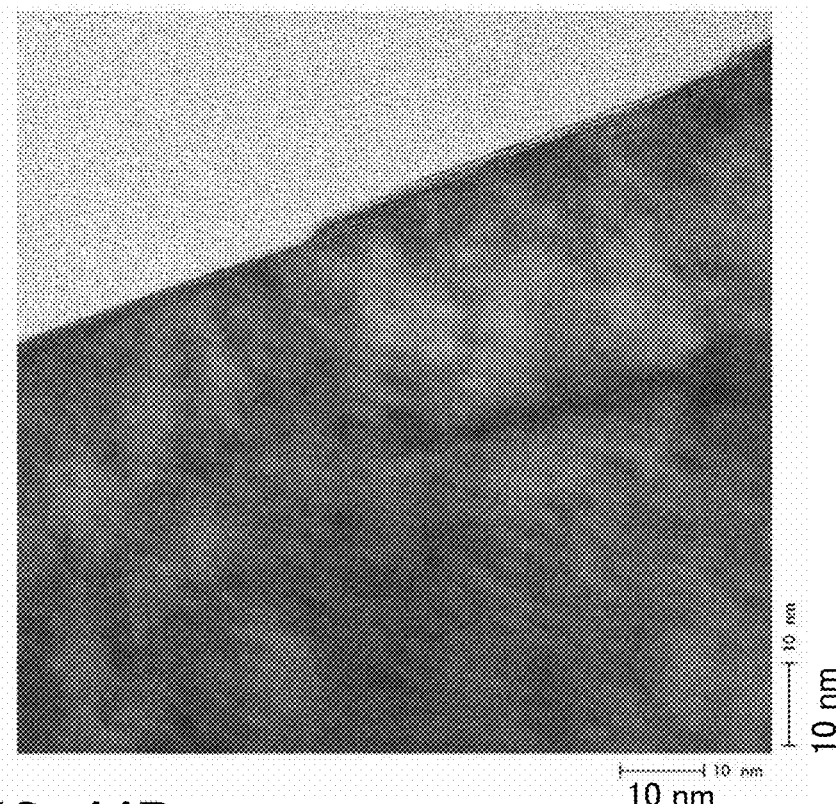
FIGS. 44A and 44B are STEM images of a positive electrode active material in Example 6.
Figure 44B:
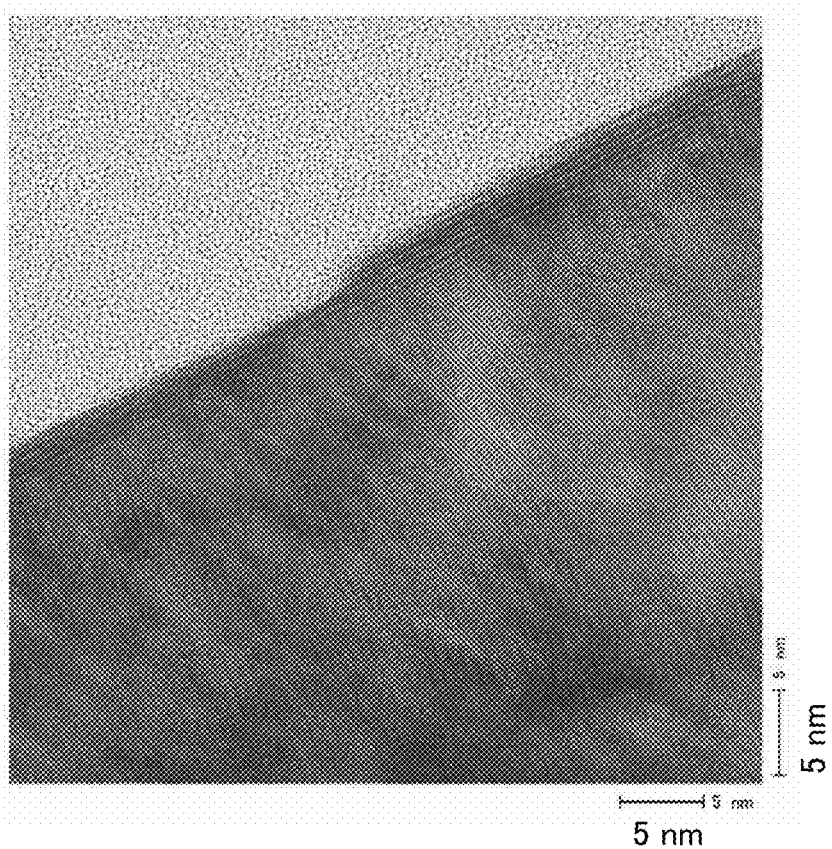
Figure 45A:
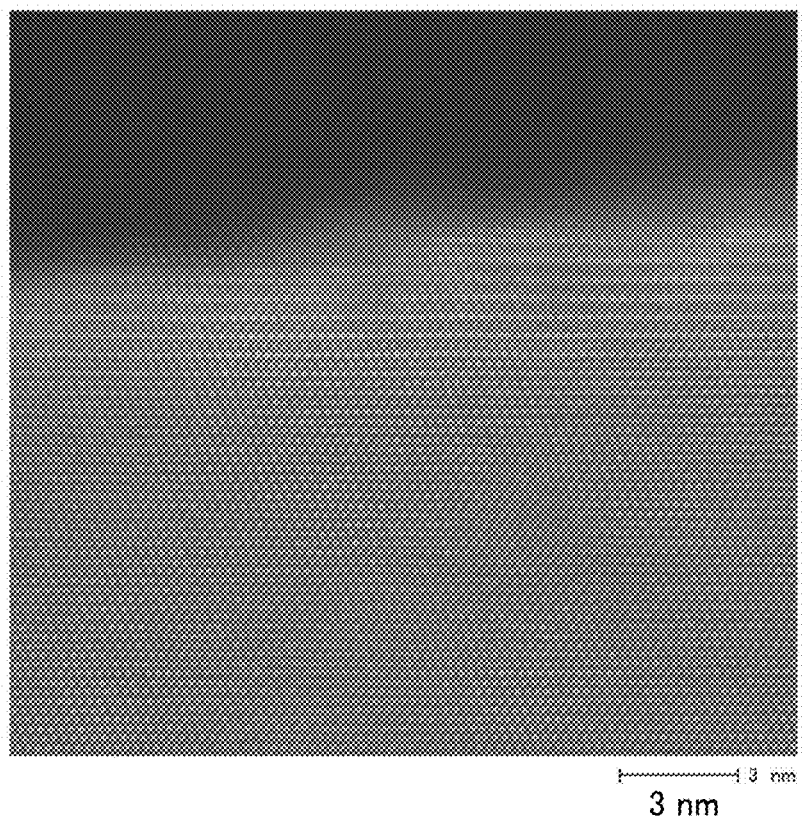
FIGS. 45A and 45B are STEM images of a positive electrode active material in Example 6.
Figure 45B:
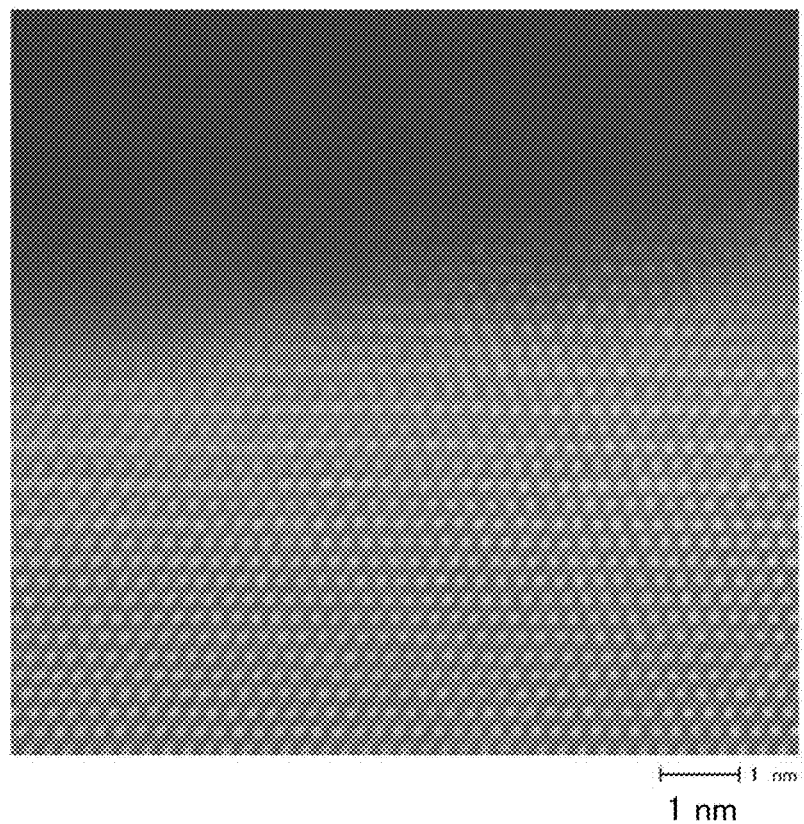

STEM images of the cross section of the vicinity of the surface of the positive electrode active material of the sample 31 are shown in FIGS. 44A and 44B and FIGS. 45A and 45B. FIG. 44B is a STEM image obtained by enlarging a part of FIG. 44A. FIGS. 45A and 45B are HAADF-STEM images obtained by enlarging a part of FIG. 44A.

As is apparent from FIGS. 45A and 45B, in a region of about 0.5 nm from the surface of the positive electrode active material, a state where the brightness is different from that in other regions was observed. This is probably due to the large amount of magnesium which is a lighter element than the transition metal.

Also, in the region from about 0.5 nm to 5 nm from the surface of the positive electrode active material, a state where the regularity was different from that in the internal region was observed. It was considered that this is because the orientation of crystals differs between the region from about 0.5 nm to 5 nm from the surface and the internal region.

Figure 46A:
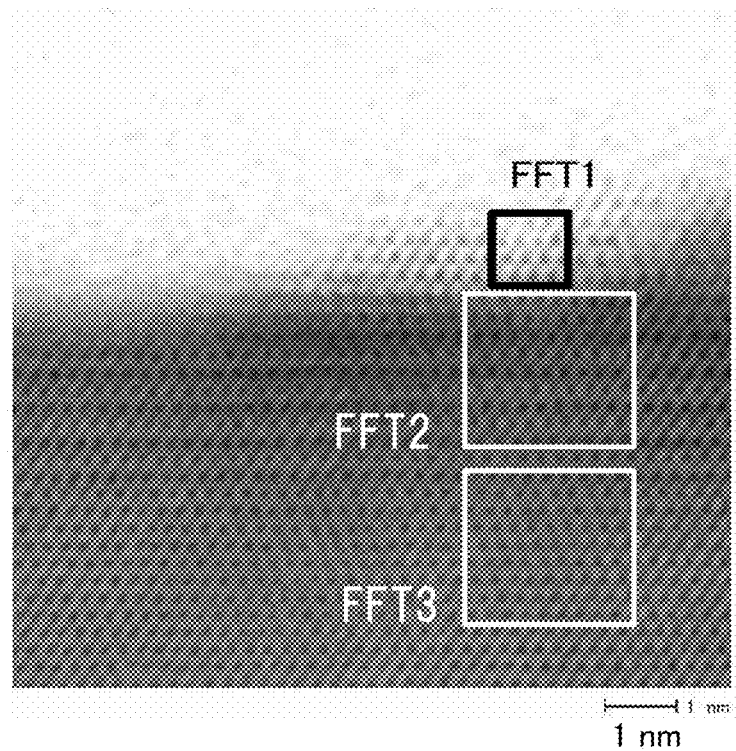
FIGS. 46A to 46D are a STEM image and FFT images of a positive electrode active material in Example 6.
Figure 46B:
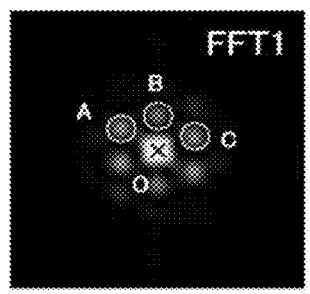

FIG. 46A is a bright field STEM image in the same range as FIG. 45B. FIG. 46B shows a fast Fourier transform (FFT) image of a region indicated by FFT1 in FIG. 46A. Some luminescent spot of the FFT1 image is called A, B, C, 0 as shown in FIG. 46B.

Regarding the luminescent spots of the FFT image in the region indicated by FFT1, the measured values were d=0.22 nm for OA, d=0.25 nm for OB, and d=0.23 nm for OC. In addition, ∠AOB=58°, ∠BOC=69°, ∠AOC=127°.

The results are close to d=0.21 nm for OA(200), d=0.24 nm for OB(1-11), d=0.24 nm for OC(-1-11), ∠AOB=55°, ∠BOC=70°, ∠AOC=125° which are obtained from magnesium oxide (MgO) data (ICDD45-0945) in the ICDD (International Centre for Diffraction Data). Therefore, it became clear that the region indicated by FFT1 is a region having a rock salt type crystal structure and is an image of [011] incidence.

Figure 46C:
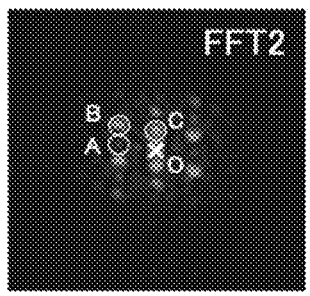

FIG. 46C shows an FFT image of a region indicated by FFT2 in FIG. 46A. Some luminescent spot of the FFT2 image is called A, B, C, 0 as shown in FIG. 46C.

Regarding the luminescent spots of the FFT image in the region indicated by FFT2, the measured values were d=0.25 nm for OA, d=0.21 nm for OB, and d=0.49 nm for OC. In addition, ∠AOB=26°, ∠BOC=57°, ∠AOC=83°.

The results are close to d=0.24 nm for OA(10-11), d=0.20 nm for OB(10-14), d=0.47 nm for OC(0003), ∠AOB=25°, ∠BOC=55°, ∠AOC=80° which are obtained from lithium cobalt oxide (LiCoO$_2$) data (ICDD50-0653) in the ICDD database. Therefore, it became clear that the region indicated by FFT2 is a region having a layered rock-salt type crystal structure and is an image of [−12-10] incidence.

Figure 46D:
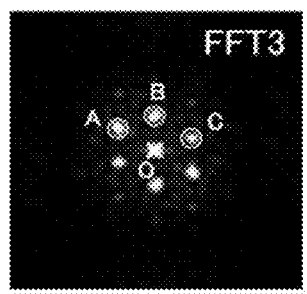

FIG. 46D shows an FFT image of a region indicated by FFT3 in FIG. 46A. Some luminescent spot of the FFT3 image is called A, B, C, O as shown in FIG. 46D.

Regarding the luminescent spots of the FFT image in the region indicated by FFT3, the measured values were d=0.21 nm for OA, d=0.26 nm for OB, and d=0.24 nm for OC. In addition, ∠AOB=56°, ∠BOC=72°, ∠AOC=128°.

The results are close to d=0.20 nm for OA(01-14), d=0.23 nm for OB(10-1-2), d=0.23 nm for OC(1-102), ∠AOB=55°, ∠BOC=70°, ∠AOC=125° which are obtained from lithium cobalt oxide (LiCoO$_2$) data (ICDD50-0653) in the ICDD database. Therefore, it became clear that the region indicated by FFT2 is a region having a layered rock-salt type crystal structure and is an image of [02-21] incidence.

In other words, the regions indicated by FFT2 and FFT3 were found to have the same layered rock-salt type crystal structure, but to have different crystal axis directions from each other.

In the range observable in FIG. 45A, FIG. 45B, and FIG. 46A, it was observed that the crystal orientations roughly coincided with each other even if the brightness was different.

Figure 47:
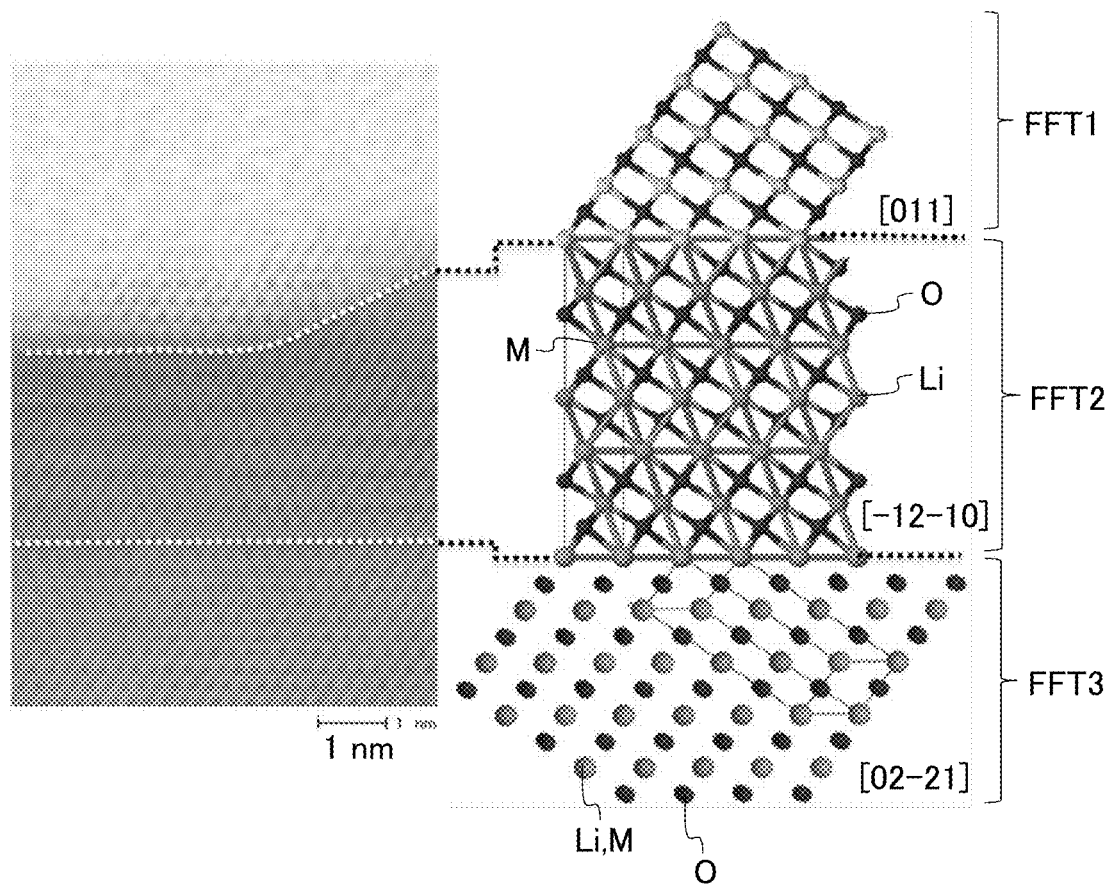
FIG. 47 is a STEM image and an estimation model of a crystal structure of a positive electrode active material in Example 6.

FIG. 47 shows the structure near the surface of the positive electrode active material, which is estimated from the STEM-FFT result, together with the STEM image. M in FIG. 47 indicates any one of nickel, manganese, and cobalt.

FFT3 which is a region in an inner portion of the positive electrode active material has a layered rock-salt type crystal structure. Also, it is an image of [02-21] incidence observed when lithium and M atoms overlap with each other.

In addition, FFT2 which is a region of the superficial portion of the positive electrode active material has a layered rock-salt type crystal structure. FFT2 is an image of [−12-10] incidence showing the state of repeating the layer of oxygen atoms, the layer of M (one of nickel, manganese, and cobalt) atoms, and the layer of lithium atoms. It is considered that the darker layer and the brighter layer are repeated in the bright field STEM image because the layer of M, and the layer of oxygen and lithium are repeated. That is, although FFT3 and FFT2 have the same layered rock-salt type crystal structure, the crystal axis directions are different from each other.

Also, in the region of the superficial portion of the positive electrode active material, FFT1 which is a region closer to the surface than FFT2 has a rock-salt type crystal structure and is an image of [011] incidence.

<EDX>

Next, the cross section of the positive electrode active material of the sample 31 near the surface was analyzed using EDX, and the results are shown in FIGS. 48A1 to 48B2 and FIG. 49A1 to B2.

FIG. 48A1 is a HAADF-STEM image, FIG. 48A2 is a mapping of oxygen, FIG. 48B1 is a mapping of magnesium, and FIG. 48B2 is a mapping of fluorine. FIG. 49A1 is the same HAADF-STEM image as in FIG. 48A1, FIG. 49A2 is a mapping of manganese, FIG. 49B1 is a mapping of nickel, and FIG. 49B2 is a mapping of cobalt.

From FIG. 48B1, it was observed that magnesium segregated in the region of about 3 nm from the surface of the positive electrode active material. By comparing FIGS. 49A2, 49B1, and 49B2, it was observed that there was a region containing less manganese and more nickel and cobalt than the inner side, on where the superficial portion of the positive electrode active material. This region was about 5 nm from the surface and almost overlapped with the region in which regularity different from the inner portion was observed in the STEM image.

Therefore, it was confirmed that the positive electrode active material of the sample 31 is a positive electrode active material having a region containing magnesium in the superficial portion and a region having a low content of manganese in a part of the inner portion.

From the above results, it became clear that the positive electrode active material of the sample 31, which was prepared by setting the molar ratio of starting materials to $LiNi_{1/3}Mn_{1/3}Co_{1/3}O_2+1$ mol % MgO+2 mol % LiF and heating at 800° C., has the following characteristics.

First, the positive electrode active material of the sample 31 includes a second region having magnesium oxide in the superficial portion. In the inner portion of the positive electrode active material, a region containing $LiNi_xMn_yCo_zO_2$ (x+y+z=1) having a layered rock-salt type crystal structure at a part closer to the center part, and a region containing $LiNi_aMn_bCo_cO_2$ (a+b+c=1) having a layered rock-salt type crystal structure at a part closer to the surface are included.

The internal $LiNi_xMn_yCo_zO_2$ and $LiNi_aMn_bCo_cO_2$ have the same layered rock-salt type crystal structure, but the crystal axis directions may be different in some cases.

The content of each element is y>b, and the content of manganese with respect to the sum of nickel, manganese, and cobalt may be low in the region close to the surface.

The positive electrode active material of the sample 31 having the above characteristics exhibits extremely favorable cycle characteristics when used for a secondary battery.

Example 7

In the present example, analysis results of a positive electrode active material prepared by adding cobalt as a transition metal and adding magnesium and fluorine as starting materials using EELS will be described.

The sample 7 of Example 1 using 1 mol % MgO and 2 mol % LiF as addition starting materials was used as an analysis sample of the present example.

Figure 50:
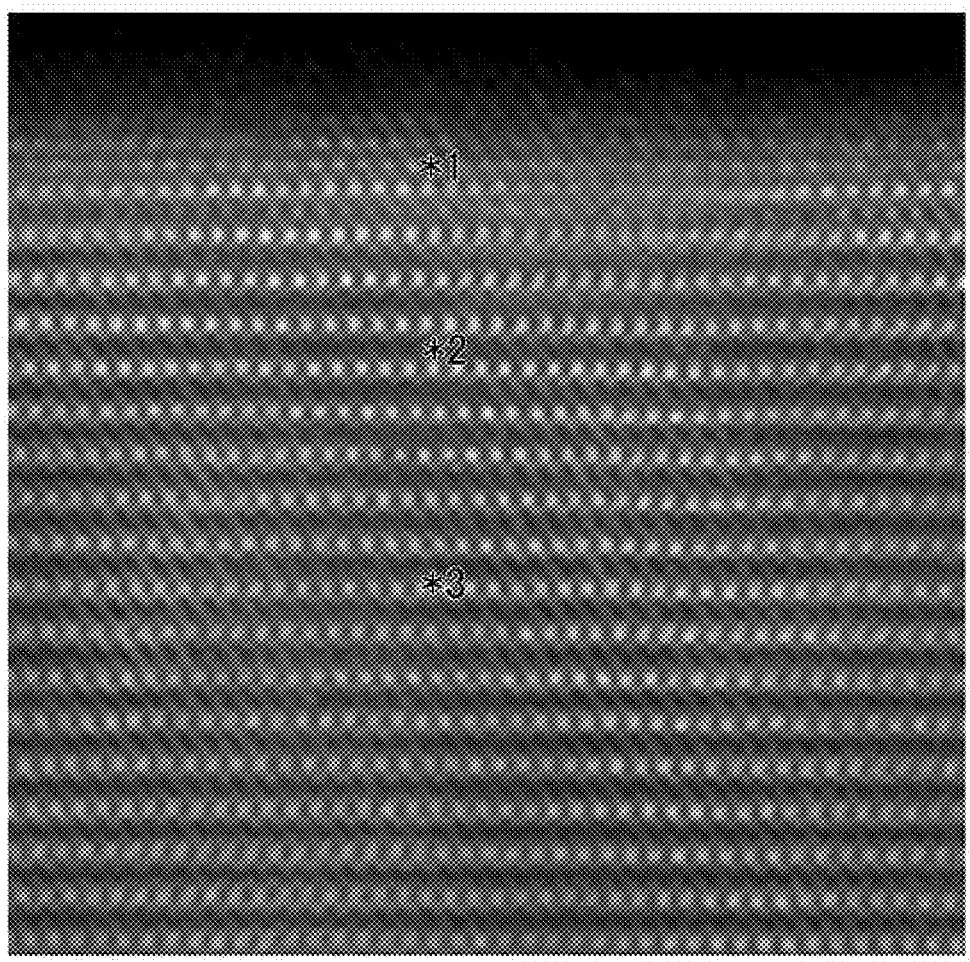
FIG. 50 is a graph showing EELS analysis results of a positive electrode active material in Example 7.

The state of cobalt at the six analysis points from *1 to *6 in a cross section of the sample 7 was analyzed using EELS. FIG. 50 is a STEM image of the cross section of the vicinity of the surface of the positive electrode active material of the sample 7 used for EELS analysis, in which analysis points of *1 (the depth from the surface is about 1 nm), *2 (about 2.5 nm), and *3 (about 5 nm) are shown. Furthermore, *4 is about 10 nm from the surface of the positive electrode active material, *5 is about 100 nm from the surface of the positive electrode active material, and *6 is near the center of the particle of the positive electrode active material.

Figure 51:
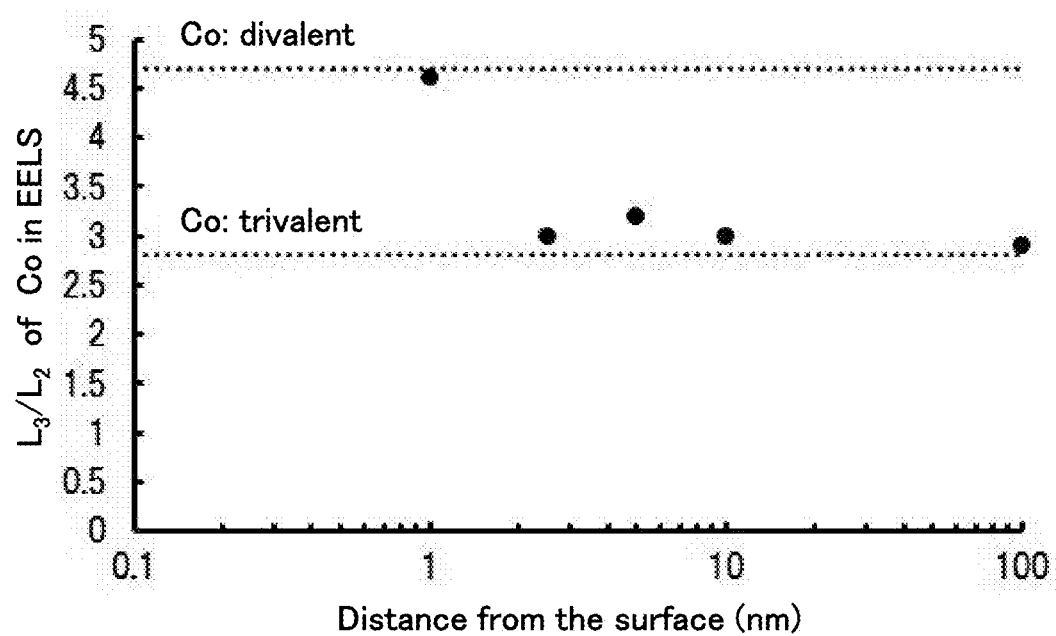
FIG. 51 is a graph showing EELS analysis results of a positive electrode active material in Example 7.

Table 12 and FIG. 51 show the EELS spectral intensity ratios of the $L_2$ level and the $L_3$ level of cobalt in each analysis point. The higher the $L_3/L_2$ is, the lower the valence of cobalt becomes.

TABLE 12

| Measurement region | $L_3/L_2$ |
|---|---|
| *1 | 4.6 |
| *2 | 3.0 |
| *3 | 3.2 |
| *4 | 3.0 |
| *5 | 2.9 |
| *6 | 3.1 |

As is apparent from Table 12 and FIG. 51, $L_3/L_2$ of the analysis point *1 closest to the surface of the positive electrode active material was the highest, 4.6. From the analysis point *2 to the analysis point *6, $L_3/L_2$ was lower than that of the analysis point *1 and was within the range from 2.9 to 3.2 and no large difference was observed.

From these results, it was inferred that the amount of divalent cobalt existing as cobalt oxide (CoO) was large in the analysis point *1, and that the amount of trivalent cobalt existing as lithium cobalt oxide ($LiCoO_2$) was large in the analysis points *2 to *6.

REFERENCE NUMERALS

100: positive electrode active material, 101: first region, 102: second region, 103: third region, 200: active material layer, 201: graphene compound, 211a: positive electrode, 211b: negative electrode, 212a: lead, 212b: lead, 214: separator, 215a: bonding portion, 215b: bonding portion, 217: fixing member, 250: secondary battery, 251: exterior body, 261: folded portion, 262: seal portion, 263: seal portion, 271: crest line, 272: trough line, 273: space, 300: secondary battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 500: secondary battery, 501: positive electrode current collector, 502: positive electrode active material layer, 503: positive electrode, 504: negative electrode current collector, 505: negative electrode active material layer, 506: negative electrode, 507: separator, 508: electrolyte solution, 509: exterior body, 510: positive electrode lead electrode, 511: negative electrode lead electrode, 600: secondary battery, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 612: safety valve mechanism, 900: circuit board, 910: label, 911: terminal, 912: circuit, 913: secondary battery, 914: antenna, 915: sealant, 916: layer, 917: layer, 918: antenna, 920: display device, 921: sensor, 922: terminal, 930: housing, 930a: housing, 930b: housing, 931: negative electrode, 932: positive electrode, 933: separator, 950: wound body, 951: terminal, 952: terminal, 980: secondary battery, 993: wound body, 994: negative electrode, 995: positive electrode, 996: separator, 997: lead electrode, 998: lead electrode, 1001: crystal defect, 7100: portable display device, 7101: housing, 7102: display portion, 7103: operation button, 7104: secondary battery, 7200: portable information terminal, 7201: housing, 7202: display portion, 7203: band, 7204: buckle, 7205: operation button, 7206: input output terminal, 7207: icon, 7300: display device, 7304: display portion, 7400: mobile phone, 7401: housing, 7402: display portion, 7403: operation button, 7404: external connection port, 7405: speaker, 7406: microphone, 7407: secondary battery, 7408: lead electrode, 7409: current collector, 8000: display device, 8001: housing, 8002: display portion, 8003: speaker portion, 8004: secondary battery, 8021: charging apparatus, 8022: cable, 8024: secondary battery, 8100: lighting device, 8101: housing, 8102: light source, 8103: secondary battery, 8104: ceiling, 8105: wall, 8106: floor, 8107: window, 8200: indoor unit, 8201: housing, 8202: air outlet, 8203: secondary battery, 8204: outdoor unit, 8300: electric refrigerator-freezer, 8301: housing, 8302: refrigerator door, 8303: freezer door, 8304: secondary battery, 8400: automobile, 8401: headlight, 8406: electric motor, 8500: automobile, 8600: motor scooter, 8601: side mirror, 8602: secondary battery, 8603: indicator, 8604: storage unit under seat, 9600: tablet terminal, 9625: switch, 9626: switch, 9627: power switch, 9628: operation switch, 9629: fastener, 9630: housing, 9630$a$: housing, 9630$b$: housing, 9631: display portion, 9633: solar cell, 9634: charge and discharge control circuit, 9635: power storage unit, 9636: DC-DC converter, 9637: converter, 9640: movable portion.

This application is based on Japanese Patent Application Serial No. 2016-200835 filed with Japan Patent Office on Oct. 12, 2016, Japanese Patent Application Serial No. 2017-052309 filed with Japan Patent Office on Mar. 17, 2017, and Japanese Patent Application Serial No. 2017-100619 filed with Japan Patent Office on May 22, 2017, the entire contents of which are hereby incorporated by reference.

The invention claimed is:

1. A battery comprising:
a positive electrode comprising an active material particle comprising:
  a first region comprising cobalt and aluminum; and
  a second region comprising cobalt, magnesium, and fluorine,
wherein the first region comprises a layered rock-salt crystal structure,
wherein the second region covers at least a part of the first region,
wherein a maximum peak of the magnesium in the active material particle exists in the second region,
wherein the first region comprises a first measurement region, and a number of trivalent cobalt atoms in the first measurement region exceeds a number of cobalt atoms exhibiting other valences in the first measurement region, and
wherein the second region comprises a second measurement region, and a number of divalent cobalt atoms in the second measurement region exceeds a number of cobalt atoms exhibiting other valences in the second measurement region.

2. The battery according to claim 1,
wherein a concentration of magnesium is 1 atomic % or more and 16 atomic % or less, with respect to a total atom amount taken as 100 atomic % of lithium, cobalt, oxygen, magnesium, and fluorine as detected by X-ray photoelectron spectroscopy on a surface of the active material particle.

3. The battery according to claim 1,
wherein a thickness of the second region is greater than or equal to 0.5 nm and less than or equal to 50 nm, and
wherein a diameter of the active material particle is greater than or equal to 1 μm.

4. The battery according to claim 1,
wherein a concentration of fluorine is 0.2 atomic % or more and 4 atomic % or less with respect to a total atom amount taken as 100 atomic % of lithium, cobalt, oxygen, magnesium, and fluorine as detected by X-ray photoelectron spectroscopy on a surface of the active material particle.

5. The battery according to claim 1,
wherein the second region has a rock-salt crystal structure.

6. The battery according to claim 1,
wherein the second region further comprises Co(II)O.

7. An electronic device comprising:
the battery according to claim 1; and
a circuit electrically connected to the battery,
wherein the circuit is configured to protect the battery from overcharge.

8. The battery according to claim 1,
wherein the first region further comprises magnesium and fluorine,
wherein a distribution of the magnesium in the second region overlaps with a distribution of the fluorine in the second region,
wherein a maximum peak of the fluorine in the active material particle exists in the second region, and
wherein the second region extends from a surface of the active material particle to an inside of the active material particle where the magnesium is ⅕ of the maximum peak of the magnesium in the active material particle.

9. The battery according to claim 8,
wherein the distribution of the magnesium in the second region, the distribution of the fluorine in the second region, the maximum peak of the magnesium, and the maximum peak of the fluorine are measured by a line analysis of EDX.

10. A battery comprising:
a positive electrode comprising an active material particle comprising:
  a first region comprising cobalt, aluminum, magnesium, and fluorine, wherein the first region comprises a crystal defect; and
  a second region comprising cobalt, magnesium, and fluorine,
wherein the first region comprises a layered rock-salt crystal structure,
wherein the second region covers at least a part of the first region,
wherein a maximum peak of the magnesium in the active material particle exists in the second region,
wherein the first region comprises a first measurement region, and a number of trivalent cobalt atoms in the first measurement region exceeds a number of cobalt atoms exhibiting other valences in the first measurement region, and
wherein the second region comprises a second measurement region, and a number of divalent cobalt atoms in the second measurement region exceeds a number of cobalt atoms exhibiting other valences in the second measurement region.

11. The battery according to claim 10,
wherein a concentration of magnesium is 1 atomic % or more and 16 atomic % or less, with respect to a total atom amount taken as 100 atomic % of lithium, cobalt, oxygen, magnesium, and fluorine as detected by X-ray photoelectron spectroscopy on a surface of the active material particle.

12. The battery according to claim 10,
wherein a thickness of the second region is greater than or equal to 0.5 nm and less than or equal to 50 nm, and
wherein a diameter of the active material particle is greater than or equal to 1 μm.

13. The battery according to claim 10,
wherein a concentration of fluorine is 0.2 atomic % or more and 4 atomic % or less with respect to a total atom amount taken as 100 atomic % of lithium, cobalt, oxygen, magnesium, and fluorine as detected by X-ray photoelectron spectroscopy on a surface of the active material particle.

14. The battery according to claim 10,
wherein the second region has a rock-salt crystal structure.

15. The battery according to claim 10,
wherein the second region further comprises Co(II)O.

16. An electronic device comprising:
the battery according to claim 10; and
a circuit electrically connected to the battery,
wherein the circuit is configured to protect the battery from overcharge.

17. The battery according to claim 10,
wherein a distribution of the magnesium in the second region overlaps with a distribution of the fluorine in the second region, and
wherein a maximum peak of the fluorine in the active material particle exists in the second region.

18. The battery according to claim 17,
wherein the distribution of the magnesium in the second region, the distribution of the fluorine in the second region, the maximum peak of the magnesium, and the maximum peak of the fluorine are measured by a line analysis of EDX.

19. A battery comprising:
a positive electrode comprising an active material particle comprising:
a first region comprising cobalt and aluminum; and
a second region comprising cobalt, magnesium, and fluorine; and
a conductive additive,
wherein the first region comprises a layered rock-salt crystal structure,
wherein the second region is between the first region and the conductive additive,
wherein a maximum peak of the magnesium in the active material particle exists in the second region,
wherein the first region comprises a first measurement region, and a number of trivalent cobalt atoms in the first measurement region exceeds a number of cobalt atoms exhibiting other valences in the first measurement region, and
wherein the second region comprises a second measurement region, and a number of divalent cobalt atoms in the second measurement region exceeds a number of cobalt atoms exhibiting other valences in the second measurement region.

20. The battery according to claim 19,
wherein a concentration of magnesium is 1 atomic % or more and 16 atomic % or less, with respect to a total atom amount taken as 100 atomic % of lithium, cobalt, oxygen, magnesium, and fluorine as detected by X-ray photoelectron spectroscopy on a surface of the active material particle.

21. The battery according to claim 19,
wherein a thickness of the second region is greater than or equal to 0.5 nm and less than or equal to 50 nm, and
wherein a diameter of the active material particle is greater than or equal to 1 μm.

22. The battery according to claim 19,
wherein a concentration of fluorine is 0.2 atomic % or more and 4 atomic % or less with respect to a total atom amount taken as 100 atomic % of lithium, cobalt, oxygen, magnesium, and fluorine as detected by X-ray photoelectron spectroscopy on a surface of the active material particle.

23. The battery according to claim 19,
wherein the second region has a rock-salt crystal structure.

24. The battery according to claim 19,
wherein the second region further comprises Co(II)O.

25. An electronic device comprising:
the battery according to claim 19; and
a circuit electrically connected to the battery,
wherein the circuit is configured to protect the battery from overcharge.

26. The battery according to claim 19,
wherein the first region further comprises magnesium and fluorine,
wherein a distribution of the magnesium in the second region overlaps with a distribution of the fluorine in the second region,
wherein a maximum peak of the fluorine in the active material particle exists in the second region, and
wherein the second region extends from a surface of the active material particle to an inside of the active material particle wherein the magnesium is ⅕ of the maximum peak of the magnesium in the active material particle.

27. The battery according to claim 26,
wherein the distribution of the magnesium in the second region, the distribution of the fluorine in the second region, the maximum peak of the magnesium, and the maximum peak of the fluorine are measured by a line analysis of EDX.

28. An electronic device comprising:
a circuit; and
a battery electrically connected to the circuit, the battery comprising an active material particle comprising:
a first region comprising cobalt and aluminum; and
a second region comprising cobalt, magnesium, and fluorine,
wherein the first region comprises a layered rock-salt crystal structure,
wherein the second region covers at least a part of the first region,
wherein a maximum peak of the magnesium in the active material particle exists in the second region,
wherein the circuit is configured to protect the battery from overcharge, overdischarge, and overcurrent,
wherein the first region comprises a first measurement region, and a number of trivalent cobalt atoms in the first measurement region exceeds a number of cobalt atoms exhibiting other valences in the first measurement region, and
wherein the second region comprises a second measurement region, and a number of divalent cobalt atoms in the second measurement region exceeds a number of cobalt atoms exhibiting other valences in the second measurement region.

29. The electronic device according to claim 28, wherein a concentration of magnesium is 1 atomic % or more and 16 atomic % or less, with respect to a total atom amount taken as 100 atomic % of lithium, cobalt, oxygen, magnesium, and fluorine as detected by X-ray photoelectron spectroscopy on a surface of the active material particle.

30. The electronic device according to claim 28, wherein a thickness of the second region is greater than or equal to 0.5 nm and less than or equal to 50 nm, and wherein a diameter of the active material particle is greater than or equal to 1 μm.

31. The electronic device according to claim 28, wherein a concentration of fluorine is 0.2 atomic % or more and 4 atomic % or less with respect to a total atom amount taken as 100 atomic % of lithium, cobalt, oxygen, magnesium, and fluorine as detected by X-ray photoelectron spectroscopy on a surface of the active material particle.

32. The electronic device according to claim 28, wherein the second region has a rock-salt crystal structure.

33. The electronic device according to claim 28, wherein the second region further comprises Co(II)O.

34. The electronic device according to claim 28, wherein the first region further comprises magnesium and fluorine,
wherein a distribution of the magnesium in the second region overlaps with a distribution of the fluorine in the second region,
wherein a maximum peak of the fluorine in the active material particle exists in the second region, and
wherein the second region extends from a surface of the active material particle to an inside of the active material particle where the magnesium is ⅕ of the maximum peak of the magnesium in the active material particle.

35. The electronic device according to claim 34, wherein the distribution of the magnesium in the second region, the distribution of the fluorine in the second region, the maximum peak of the magnesium, and the maximum peak of the fluorine are measured by a line analysis of EDX.

36. An electronic device comprising:
a circuit; and
a battery electrically connected to the circuit, the battery comprising an active material particle comprising:
 a first region comprising cobalt, aluminum, magnesium, and fluorine, wherein the first region comprises a crystal defect; and
 a second region comprising cobalt, magnesium, and fluorine,
wherein the first region comprises a layered rock-salt crystal structure,
wherein the second region covers at least a part of the first region,
wherein a maximum peak of the magnesium in the active material particle exists in the second region,
wherein the circuit is configured to protect the battery from overcharge, overdischarge, and overcurrent,
wherein the first region comprises a first measurement region, and a number of trivalent cobalt atoms in the first measurement region exceeds a number of cobalt atoms exhibiting other valences in the first measurement region, and
wherein the second region comprises a second measurement region, and a number of divalent cobalt atoms in the second measurement region exceeds a number of cobalt atoms exhibiting other valences in the second measurement region.

37. The electronic device according to claim 36, wherein a concentration of magnesium is 1 atomic % or more and 16 atomic % or less, with respect to a total atom amount taken as 100 atomic % of lithium, cobalt, oxygen, magnesium, and fluorine as detected by X-ray photoelectron spectroscopy on a surface of the active material particle.

38. The electronic device according to claim 36, wherein a thickness of the second region is greater than or equal to 0.5 nm and less than or equal to 50 nm, and wherein a diameter of the active material particle is greater than or equal to 1 μm.

39. The electronic device according to claim 36, wherein a concentration of fluorine is 0.2 atomic % or more and 4 atomic % or less with respect to a total atom amount taken as 100 atomic % of lithium, cobalt, oxygen, magnesium, and fluorine as detected by X-ray photoelectron spectroscopy on a surface of the active material particle.

40. The electronic device according to claim 36, wherein the second region has a rock-salt crystal structure.

41. The electronic device according to claim 36, wherein the second region further comprises Co(II)O.

42. The electronic device according to claim 36, wherein a distribution of the magnesium in the second region overlaps with a distribution of the fluorine in the second region, and
wherein a maximum peak of the fluorine in the active material particle exists in the second region.

43. The electronic device according to claim 42, wherein the distribution of the magnesium in the second region, the distribution of the fluorine in the second region, the maximum peak of the magnesium, and the maximum peak of the fluorine are measured by a line analysis of EDX.

* * * * *